US012300174B2

(12) United States Patent
Kusunoki et al.

(10) Patent No.: US 12,300,174 B2
(45) Date of Patent: May 13, 2025

(54) CORRECTION METHOD OF DISPLAY APPARATUS INCLUDING PIXEL AND PLURALITY OF CIRCUITS

(71) Applicant: SEMICONDUCTOR ENERGY LABORATORY CO., LTD., Atsugi (JP)

(72) Inventors: Koji Kusunoki, Kanagawa (JP); Susumu Kawashima, Kanagawa (JP); Tomoaki Atsumi, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 18/294,395

(22) PCT Filed: Aug. 2, 2022

(86) PCT No.: PCT/IB2022/057146
§ 371 (c)(1),
(2) Date: Feb. 1, 2024

(87) PCT Pub. No.: WO2023/017362
PCT Pub. Date: Feb. 16, 2023

(65) Prior Publication Data

US 2024/0290261 A1 Aug. 29, 2024

(30) Foreign Application Priority Data

Aug. 12, 2021 (JP) ................................ 2021-131715

(51) Int. Cl.
*G09G 3/32* (2016.01)
*G09G 3/00* (2006.01)
*G09G 3/3233* (2016.01)

(52) U.S. Cl.
CPC ........... *G09G 3/3233* (2013.01); *G09G 3/006* (2013.01); *G09G 2300/0819* (2013.01);
(Continued)

(58) Field of Classification Search
CPC ................ G09G 3/3233; G09G 3/006; G09G 2300/0819; G09G 2300/0842;
(Continued)

(56) References Cited

U.S. PATENT DOCUMENTS 6,710,548 B2 3/2004 Kimura
7,399,991 B2 7/2008 Seo et al.
(Continued)

FOREIGN PATENT DOCUMENTS

CN 101667391 A 3/2010
CN 101903933 A 12/2010
(Continued)

OTHER PUBLICATIONS

International Search Report (Application No. PCT/IB2022/057146) dated Oct. 11, 2022.
(Continued)

*Primary Examiner* — Rodney Amadiz
(74) *Attorney, Agent, or Firm* — NIXON PEABODY LLP; Jeffrey L. Costellia

(57) ABSTRACT

A novel correction method of a display apparatus is provided. One embodiment of the present invention is a correction method of a display apparatus. The correction method includes processing in which a voltage correcting a threshold voltage of the transistor is obtained and the voltage is held in the capacitor; processing in which current flowing through the pixel is measured and a second signal based on the current is generated in the first circuit; processing in which the first signal correcting image data using the second signal is generated in the second circuit; and processing in which the first signal is supplied to the pixel.

9 Claims, 24 Drawing Sheets

(52) U.S. Cl.
CPC ............... *G09G 2300/0842* (2013.01); *G09G 2320/0233* (2013.01); *G09G 2320/0295* (2013.01); *G09G 2320/045* (2013.01); *G09G 2330/021* (2013.01)

(58) Field of Classification Search
CPC ... G09G 2320/0233; G09G 2320/0295; G09G 2320/045; G09G 2330/021
See application file for complete search history.

(56) References Cited

U.S. PATENT DOCUMENTS

| | | | | |
|---|---|---|---|---|
| 8,164,546 | B2 | 4/2012 | Odawara et al. | |
| 8,355,016 | B2 | 1/2013 | Odawara et al. | |
| 8,659,519 | B2 | 2/2014 | Abe et al. | |
| 8,791,939 | B2 | 7/2014 | Odawara et al. | |
| 9,230,996 | B2 | 1/2016 | Miyake et al. | |
| 9,552,767 | B2 | 1/2017 | Miyake et al. | |
| 9,853,068 | B2 | 12/2017 | Miyake | |
| 10,453,873 | B2 | 10/2019 | Miyake | |
| 11,011,118 | B2 | 5/2021 | Lin et al. | |
| 11,270,654 | B2 * | 3/2022 | Wang | G09G 3/3258 |
| 11,417,273 | B2 * | 8/2022 | Toyotaka | G09F 9/30 |
| 11,664,391 | B2 | 5/2023 | Miyake | |
| 2010/0053041 | A1 | 3/2010 | Abe et al. | |
| 2010/0245343 | A1 * | 9/2010 | Takei | G09G 3/3241 345/214 |
| 2010/0259527 | A1 | 10/2010 | Odawara et al. | |
| 2011/0254871 | A1 * | 10/2011 | Yoo | G09G 3/3233 345/77 |
| 2013/0021316 | A1 | 1/2013 | Inoue et al. | |
| 2015/0061533 | A1 | 3/2015 | Miyake et al. | |
| 2015/0171156 | A1 | 6/2015 | Miyake | |
| 2019/0355308 | A1 | 11/2019 | Verschueren et al. | |
| 2020/0142229 | A1 | 5/2020 | Kusunoki et al. | |
| 2020/0175905 | A1 | 6/2020 | Yamazaki et al. | |
| 2020/0194527 | A1 | 6/2020 | Kawashima et al. | |
| 2020/0327855 | A1 | 10/2020 | Lin et al. | |
| 2021/0217805 | A1 | 7/2021 | Kusunoki et al. | |
| 2021/0327865 | A1 | 10/2021 | Yamazaki et al. | |
| 2023/0261010 | A1 | 8/2023 | Miyake | |

FOREIGN PATENT DOCUMENTS

| | | | |
|---|---|---|---|
| CN | 108877650 | A | 11/2018 |
| CN | 110503919 | A | 11/2019 |
| DE | 102014225248 | | 7/2015 |
| EP | 2161706 | A | 3/2010 |
| EP | 3570268 | A | 11/2019 |
| JP | 2002-324673 | A | 11/2002 |
| JP | 2010-060816 | A | 3/2010 |
| JP | 2014-160266 | A | 9/2014 |
| JP | 2015-132816 | A | 7/2015 |
| JP | 2020-098339 | A | 6/2020 |
| JP | 2020-519910 | | 7/2020 |
| JP | 2020-202380 | A | 12/2020 |
| KR | 2010-0027986 | A | 3/2010 |
| KR | 2015-0068909 | A | 6/2015 |
| KR | 2019-0132224 | A | 11/2019 |
| KR | 2021-0031582 | A | 3/2021 |
| TW | 201011719 | | 3/2010 |
| TW | 201527852 | | 7/2015 |
| WO | WO-2009/087746 | | 7/2009 |
| WO | WO-2018/205565 | | 11/2018 |

OTHER PUBLICATIONS

Written Opinion (Application No. PCT/IB2022/057146) dated Oct. 11, 2022.

* cited by examiner

CORRECTION METHOD OF DISPLAY APPARATUS INCLUDING PIXEL AND PLURALITY OF CIRCUITS

TECHNICAL FIELD

One embodiment of the present invention relates to a correction method of a display apparatus.

Note that one embodiment of the present invention is not limited to the above technical field. Examples of the technical field of one embodiment of the present invention disclosed in this specification and the like include a display apparatus, a display apparatus, a light-emitting apparatus, a power storage device, a memory device, an electronic device, a lighting device, an input device, an input/output device, a driving method thereof, and a manufacturing method thereof.

In this specification and the like, a display apparatus refers to a device that utilizes semiconductor characteristics, and means a circuit including a semiconductor element (e.g., a transistor, a diode, or a photodiode) or a device including the circuit. The display apparatus also means all devices that can function by utilizing semiconductor characteristics. For example, an integrated circuit, a chip including an integrated circuit, and an electronic component including a chip in a package are examples of the display apparatus. Moreover, a memory device, a display apparatus, a light-emitting apparatus, a lighting device, an electronic device, and the like themselves may be display apparatuses and may each include a display apparatus.

BACKGROUND ART

In recent years, electronic devices including display apparatuses, such as smartphones and tablet terminals, have been widespread. Typical examples of the display apparatuses include a liquid crystal display apparatus, a light-emitting apparatus including a light-emitting element such as an organic EL (Electro Luminescence) element or a light-emitting diode (LED), and electronic paper performing display by an electrophoretic method or the like.

For example, the basic structure of an organic EL element is a structure where a layer containing a light-emitting organic compound is provided between a pair of electrodes. By voltage application to this element, light emission can be obtained from the light-emitting organic compound. A display apparatus using such an organic EL element does not need a backlight that is necessary for a liquid crystal display apparatus or the like; thus, a thin, lightweight, high-contrast, and low-power-consumption display apparatus can be achieved. Since the response speed of the organic EL element is high, a display apparatus suitable for displaying a fast-moving image can be achieved. Patent Document 1, for example, discloses an example of a display apparatus using an organic EL element.

Patent Document 2 discloses a circuit structure of a pixel circuit for controlling the emission luminance of an organic EL element, in which a threshold voltage variation between transistors is corrected in each pixel to increase the display quality of a display apparatus.

REFERENCE

Patent Document

[Patent Document 1] Japanese Published Patent Application No. 2002-324673

[Patent Document 2] Japanese Published Patent Application No. 2015-132816

SUMMARY OF THE INVENTION

Problems to be Solved by the Invention

However, there is a problem of display unevenness caused by variations in characteristics of organic EL elements in pixels. There is another problem in that deterioration of characteristics of organic EL elements are promoted by moisture, oxygen, light, and heat, which causes a decrease in luminance. The deterioration speed of the characteristics of the organic EL elements depends on a device structure, material characteristics, conditions of a manufacturing process, driving method of a display apparatus, and the like. For this reason, for example, a color display method using three kinds of organic EL elements which correspond to R (red), G (green), and B (blue), the organic EL elements deteriorate at different speeds depending on the corresponding colors in some cases. In that case, there is a problem in that the luminance differs over time between the organic EL elements corresponding different colors and thus a desired color cannot be displayed on the display apparatus.

An object of one embodiment of the present invention is to provide a display apparatus with high display quality. Another object of one embodiment of the present invention is to provide a novel display apparatus. Another object of one embodiment of the present invention is to provide a novel correction method of a display apparatus.

Note that the description of these objects does not preclude the existence of other objects. One embodiment of the present invention does not have to achieve all of these objects. Note that objects other than these can be derived from the description of the specification, the drawings, the claims, and the like.

Means for Solving the Problems (1) One embodiment of the present invention is a correction method of a display apparatus including a pixel, a first circuit, and a second circuit. The pixel includes a light-emitting element, a transistor, and a capacitor. The transistor has a function of controlling a current supplied to the light-emitting element on the basis of a first signal supplied to the pixel. The correction method includes first processing in which a voltage correcting a threshold voltage of the transistor is obtained and the voltage is held in the capacitor; second processing in which after the first processing, current flowing through the pixel is measured and a second signal based on the current is generated in the first circuit; third processing in which after the second processing, the first signal correcting image data using the second signal is generated in the second circuit; and fourth processing in which after the third processing, the first signal is supplied to the pixel.

(2) One embodiment of the present invention is a correction method of a display apparatus including a pixel, a first circuit, and a second circuit. The pixel includes a light-emitting element, a transistor, and a capacitor. The transistor has a function of controlling a current supplied to the light-emitting element on the basis of a first signal supplied to the pixel. The correction method includes second processing in which a current flowing through the pixel is measured and a second signal based on the current is generated in the first circuit; first processing in which after the second processing, a voltage correcting a threshold voltage of the transistor is obtained and the voltage is held in the capacitor; third processing in which after the second processing, the first signal correcting image data using the second signal is generated in the second circuit; and fourth processing in which after the first processing and the third processing, the first signal is supplied to the pixel.

(3) Note that in (2), the first processing and the third processing may be performed at the same time.

(4) Note that in any one of (1) to (3), a current flowing through the light-emitting element may be measured in the second processing.

(5) In any one of (1) to (4), the transistor may include a back gate, the transistor may have a function of controlling a threshold voltage of the transistor, on the basis of a potential supplied to the back gate, and a voltage between the back gate and a source of the transistor may be obtained in the first processing.

(6) In any one of (1) to (5) described above, the first signal may be supplied to a gate of the transistor in the fourth processing.

Effect of the Invention

One embodiment of the present invention can provide a display apparatus with high display quality. One embodiment of the present invention can provide a novel display apparatus. One embodiment of the present invention can provide a novel correction method of a display apparatus.

Note that the description of these effects does not preclude the existence of other effects. One embodiment of the present invention does not need to have all of these effects. Note that effects other than these can be derived from the description of the specification, the drawings, the claims, and the like.

MODE FOR CARRYING OUT THE INVENTION

Figure 1:
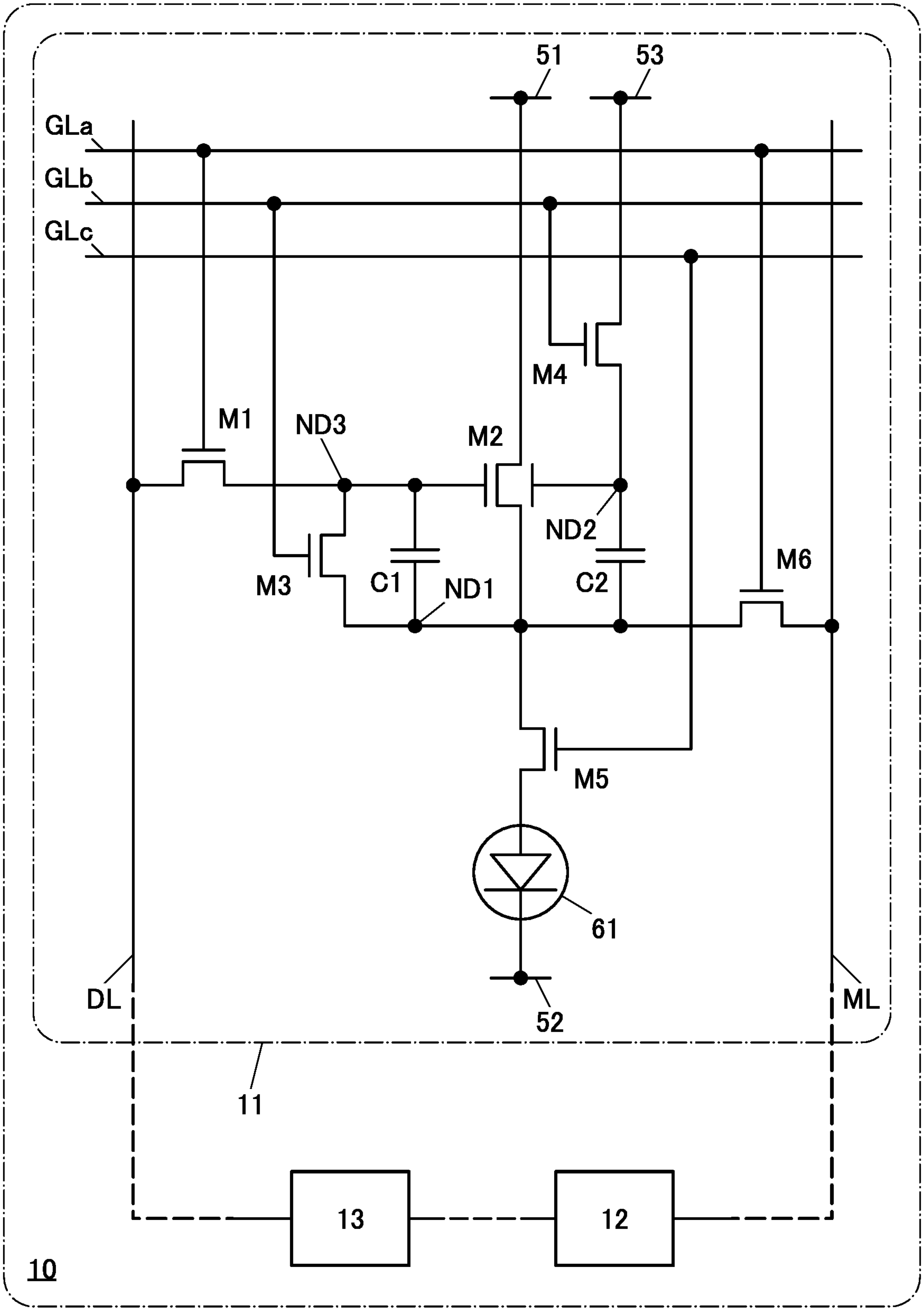
FIG. 1 is a diagram illustrating an example of a display apparatus.

Embodiments are described below with reference to the drawings. Note that the embodiments can be implemented in many different modes, and it is readily understood by those skilled in the art that modes and details thereof can be changed in various ways without departing from the spirit and scope thereof. Thus, the present invention should not be interpreted as being limited to the following description of the embodiments.

In the case where there is description "X and Y are connected" in this specification and the like, the case where X and Y are electrically connected, the case where X and Y are functionally connected, and the case where X and Y are directly connected are regarded as being disclosed in this specification and the like. Accordingly, without being limited to a predetermined connection relationship, e.g., a connection relationship shown in drawings or texts, a connection relationship other than one shown in drawings or texts is regarded as being disclosed in the drawings or the texts. X and Y each denote an object (e.g., a device, an element, a circuit, a wiring, an electrode, a terminal, a conductive film, or a layer).

For example, in the case where X and Y are electrically connected, one or more elements that allow electrical connection between X and Y (e.g., a switch, a transistor, a capacitor, an inductor, a resistor, a diode, a display device, a light-emitting device, or a load) can be connected between X and Y.

For example, in the case where X and Y are functionally connected, one or more circuits that allow functional connection between X and Y (e.g., a logic circuit (an inverter, a NAND circuit, a NOR circuit, or the like); a signal converter circuit (a digital-analog converter circuit, an analog-digital converter circuit, a gamma correction circuit, or the like); a potential level converter circuit (a power supply circuit (a step-up circuit, a step-down circuit, or the like), a level shifter circuit for changing the potential level of a signal, or the like); a voltage source; a current source; a switching circuit; an amplifier circuit (a circuit that can increase signal amplitude, the amount of current, or the like, an operational amplifier, a differential amplifier circuit, a source follower circuit, a buffer circuit, or the like); a signal generation circuit; a memory circuit; a control circuit; or the like) can be connected between X and Y. For instance, even if another circuit is interposed between X and Y, X and Y are regarded as being functionally connected when a signal output from X is transmitted to Y.

Note that an explicit description that X and Y are electrically connected includes the case where X and Y are electrically connected (i.e., the case where X and Y are connected with another element or another circuit interposed therebetween) and the case where X and Y are directly connected (i.e., the case where X and Y are connected without another element or another circuit interposed therebetween).

It can be expressed as, for example, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order". Alternatively, it can be expressed as "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order". Alternatively, it can be expressed as "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided in this connection order". When the connection order in a circuit structure is defined by an expression similar to the above examples, a source (or a first terminal or the like) and a drain (or a second terminal or the like) of a transistor can be distinguished from each other to specify the technical scope. Note that these expressions are examples and the expression is not limited to these expressions. Here, X and Y each denote an object (e.g., a device, an element, a circuit, a wiring, an electrode, a terminal, a conductive film, or a layer).

Even when independent components are electrically connected to each other in a circuit diagram, one component has functions of a plurality of components in some cases. For example, when part of a wiring also functions as an electrode, one conductive film has functions of both components: the wiring and the electrode. Thus, electrical connection in this specification and the like includes, in its category, such a case where one conductive film has functions of a plurality of components.

In this specification and the like, a "capacitor" can be, for example, a circuit element having an electrostatic capacitance value higher than 0 F, a region of a wiring having an electrostatic capacitance value higher than 0 F, parasitic capacitance, or gate capacitance of a transistor. Therefore, in this specification and the like, a "capacitor" is not limited to only a circuit element that has a pair of electrodes and a dielectric between the electrodes. A "capacitor" includes, for example, parasitic capacitance generated between wirings, gate capacitance generated between a gate and one of a source and a drain of a transistor, and the like. The term "capacitor", "parasitic capacitance", "gate capacitance", or the like can be replaced with the term "capacitance" and the like, for example. Conversely, the term "capacitance" can be replaced with the term "capacitor", "parasitic capacitance", "gate capacitance", or the like, for example. The term "a pair of electrodes" of a "capacitor" can be replaced with "a pair of conductors", "a pair of conductive regions", "a pair of regions", or the like, for example. Note that the electrostatic capacitance value can be higher than or equal to 0.05 fF and lower than or equal to 10 pF, for example. As another example, the electrostatic capacitance value may be higher than or equal to 1 pF and lower than or equal to 10 μF.

In this specification and the like, a transistor includes three terminals called a gate, a source, and a drain. The gate is a control terminal for controlling the amount of current flowing between the source and the drain. Two terminals functioning as the source and the drain are input/output terminals of the transistor. One of the two input/output terminals serves as the source and the other serves as the drain depending on the conductivity type (n-channel type or p-channel type) of the transistor and the levels of potentials supplied to the three terminals of the transistor. Thus, the terms "source" and "drain" can be replaced with each other in this specification and the like. Furthermore, in this specification and the like, expressions "one of a source and a drain" (or a first electrode or a first terminal) and "the other of the source and the drain" (or a second electrode or a second terminal) are used in the description of the connection relationship of a transistor. Depending on the structure, a transistor may include a back gate in addition to the above three terminals. In that case, in this specification and the like, one of the gate and the back gate of the transistor may be referred to as a first gate and the other of the gate and the back gate of the transistor may be referred to as a second gate. Moreover, the terms "gate" and "back gate" can be replaced with each other in one transistor in some cases. In the case where a transistor includes three or more gates, the gates may be referred to as a first gate, a second gate, and a third gate, for example, in this specification and the like.

In this specification and the like, a "node" can be referred to as a "terminal", a "wiring", an "electrode", a "conductive layer", a "conductor", an "impurity region", or the like depending on the circuit structure, the device structure, or the like. Furthermore, a "terminal", a "wiring", or the like can be referred to as a "node".

Ordinal numbers such as "first", "second", and "third" in this specification and the like are used to avoid confusion among components. Thus, the ordinal numbers do not limit the number of components. In addition, the ordinal numbers do not limit the order of components. For example, a "first" component in one embodiment in this specification and the like can be referred to as a "second" component in other embodiments, the scope of claims, or the like. Furthermore, for example, a "first" component in one embodiment in this specification and the like can be omitted in other embodiments, the scope of claims, or the like.

In this specification and the like, terms for describing arrangement, such as "over", "under", "above", and "below" are sometimes used for convenience to describe the positional relationship between components with reference to drawings. The positional relationship between components is changed as appropriate in accordance with a direction in which each component is described. Thus, the terms for describing arrangement in this specification and the like are not limited to those and can be replaced with another term as appropriate depending on the situation. For example, the expression "an insulator positioned over (on) a top surface of a conductor" can be replaced with the expression "an insulator positioned under (on) a bottom surface of a conductor" when the direction of a drawing illustrating these components is rotated by 180°.

The term "over" or "under" does not necessarily mean that a component is placed directly over or directly under and directly in contact with another component. For example, the expression "electrode B over insulating layer A" does not necessarily mean that the electrode B is formed over and in direct contact with the insulating layer A, and does not exclude the case where another component is provided between the insulating layer A and the electrode B.

Furthermore, the term "overlap", for example, in this specification and the like does not limit a state such as the stacking order of components. For example, the expression "the electrode B overlapping with the insulating layer A"does not necessarily mean the state where" the electrode B is formed over the insulating layer A", and does not exclude the state where "the electrode B is formed under the insulating layer A" and the state where "the electrode B is formed on the right side (or the left side) of the insulating layer A".

The term "adjacent" or "proximity" in this specification and the like does not necessarily mean that a component is directly in contact with another component. For example, the expression "electrode B adjacent to insulating layer A" does not necessarily mean that the electrode B is formed in direct contact with the insulating layer A and does not exclude the case where another component is provided between the insulating layer A and the electrode B.

In this specification and the like, the terms "film", "layer", and the like can be interchanged with each other depending on the situation. For example, the term "conductive layer" can be changed into the term "conductive film" in some cases. For another example, the term "insulating film" can be changed into the term "insulating layer" in some cases. Alternatively, the term "film", "layer", or the like is not used and can be interchanged with another term depending on the case or the situation. For example, the term "conductive layer" or "conductive film" can be changed into the term "conductor" in some cases. Alternatively, the term "conductor" can be changed into the term "conductive layer" or "conductive film" in some cases. Furthermore, for example, the term "insulating layer" or "insulating film" can be changed into the term "insulator" in some cases. Also, the term "insulator" can be changed into the term "insulating layer" or "insulating film" in some cases.

In addition, in this specification and the like, the term such as "electrode", "wiring", or "terminal" does not limit the function of a component. For example, an "electrode" is used as part of a wiring in some cases, and vice versa. Furthermore, the term "electrode" or "wiring" also includes, for example, the case where a plurality of "electrodes" or "wirings" are formed in an integrated manner. A "terminal" is used as part of a "wiring" or an "electrode" in some cases, and vice versa. Furthermore, the term "terminal" also includes the case where a plurality of "electrodes", "wirings", "terminals", or the like are formed in an integrated manner, for example. Therefore, for example, an "electrode" can be part of a "wiring" or a "terminal". Furthermore, a "terminal" can be part of a "wiring" or an "electrode". Moreover, the term "electrode", "wiring", "terminal", or the like is sometimes replaced with the term "region".

In addition, in this specification and the like, the terms such as "wiring", "signal line", and "power supply line" can be interchanged with each other depending on the case or the situation. For example, the term "wiring" can be changed into the term "signal line" in some cases. For another example, the term "wiring" can be changed into the term "power supply line" or the like in some cases. Conversely, the term such as "signal line" or "power supply line" can be changed into the term "wiring" in some cases. The term "power supply line" or the like can be changed into the term "signal line" or the like in some cases. Conversely, the term "signal line" or the like can be changed into the term "power supply line" or the like in some cases. Moreover, the term "potential" that is applied to a wiring can be sometimes changed into the term such as "signal" depending on the case or the situation. Conversely, the term "signal" or the like can be changed into the term "potential" in some cases.

In this specification and the like, a "switch" includes a plurality of terminals and has a function of switching (selecting) electrical continuity and discontinuity between the terminals. For example, in the case where a switch includes two terminals and electrical continuity is established between the two terminals, the switch is in a "conduction state" or an "on state". In the case where electrical continuity is not established between the two terminals, the switch is in a "non-conduction state" or an "off state". Note that switching to one of a conduction state and a non-conduction state or maintaining one of a conduction state and a non-conduction state is sometimes referred to as "controlling a conduction state".

That is, a switch has a function of controlling whether current flows therethrough or not. Alternatively, a switch has a function of selecting and changing a current path. For example, an electrical switch or a mechanical switch can be used. That is, a switch can be any element capable of controlling current, and is not limited to a particular element.

Examples of a switch include a transistor (e.g., a bipolar transistor or a MOS transistor), a diode (e.g., a PN diode, a PIN diode, a Schottky diode, a MIM (Metal Insulator Metal) diode, a MIS (Metal Insulator Semiconductor) diode, or a diode-connected transistor), and a logic circuit in which such elements are combined. Note that in the case where a transistor is used as a switch, a "conduction state" or an "on state" of the transistor refers to a state where a source electrode and a drain electrode of the transistor can be regarded as being electrically short-circuited. Furthermore, a "non-conduction state" or an "off state" of the transistor refers to a state where the source electrode and the drain electrode of the transistor can be regarded as being electrically disconnected. Note that in the case where a transistor operates just as a switch, there is no particular limitation on the polarity (conductivity type) of the transistor.

An example of a mechanical switch is a switch using a MEMS (micro electro mechanical systems) technology. Such a switch includes an electrode that can be moved mechanically, and selects a conduction state or a non-conduction state with the movement of the electrode.

In this specification, "parallel" indicates a state where two straight lines are placed at an angle greater than or equal to −10° and less than or equal to 10°. Thus, the case where the angle is greater than or equal to −5° and less than or equal to 5° is also included. In addition, "approximately parallel" or "substantially parallel" indicates a state where two straight lines are placed at an angle greater than or equal to −30° and less than or equal to 30°. Moreover, "perpendicular" indicates a state where two straight lines are placed at an angle greater than or equal to 800 and less than or equal to 100°. Thus, the case where the angle is greater than or equal to 850 and less than or equal to 950 is also included. Furthermore, "approximately perpendicular" or "substantially perpendicular" indicates a state where two straight lines are placed at an angle greater than or equal to 600 and less than or equal to 120°.

Note that in this specification and the like, the terms "identical", "the same", "equal", "uniform", and the like (including synonyms thereof) used in describing calculation values and measurement values contain an error of ±20% unless otherwise specified.

Embodiments described in this specification are described with reference to the drawings. Note that the embodiments can be implemented in many different modes. It will be readily understood by those skilled in the art that the modes and details can be changed in various ways without departing from the spirit and scope thereof. Therefore, the present invention should not be interpreted as being limited to the description in the embodiments. Note that in the structures of the invention in the embodiments, the same reference numerals are used in common for the same portions or portions having similar functions in different drawings, and repeated description thereof is omitted in some cases. Furthermore, the same hatch pattern is used for the portions having similar functions, and the portions are not especially denoted by reference numerals in some cases. Moreover, some components are omitted in a perspective view, a top view, and the like for easy understanding of the drawings in some cases.

In addition, in the drawings and the like in this specification, the size, the layer thickness, or the region is exaggerated for clarity in some cases. Therefore, embodiments of the present invention are not limited to the size, aspect ratio, and the like illustrated in the drawings. Note that the drawings schematically illustrate ideal examples, and embodiments of the present invention are not limited to shapes, values, and the like illustrated in the drawings. For example, variation in signal, voltage, or current due to noise or variation in signal, voltage, or current due to difference in timing can be included.

In the drawings and the like in this specification, arrows indicating the X direction, the Y direction, and the Z direction are illustrated in some cases. In this specification and the like, the "X direction" is a direction along the X-axis, and the forward direction and the reverse direction are not distinguished in some cases, unless otherwise specified. The same applies to the "Y direction" and the "Z direction". The X direction, the Y direction, and the Z direction are directions intersecting with each other. More specifically, the X direction, the Y direction, and the Z direction are directions orthogonal to each other. In this specification and the like, one of the X direction, the Y direction, and the Z direction is referred to as a "first direction" in some cases. Another one of the directions is referred to as a "second direction" in some cases. The remaining one of the directions is referred to as a "third direction" in some cases.

In this specification and the like, when a plurality of components are denoted by the same reference numerals, and in particular need to be distinguished from each other, an identification sign such as "A", "b", "_1", "[n]", or "[m, n]" is sometimes added to the reference numerals.

Embodiment 1

In this embodiment, a structure example of a display apparatus of one embodiment of the present invention and a correction method of the display apparatus will be described.

Structure Example of Display Apparatus

FIG. 1 illustrates a structure example of a display apparatus of one embodiment of the present invention. A display apparatus 10 includes a pixel 11, a monitor circuit 12, and an image processing circuit 13. The pixel 11 includes a light-emitting element 61, a transistor M1 to a transistor M6, a capacitor C1, and a capacitor C2.

The monitor circuit 12 has a function of supplying a given potential to a wiring ML. The monitor circuit 12 has a function of measuring current flowing to the pixel 11 through the wiring ML. The monitor circuit 12 has a function of generating given data based on the measured current. For example, data on the current voltage characteristics may be generated by obtaining a plurality of values of given potentials supplied to the wiring ML and currents flowing through the wiring ML at this time.

The image processing circuit 13 has a function of correcting image data using given data generated in the monitor circuit 12 to generate display data. Note that in this embodiment and the like, the display data refers to corrected image data. The image processing circuit 13 also has a function of supplying display data or a given potential to a wiring DL. For example, a potential that can turn off the transistor M2 may be supplied as the given potential.

A gate of the transistor M1 is electrically connected to a wiring GLa. One of a source and a drain of the transistor M1 is electrically connected to the wiring DL. The other of the source and the drain of the transistor M1 is electrically connected to a gate of the transistor M2. The transistor M1 has a function of establishing or breaking electrical continuity between the gate of the transistor M2 and the wiring DL.

The gate of the transistor M2 is electrically connected to one terminal of the capacitor C1. One of a source and a drain of the transistor M2 is electrically connected to a wiring 51. The other of the source and the drain of the transistor M2 is electrically connected to the other terminal of the capacitor C1. Moreover, the transistor M2 includes a back gate. The back gate of the transistor M2 is electrically connected to one terminal of the capacitor C2. The other terminal of the capacitor C2 is electrically connected to the other of the source and the drain of the transistor M2.

A gate of the transistor M3 is electrically connected to a wiring GLb. One of a source and a drain of the transistor M3 is electrically connected to the one terminal of the capacitor C1. The other of the source and the drain of the transistor M3 is electrically connected to the other terminal of the capacitor C1. The transistor M3 has a function of establishing or breaking electrical continuity between the gate of the transistor M2 and the other of the source and the drain of the transistor M2.

A gate of the transistor M4 is electrically connected to the wiring GLb. One of a source and a drain of the transistor M4 is electrically connected to a wiring 53. The other of the source and the drain of the transistor M4 is electrically connected to the one terminal of the capacitor C2. The transistor M4 has a function of establishing or breaking electrical continuity between the wiring 53 and the one terminal of the capacitor C2.

A gate of the transistor M5 is electrically connected to a wiring GLc. One of a source and a drain of the transistor M5 is electrically connected to the other of the source and the drain of the transistor M2. The other of the source and the drain of the transistor M5 is electrically connected to one terminal (e.g., an anode terminal) of the light-emitting element 61. The transistor M5 has a function of establishing or breaking electrical continuity between the other of the source and the drain of the transistor M2 and the one terminal of the light-emitting element 61.

A gate of the transistor M6 is electrically connected to the wiring GLa. One of a source and a drain of the transistor M6 is electrically connected to the other of the source and the drain of the transistor M2. The other of the source and the drain of the transistor M6 is electrically connected to the wiring ML. The transistor M6 has a function of establishing or breaking electrical continuity between the other of the source and the drain of the transistor M2 and the wiring ML.

The other terminal (e.g., a cathode terminal) of the light-emitting element 61 is electrically connected to a wiring 52.

The light-emitting element 61 emits light with emission intensity corresponding to the amount of current flowing through the light-emitting element 61. As the light-emitting element 61, for example, any of a variety of display elements such as an EL element (e.g., an EL element containing an organic substance and an inorganic substance, an organic EL element, or an inorganic EL element), an LED (e.g., a white LED, a red LED, a green LED, or a blue LED), a micro LED (e.g., an LED with a side of less than 0.1 mm), a QLED (Quantum-dot Light Emitting Diode), and an electron emitter element can be used.

Note that the transistor M2 has a function of controlling the amount of current flowing through the light-emitting element 61. That is, the transistor M2 has a function of controlling the emission intensity of the light-emitting element 61. Thus, in this specification and the like, the transistor M2 is referred to as a "driving transistor" in some cases.

A region where the other terminals of the capacitor C1 and the capacitor C2, the other of the source and the drain of the transistor M2, the other of the source and the drain of the transistor M3, the one of the source and the drain of the transistor M5, and the one of the source and the drain of the transistor M6 are electrically connected to one another is referred to as a node ND1.

A region where the one terminal of the capacitor C2, the back gate of the transistor M2, and the other of the source and the drain of the transistor M4 are electrically connected to one another is referred to as a node ND2.

A region where the other of the source and the drain of the transistor M1, the one of the source and the drain of the transistor M3, the one terminal of the capacitor C1, and the gate of the transistor M2 are electrically connected to one another is referred to as a node ND3.

The capacitor C1 has, for example, a function of retaining a potential difference (voltage) between the other of the source and the drain of the transistor M2 and the gate of the transistor M2 at the time when the node ND3 is in a floating state.

The capacitor C2 has, for example, a function of retaining a potential difference (voltage) between the other of the source and the drain of the transistor M2 and the back gate of the transistor M2 at the time when the node ND2 is in a floating state.

Note that in this embodiment and the like, unless otherwise specified, the transistor M1 to the transistor M6 are enhancement (normally-off) n-channel field-effect transistors. Thus, the threshold voltage (also referred to as "Vth") is higher than 0 V.

A transistor containing any of various semiconductors can be used in the pixel 11 of one embodiment of the present invention. For example, a transistor containing a single-crystal semiconductor, a polycrystalline semiconductor, a microcrystalline semiconductor, or an amorphous semiconductor in a channel formation region can be used. Furthermore, for example, a compound semiconductor (e.g., silicon germanium (SiGe) or gallium arsenide (GaAs)), an oxide semiconductor, or the like as well as a single element semiconductor whose main component is a single element (e.g., silicon (Si) or germanium (Ge)) can be used.

In this embodiment and the like, an example is described in which the display apparatus 10 is formed using n-channel transistors; however, one embodiment of the present invention is not limited to this example. As some or all of the transistors included in the display apparatus 10, p-channel transistors may be used.

Any of transistors having a variety of structures can be used in the pixel 11 of one embodiment of the present invention. For example, any of transistors having a variety of structures such as a planar type, a FIN-type, a TRI-GATE type, a top-gate type, a bottom-gate type, and a dual-gate type (a structure in which gates are placed above and below a channel) can be used. A MOS transistor, a junction transistor, a bipolar transistor, or the like can be used, for example, as the transistor of one embodiment of the present invention.

As a transistor included in the pixel 11, an OS transistor (a transistor containing an oxide semiconductor in a semiconductor layer where a channel is formed) may be used, for example. An oxide semiconductor has a band gap of 2 eV or larger and thus has an extremely low off-state current. Therefore, an OS transistor is preferably used as a transistor functioning as a switch. For example, OS transistors can be used as the transistor M1 and the transistor M3 to the transistor M6.

The off-state current value per micrometer of channel width of the OS transistor at room temperature can be lower than or equal to 1 aA ($1\times10^{-18}$ A), lower than or equal to 1 zA ($1\times10^{-21}$ A), or lower than or equal to 1 yA ($1\times10^{-24}$ A). Note that the off-state current value per micrometer of channel width of a Si transistor (a transistor containing silicon in a semiconductor layer where a channel is formed) at room temperature is higher than or equal to 1 fA ($1\times10^{-15}$ A) and lower than or equal to 1 pA ($1\times10^{-12}$ A). Thus, the off-state current of the OS transistor is lower than the off-state current of the Si transistor by approximately ten orders of magnitude.

When the OS transistor is used as each of the transistors included in the pixel 11, charge written to the nodes can be retained for a long period. For example, in the case of displaying a still image for which rewriting every frame is not required, displaying an image can be kept even when the operation of a peripheral driver circuit is stopped. Such a driving method in which the operation of a peripheral driver circuit is stopped during displaying a still image is also referred to as "idling stop driving". The power consumption of a display apparatus can be reduced by performing idling stop driving.

The off-state current of the OS transistor hardly increases even in a high-temperature environment. Specifically, the off-state current of the OS transistor hardly increases even at an environment temperature higher than or equal to room temperature and lower than or equal to 200° C. Furthermore, the on-state current of the OS transistor is unlikely to decrease even in a high-temperature environment. A display apparatus including the OS transistor can operate stably and have high reliability even in a high-temperature environment.

Moreover, the OS transistor has a high source-drain breakdown voltage. The use of the OS transistor as each of the transistors included in the pixel 11 makes the operation stable even in the case where a potential difference (voltage) between a potential supplied to the wiring 51 (also referred to as an anode potential) and a potential supplied to the wiring 52 (also referred to as a cathode potential) is large, whereby a highly reliable display apparatus can be achieved. It is particularly preferable to use the OS transistor as one or both of the transistor M2 and the transistor M5.

The semiconductor layer of the OS transistor preferably contains indium, M (M is one or more kinds selected from gallium, aluminum, silicon, boron, yttrium, tin, copper, vanadium, beryllium, titanium, iron, nickel, germanium, zirconium, molybdenum, lanthanum, cerium, neodymium, hafnium, tantalum, tungsten, and magnesium), and zinc, for example. Specifically, M is preferably one or more kinds selected from aluminum, gallium, yttrium, and tin.

It is particularly preferable to use an oxide containing indium (In), gallium (Ga), and zinc (Zn) (also referred to as "IGZO") for the semiconductor layer. Alternatively, an oxide containing indium (In), aluminum (Al), and zinc (Zn) (also referred to as "IAZO") may be used for the semiconductor layer. Alternatively, an oxide containing indium (In), aluminum (Al), gallium (Ga), and zinc (Zn) (also referred to as "IAGZO") may be used for the semiconductor layer.

When the semiconductor layer is an In-M-Zn oxide, the atomic ratio of In is preferably greater than or equal to the atomic ratio of Min the In-M-Zn oxide. Examples of the atomic ratio of the metal elements in such an In-M-Zn oxide include In:M:Zn=1:1:1 or a composition in the neighborhood thereof, In:M:Zn=1:1:1.2 or a composition in the neighborhood thereof, In:M:Zn=1:3:2 or a composition in the neighborhood thereof, In:M:Zn=1:3:4 or a composition in the neighborhood thereof, In:M:Zn=2:1:3 or a composition in the neighborhood thereof, In:M:Zn=3:1:2 or a composition in the neighborhood thereof, In:M:Zn=4:2:3 or a composition in the neighborhood thereof, In:M:Zn=4:2:4.1 or a composition in the neighborhood thereof, In:M:Zn=5:1:3 or a composition in the neighborhood thereof, In:M:Zn=5:1:6 or a composition in the neighborhood thereof, In:M:Zn=5:1:7 or a composition in the neighborhood thereof, In:M:Zn=5:1:8 or a composition in the neighborhood thereof, In:M:Zn=6:1:6 or a composition in the neighborhood thereof, and In:M:Zn=5:2:5 or a composition in the neighborhood thereof. Note that a composition in the neighborhood includes the range of ±30% of an intended atomic ratio.

For example, when the atomic ratio is described as In:Ga:Zn=4:2:3 or a composition in the neighborhood thereof, the case is included where the atomic ratio of Ga is greater than or equal to 1 and less than or equal to 3 and the atomic ratio of Zn is greater than or equal to 2 and less than or equal to 4 with the atomic ratio of In being 4. When the atomic ratio is described as In:Ga:Zn=5:1:6 or a composition in the neighborhood thereof, the case is included where the atomic ratio of Ga is greater than 0.1 and less than or equal to 2 and the atomic ratio of Zn is greater than or equal to 5 and less than or equal to 7 with the atomic ratio of In being 5. When the atomic ratio is described as In:Ga:Zn=1:1:1 or a composition in the neighborhood thereof, the case is included where the atomic ratio of Ga is greater than 0.1 and less than or equal to 2 and the atomic ratio of Zn is greater than 0.1 and less than or equal to 2 with the atomic ratio of In being 1.

The pixel 11 may include a plurality of kinds of transistors formed using different semiconductor materials. For example, the pixel 11 may include a transistor containing low-temperature polysilicon (LTPS) in its semiconductor layer (hereinafter also referred to as an LTPS transistor) and an OS transistor. The LTPS transistor has high field-effect mobility and favorable frequency characteristics. A structure where an LTPS transistor and an OS transistor are used in combination is referred to as LTPO in some cases.

As for the transistors included in the pixel 11, it is preferable that OS transistors be used as the transistor M1 and the transistor M3 to the transistor M6 and an LTPS transistor may be used as the transistor M2, for example. In other words, it is preferable to use an OS transistor as a transistor functioning as a switch for controlling electrical continuity between wirings and an LTPS transistor as a transistor for controlling a current. When LTPO, i.e., both an LTPS transistor and an OS transistor, is used for the pixel 11, the display apparatus with low power consumption and high driving capability can be achieved. As described above, the correction method of a display apparatus of one embodiment of the present invention is not limited to the structures of transistors and can be applied to transistors with a variety of structures.

In the case where the pixel 11 includes a plurality of kinds of transistors formed using different semiconductor materials, the transistors may be provided in different layers for each kind of transistor. For example, in the case where the pixel 11 include a Si transistor and an OS transistor, a layer including the Si transistor and a layer including the OS transistor may be provided to overlap with each other. This structure reduces the area occupied by the pixel 11.

Figure 2:
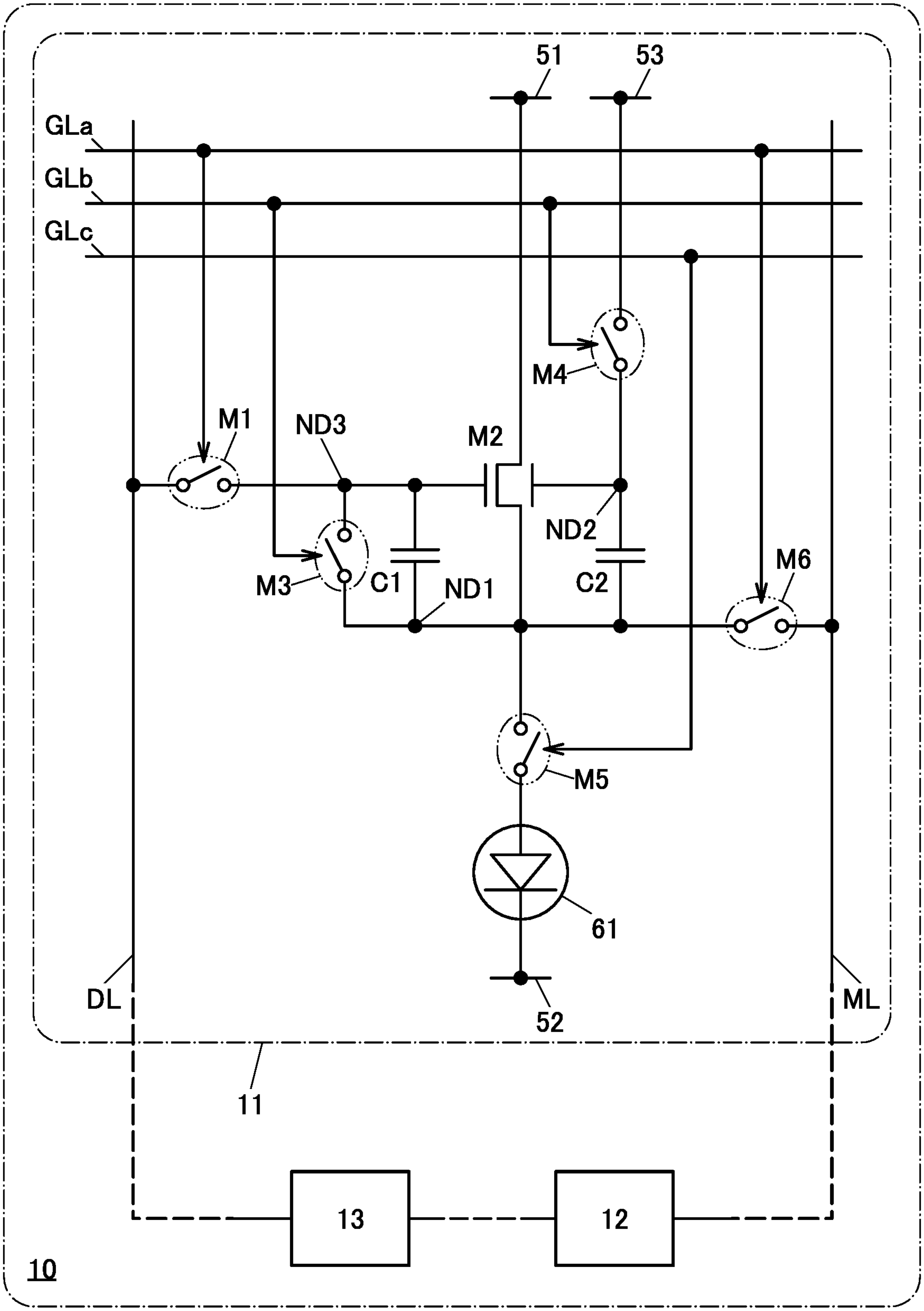
FIG. 2 is a diagram illustrating an example of a display apparatus.

Among the transistors included in the pixel 11, the transistor M1 and the transistor M3 to the transistor M6 function as switches. Hence, the display apparatus 10 can be illustrated as in FIG. 2. The transistor M1 and the transistor M3 to the transistor M6 can be replaced with elements that can function as switches.

Some or all of the transistors included in the pixel 11 may each be a transistor having a back gate. By providing the back gate in the transistor, an electric field generated outside the transistor is unlikely to affect a channel formation region; thus, the operation of the display apparatus is stabilized and the reliability of the display apparatus can be increased. When the back gate of the transistor is supplied with the same potential as the potential supplied to the gate, the on-state resistance of the transistor can be reduced. By controlling the potentials of the back gate and the gate of the transistor independently of each other, the threshold voltage of the transistor can be changed.

Figure 3:
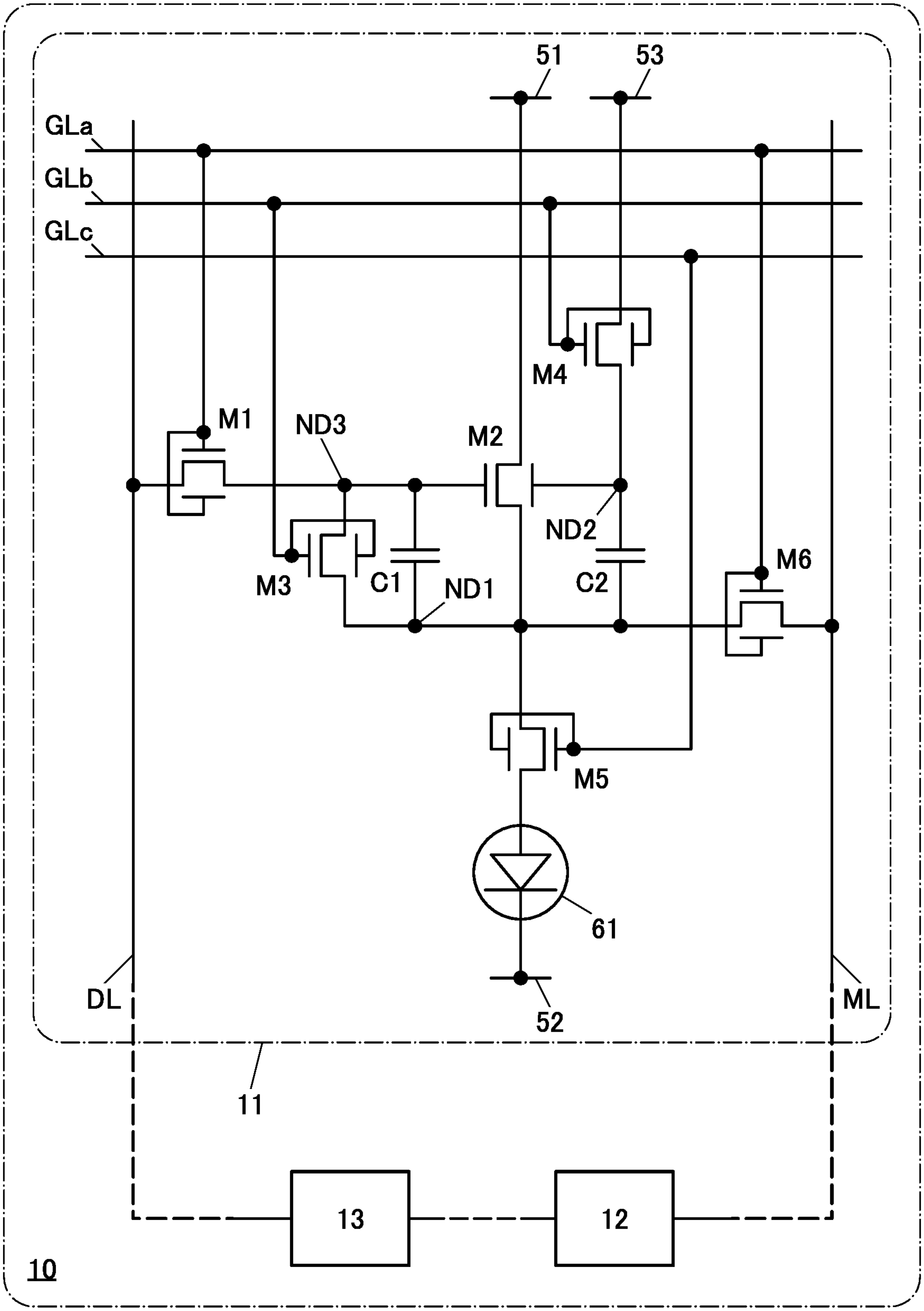
FIG. 3 is a diagram illustrating an example of a display apparatus.

FIG. 3 illustrates a circuit structure example of the display apparatus 10 in which transistors having back gates are used not only as the transistor M2 but also as the transistor M1 and the transistor M3 to the transistor M6. FIG. 3 illustrates an example in which the gate and the back gate of each of the transistor M1 and the transistor M3 to the transistor M6 are electrically connected to each other. Note that not all the transistors included in the display apparatus necessarily have back gates.

It is not necessary to electrically connect the gate and the back gate, and a given potential may be supplied to the back gate. Note that the potential supplied to the back gate is not limited to a fixed potential. The potentials supplied to the back gates of the transistors included in the display apparatus may be different from one another or may be the same.

Figure 4A:
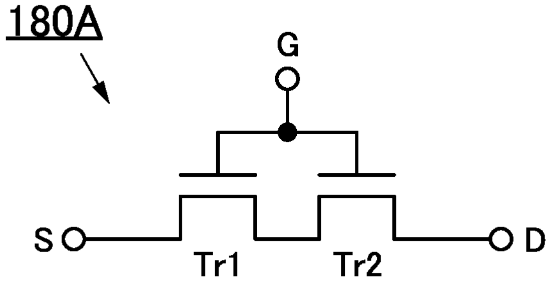
FIG. 4A to FIG. 4C are diagrams illustrating circuit symbols of transistors.

The transistors included in the pixel 11 may each be a single-gate transistor having one gate between a source and a drain, or a double-gate transistor. FIG. 4A illustrates a circuit symbol example of a double-gate transistor 180A.

The transistor 180A has a structure in which a transistor Tr1 and a transistor Tr2 are connected in series. In the transistor 180A illustrated in FIG. 4A, one of a source and a drain of the transistor Tr1 is electrically connected to a terminal S. The other of the source and the drain of the transistor Tr1 is electrically connected to one of a source and a drain of the transistor Tr2. The other of the source and the drain of the transistor Tr2 is electrically connected to a terminal D. In the transistor 180A illustrated in FIG. 4A, gates of the transistor Tr1 and the transistor Tr2 are electrically connected to each other and electrically connected to a terminal G.

The transistor 180A illustrated in FIG. 4A has a function of switching electrical continuity between the terminal S and the terminal D by changing the potential of the terminal G. Thus, the transistor 180A that is a double-gate transistor functions as one transistor including the transistor Tr1 and the transistor Tr2. That is, it can be said that in FIG. 4A, one of a source and a drain of the transistor 180A is electrically connected to the terminal S, the other of the source and the drain of the transistor 180A is electrically connected to the terminal D, and a gate of the transistor 180A is electrically connected to the terminal G.

Figure 4B:
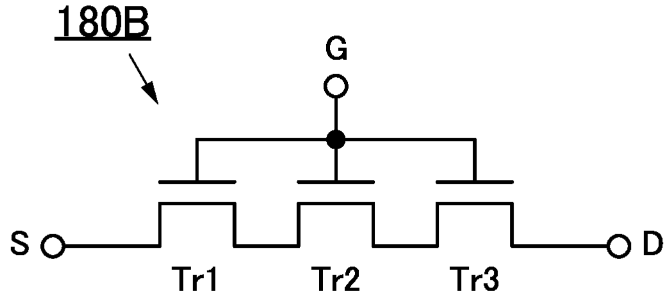

The transistors included in the pixel 11 may each be a triple-gate transistor. FIG. 4B illustrates a circuit symbol example of a triple-gate transistor 180B.

The transistor 180B has a structure in which the transistor Tr1, the transistor Tr2, and a transistor Tr3 are connected in series. In the transistor 180B illustrated in FIG. 4B, the one of the source and the drain of the transistor Tr1 is electrically connected to the terminal S. The other of the source and the drain of the transistor Tr1 is electrically connected to the one of the source and the drain of the transistor Tr2. The other of the source and the drain of the transistor Tr2 is electrically connected to one of a source and a drain of the transistor Tr3. The other of the source and the drain of the transistor Tr3 is electrically connected to the terminal D. In the transistor 180B illustrated in FIG. 4B, the gates of the transistor Tr1 and the transistor Tr2 and a gate of the transistor Tr3 are electrically connected to one another and electrically connected to the terminal G.

The transistor 180B illustrated in FIG. 4B has a function of switching electrical continuity between the terminal S and the terminal D by changing the potential of the terminal G. Thus, the transistor 180B that is a triple-gate transistor functions as one transistor including the transistor Tr1, the transistor Tr2, and the transistor Tr3. That is, it can be said that in FIG. 4B, one of a source and a drain of the transistor 180B is electrically connected to the terminal S, the other of the source and the drain of the transistor 180B is electrically connected to the terminal D, and a gate of the transistor 180B is electrically connected to the terminal G.

The transistor included in the pixel 11 may have a structure in which four or more transistors are connected in series. A transistor 180C illustrated in FIG. 4C has a structure in which six transistors (the transistor Tr1 to a transistor Tr6) are connected in series. In the transistor 180C illustrated in FIG. 4C, gates of the six transistors are electrically connected to one another and electrically connected to the terminal G.

Figure 4C:
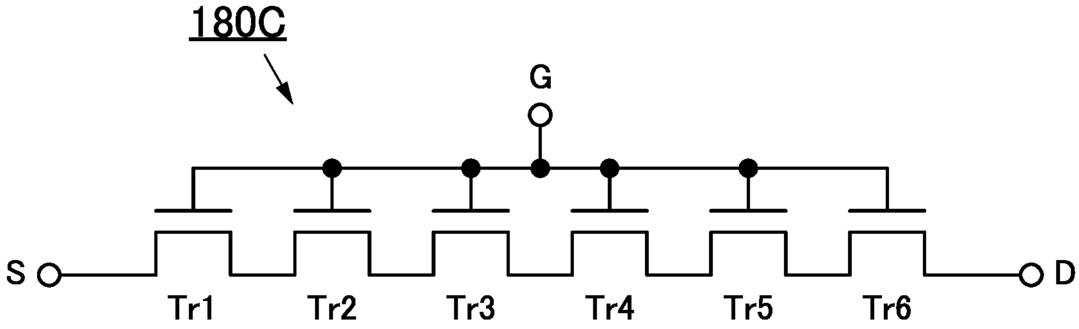

The transistor 180C illustrated in FIG. 4C has a function of switching electrical continuity between the terminal S and the terminal D by changing the potential of the terminal G. Thus, the transistor 180C functions as one transistor including the transistor Tr1 to the transistor Tr6. That is, it can be said that in FIG. 4C, one of a source and a drain of the transistor 180C is electrically connected to the terminal S, the other of the source and the drain of the transistor 180C is electrically connected to the terminal D, and a gate of the transistor 180C is electrically connected to the terminal G.

Like the transistor 180A, the transistor 180B, and the transistor 180C, a transistor having a plurality of gates electrically connected to each other is referred to as a "multi-gate type transistor" or a "multi-gate transistor" in some cases.

In the case where a transistor operates in a saturation region, for example, the channel length of the transistor is sometimes lengthened in order to improve its electrical characteristics in the saturation region. A multi-gate transistor may be used to achieve a transistor having a long channel length.

Example 1 of Correction Operation of Display Apparatus

Figure 5:
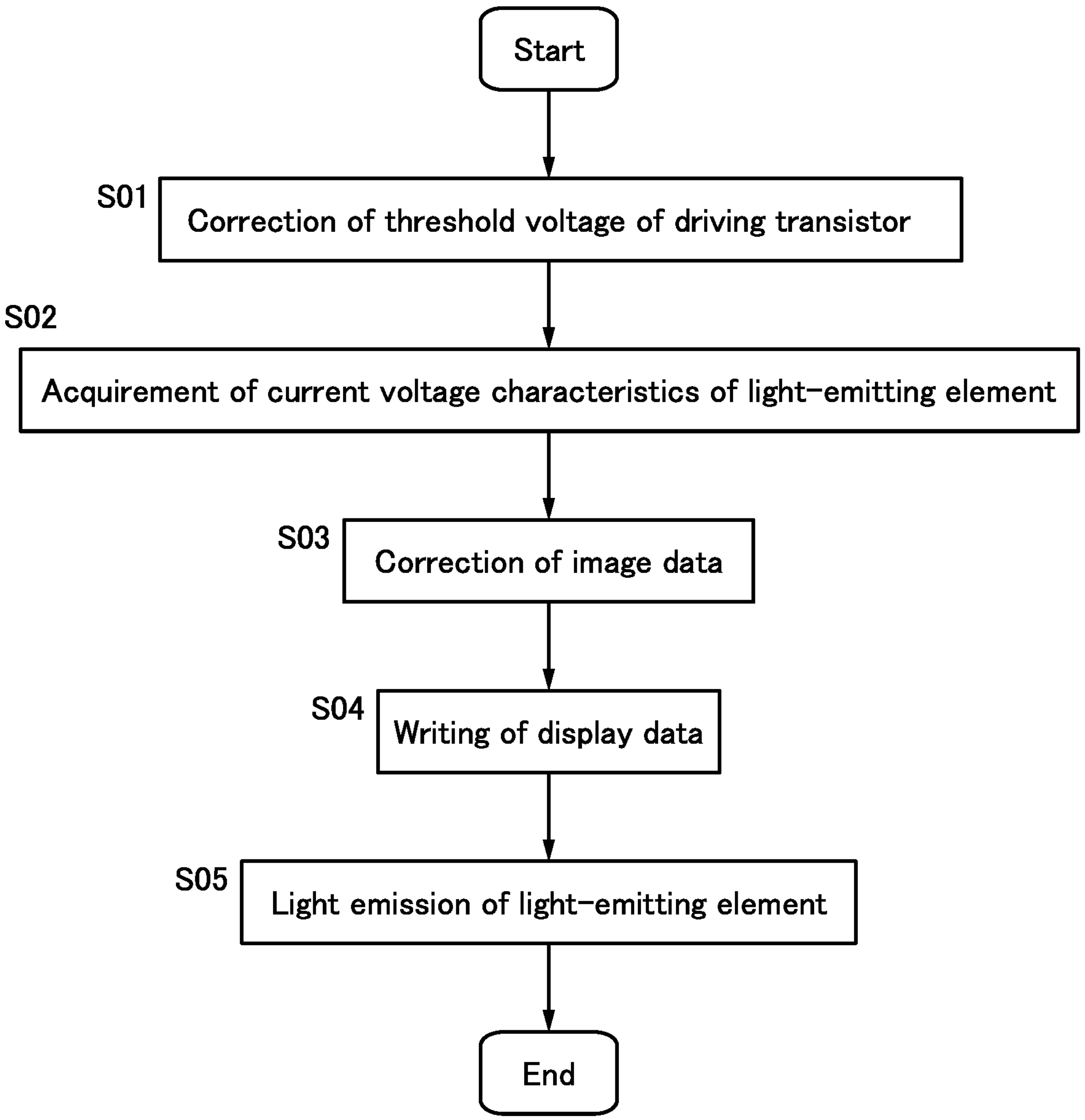
FIG. 5 is a flow chart showing an example of a correction method of a display apparatus.

FIG. 5 is a flow chart showing an example of a correction method of the display apparatus 10. FIG. 5 shows Step S01 to Step S05. First, Step S01 starts. In Step S01, the threshold voltage of a driving transistor (the transistor M2) is corrected. After Step S01, Step S02 starts. In Step S02, the current voltage characteristics of the light-emitting element 61 are obtained. After Step S02, Step S03 starts. In Step S03, image data is corrected. After Step S03, Step S04 starts. In Step S04, display data (corrected image data) is written. After Step S04, Step S05 starts. In Step S05, the light-emitting element 61 is made to emit light.

Figure 6:
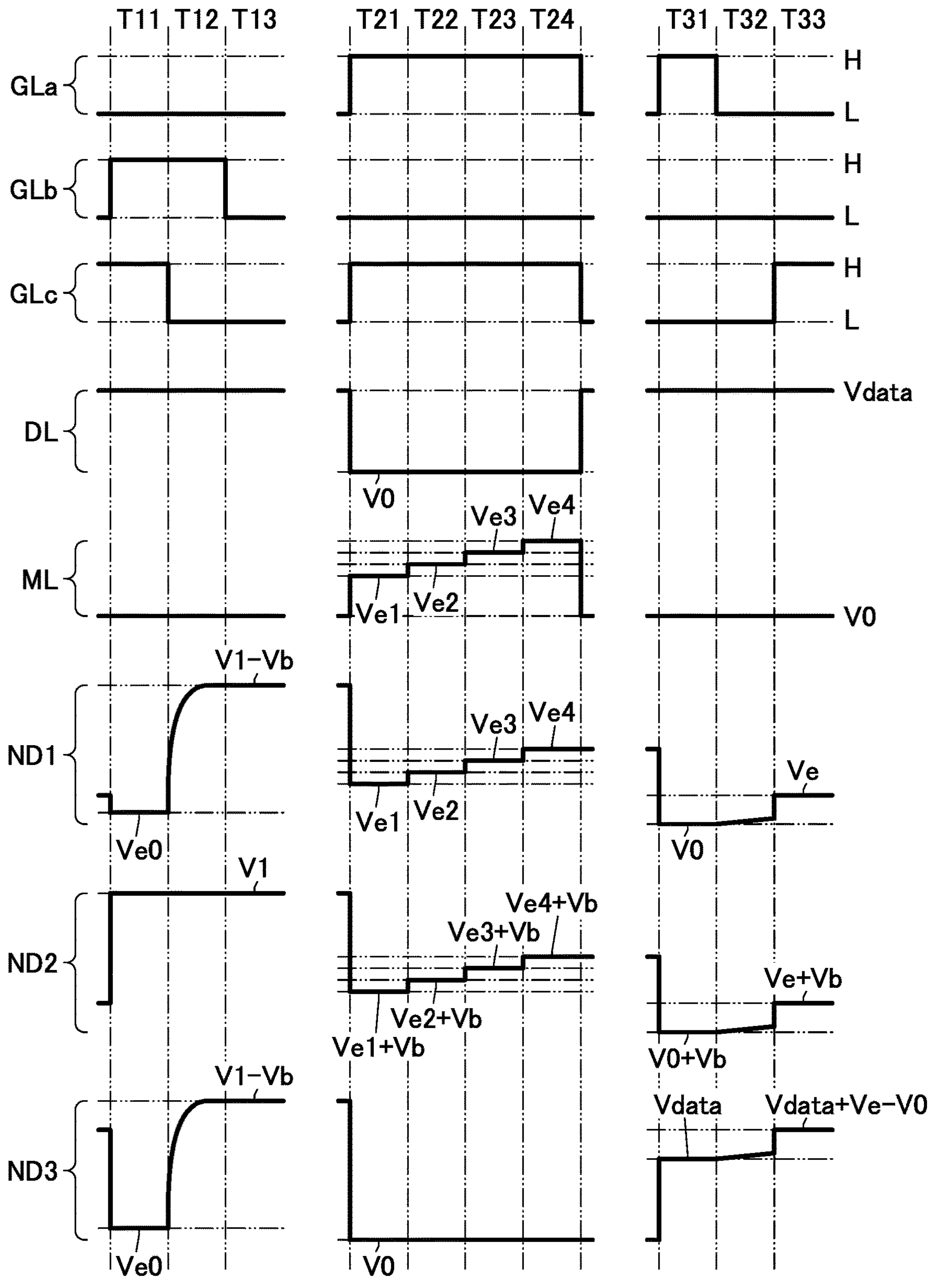
FIG. 6 is a timing chart showing an operation example of a display apparatus.
Figure 7:
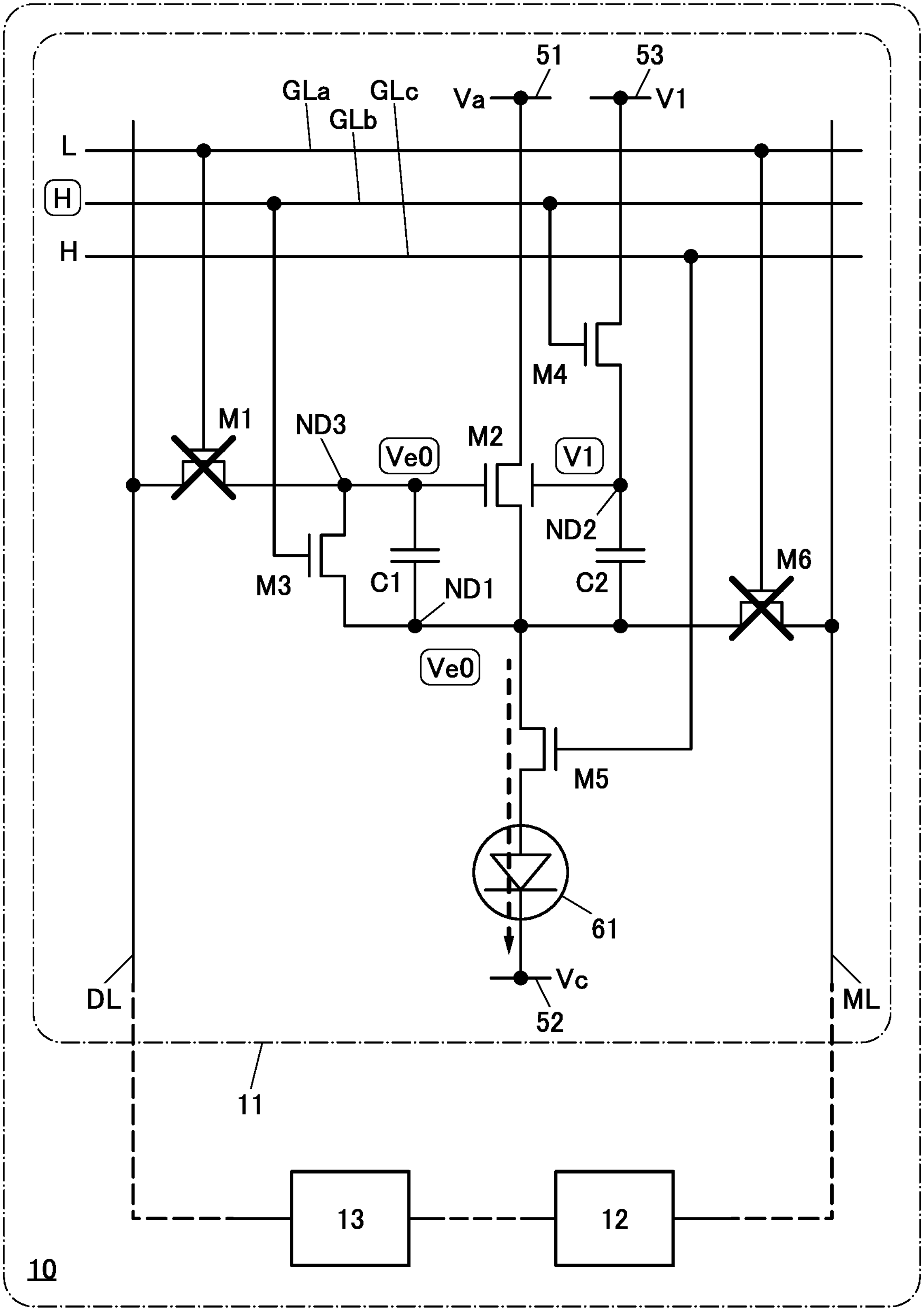
FIG. 7 is a diagram illustrating an operation example of a display apparatus.

Specific operations of the display apparatus 10 in Step S01 to Step S05 are described below with reference to drawings. FIG. 6 is a timing chart showing an operation example of the display apparatus 10. FIG. 7 to FIG. 13 are circuit diagrams each illustrating an operation example of the display apparatus 10.

The wiring DL is supplied with display data Vdata generated in the image processing circuit 13 or a potential V0. The wiring ML is supplied with the potential V0 or a potential Ve1 to a potential Ve4. The wiring 51 is supplied with a potential Va, the wiring 52 is supplied with a potential Vc, and the wiring 53 is supplied with a potential V1. A potential H or a potential L is supplied to each of the wiring GLa, the wiring GLb, and the wiring GLc. The potential H is preferably higher than the potential L. In this specification and the like, the "potential H" is a potential which turns on an n-channel transistor when being input to a gate of the n-channel transistor. The "potential L" is a potential which turns off an n-channel transistor when being input to a gate of the n-channel transistor.

The potential Va is an anode potential and the potential Vc is a cathode potential. The potential V1 is preferably higher than the potential V0. By being applied to the back gate of the transistor M2, the potential V1 may be a potential that can shift the threshold voltage in the negative direction until the transistor M2 becomes normally on. Furthermore, the potential V0 may be a potential that can turn off the transistor M2 by being applied to the gate of the transistor M2. For example, the potential V0 can be 0 V or the potential L. The potential H is preferably higher than the potential V1.

The emission intensity of the light-emitting element 61 included in the pixel 11 is controlled by the amount of a current Ie (see FIG. 13) flowing through the light-emitting element 61. The pixel 11 has a function of controlling the amount of the current Ie in accordance with the display data Vdata supplied from the image processing circuit 13 through the wiring DL.

Note that in this specification and the like, a potential difference (voltage) between a gate and a source of a transistor is referred to as "gate voltage" in some cases. This leads to the equation: "the gate voltage of a transistor"="the gate potential of the transistor−"the source potential of the transistor". In addition, in this embodiment and the like, a potential difference (voltage) between a back gate and a source of a transistor is referred to as a "back gate voltage" in some cases. This leads to the equation: "the back gate voltage of a transistor"="the back gate potential of the transistor"−"the source potential of the transistor".

Note that in the drawings, a symbol showing a potential (also referred to as a "potential symbol") such as "H", "L", "V0", or "V1" is sometimes illustrated adjacent to a terminal, a wiring, or the like, for example. For easy understanding of changes in potentials of terminals, wirings, or the like, a potential symbol of a terminal, a wiring, or the like whose potential has changed is sometimes enclosed. Furthermore, a symbol "×" sometimes overlaps with an off-state transistor.

In this specification and the like, a series of operations in which a transistor is brought into the conduction or non-conduction state and electric charge is supplied to a node that is electrically connected to the transistor to change the potential of the node is referred to as "processing" in some cases.

Correction of Threshold Voltage of Driving Transistor

First, in Step S01, a voltage for correcting the threshold voltage of the transistor M2 is obtained and processing for retaining the voltage in the capacitor C2 is performed.

The current Ie flowing through the light-emitting element 61 is determined mainly by the display data Vdata and the threshold voltage of the transistor M2. Thus, even in the case where the same display data Vdata is supplied to a plurality of pixels, when the threshold voltages of the transistors M2 included in the pixels differ, the currents Ie flow in the pixels are different. Accordingly, variations in the threshold voltage of the transistor M2 are a factor of reducing display quality of the display apparatus.

In view of this, correction is made such that the threshold voltages of the transistors M2 in the pixels are equal, thereby reducing the variation in the current Ie. Note that described in this embodiment is a correction method in which the potential supplied to the back gate of the transistor M2 is changed to make the threshold voltage of the transistor M2 become 0 V.

First, a reset operation is performed in Period T11. Specifically, the potential H is supplied to the wiring GLb and the wiring GLc, and the potential L is supplied to the wiring GLa (see FIG. 7).

Thus, the transistor M3, the transistor M4, and the transistor M5 are turned on, and the transistor M1 and the transistor M6 are turned off.

The potential of the node ND1 becomes a potential Ve0. The potential of the node ND3 also becomes the potential Ve0 through the transistor M3. The potential Ve0 is higher than the potential Vc by a voltage drop in the light-emitting element 61. The potential V1 is supplied to the node ND2 through the transistor M4. Application of "the potential V1−the potential Ve0" as the back gate voltage of the transistor M2 brings the transistor M2 into a normally-on state.

Figure 8:
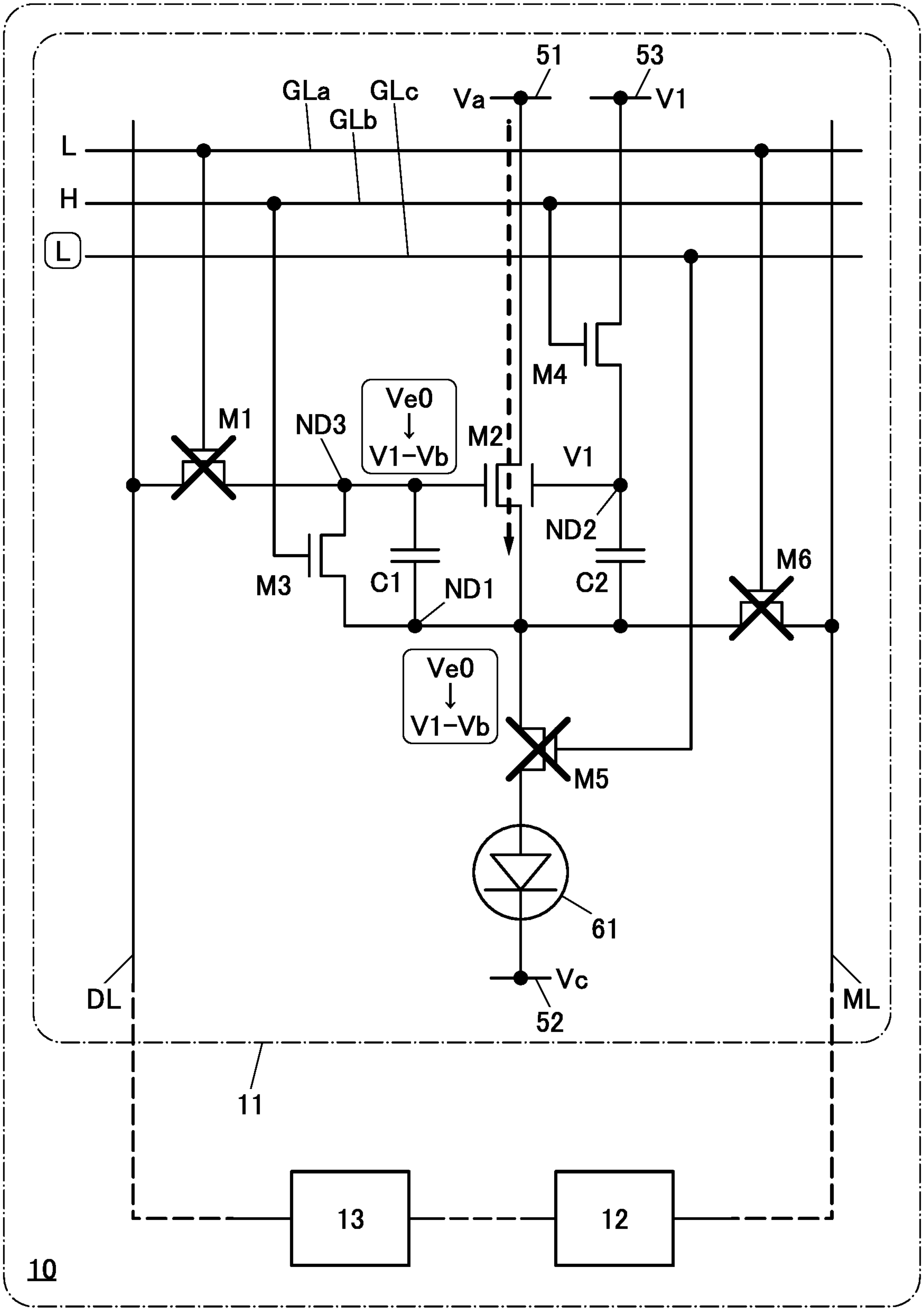
FIG. 8 is a diagram illustrating an operation example of a display apparatus.

Next, in Period T12, the potential L is supplied to the wiring GLc (see FIG. 8). This turns off the transistor M5.

Immediately after the transistor M5 is turned off, the transistor M2 is in a normally-on state because the back gate voltage of the transistor M2 is "the potential V1−the potential Ve0". Electric charge is supplied from the wiring 51 to the node ND1 through the transistor M2, and thus the potential of the node ND1 increases over time. Since the transistor M3 is in an on state, the potential of the node ND3 also increases similarly. As the potential of the node ND1 gradually increases, the back gate voltage of the transistor M2 gradually decreases. In other words, the threshold voltage of the transistor M2 gradually shifts in the positive direction. Then, finally, when the threshold voltage of the transistor M2 is as close to 0 V as possible, the transistor M2 is turned off to stop the increase in the potential of the node ND1. In this case, the back gate voltage at which the threshold voltage of the transistor M2 is 0 V is referred to as Vb. That is, when the increase in the potential of the node ND1 stops, the potential of the node ND1 becomes "the potential V1−Vb."

Figure 9:
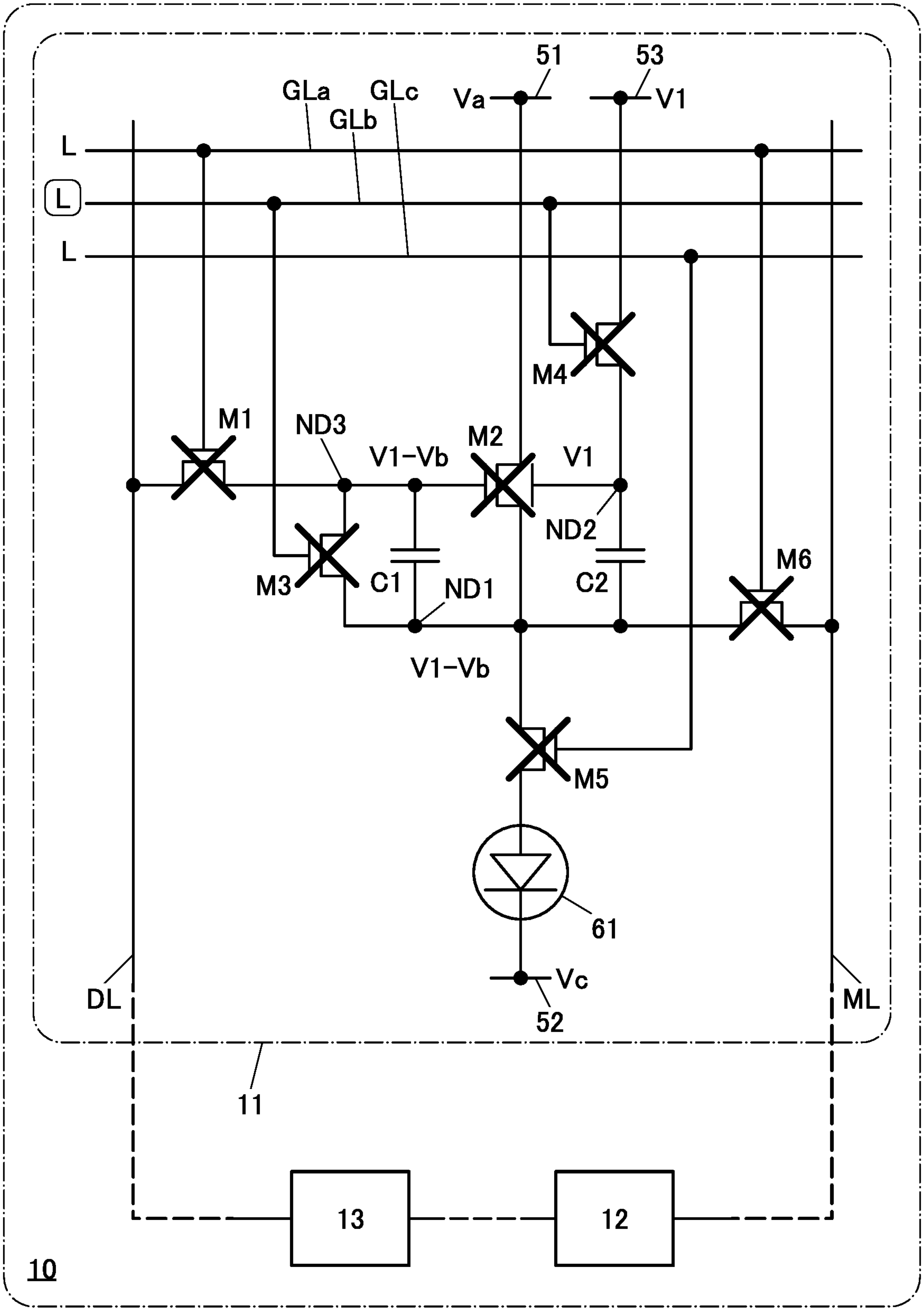
FIG. 9 is a diagram illustrating an operation example of a display apparatus.
Figure 10:
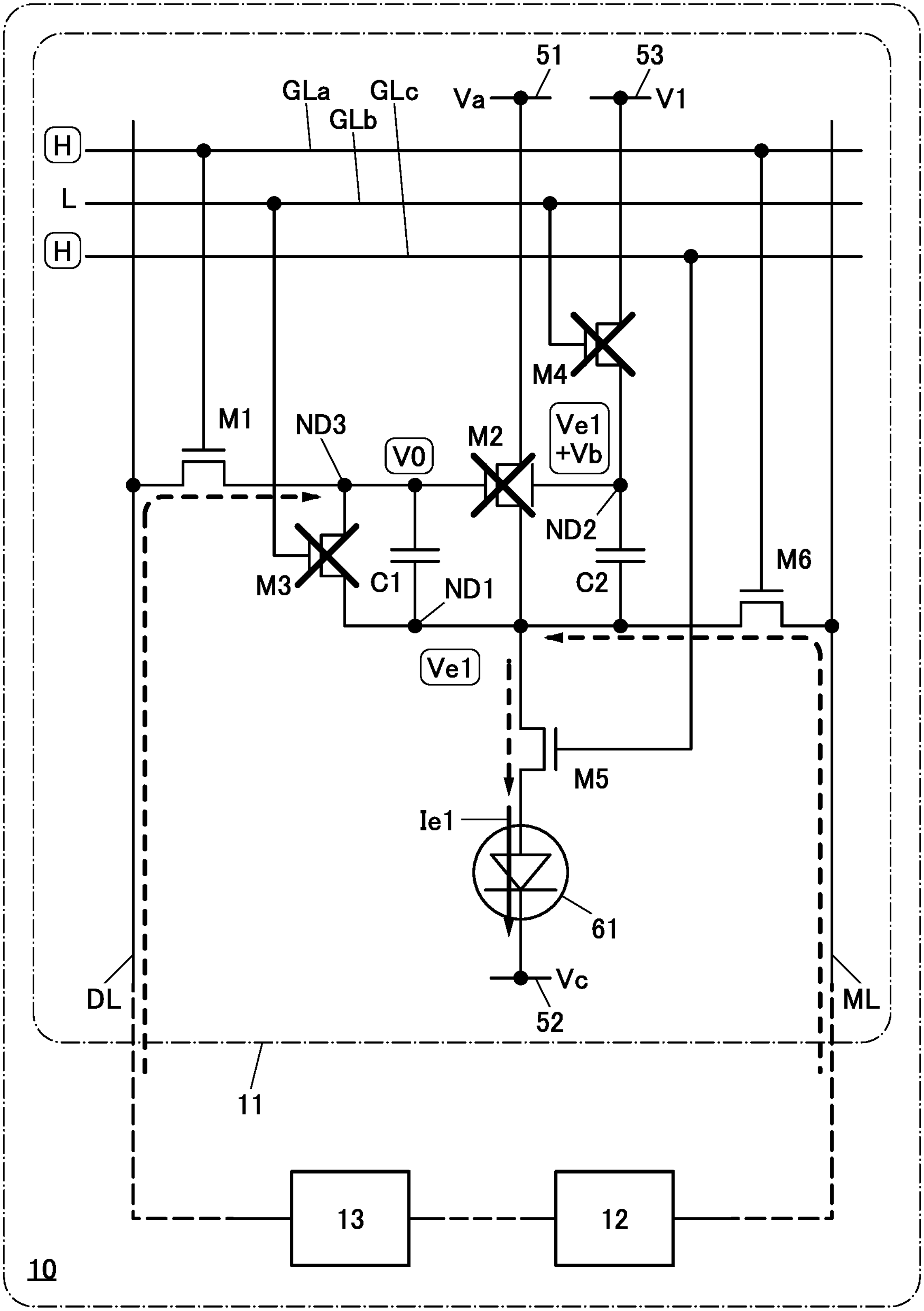
FIG. 10 is a diagram illustrating an operation example of a display apparatus.

Next, in Period T13, the potential L is supplied to the wiring GLb (see FIG. 9). This turns off the transistor M3 and the transistor M4. Accordingly, the node ND2 and the node ND3 are brought into a floating state; hence, electric charge supplied to the nodes is retained. That is, the state where Vb obtained in Period T12 is applied as the back gate voltage of the transistor M2 is maintained.

Through the processing in Period T11 to Period T13, correction is performed such that the threshold voltage of the transistor M2 becomes 0 V and the state subjected to correction can be maintained. Note that in this embodiment and the like, such a correction method of a display apparatus is sometimes referred to as internal correction.

Acquirement of Current Voltage Characteristics of Light-Emitting Element

Next, in Step S02, the monitor circuit 12 performs processing for measuring current flowing through the light-emitting element 61 and obtaining the current voltage characteristics of the light-emitting element 61.

The emission intensity of the light-emitting element 61 is determined by the current Ie flowing through the light-emitting element 61. In addition, the current Ie flowing through the light-emitting element 61 is determined by a potential difference (voltage) between the anode terminal and the cathode terminal of the light-emitting element 61. The characteristics of the light-emitting elements 61 between pixels vary or deteriorate over time, for example, in some cases. Thus, even when the aforementioned correction of the threshold voltage of a driving transistor is performed, the emission intensity of the light-emitting elements 61 finally vary and a decrease in display quality of the display apparatus, such as display unevenness, is caused in some cases.

In view of above, by obtaining the current voltage characteristics of the light-emitting element 61 and correcting image data using the obtained current voltage characteristics, a decrease in display quality of the display apparatus caused by, for example, variations in characteristics or characteristics deterioration of the light-emitting elements 61, can be reduced.

An example of processing for obtaining the current voltage characteristics of the light-emitting element 61 is described. First, in Period T21, the potential H is supplied to the wiring GLa and the wiring GLc and the potential L is supplied to the wiring GLb (see FIG. 10). Then, the transistor M1, the transistor M5, and the transistor M6 are turned on and the transistor M3 and the transistor M4 are turned off. When the potential V0 is supplied to the wiring DL, the transistor M2 is turned off.

The potential Ve1 is supplied from the monitor circuit 12 to the wiring ML. Note that the potential Ve1 is preferably higher than the potential V0. As a result, the potential Ve1 is supplied to the anode terminal of the light-emitting element 61 through the transistor M6 and the transistor M5. Then, a voltage corresponding to "the potential Ve1−the potential Vc" is applied to both ends (between the anode terminal and the cathode terminal) of the light-emitting element 61, and a current Ie1 corresponding to the applied voltage flows to the light-emitting element 61. The current Ie1 flows from the monitor circuit 12 to the light-emitting element 61 through the wiring ML, the transistor M6, the node ND1, and the transistor M5. Thus, the current Ie1 can be measured by the monitor circuit 12. That is, the current Ie1 flowing when the voltage corresponding to "the potential Ve1−the potential Vc" is applied to the both ends of the light-emitting element 61 can be obtained.

Next, in Period T22, the potential Ve2 is supplied from the monitor circuit 12 to the wiring ML while the potentials of the wiring GLa, the wiring GLb, the wiring GLc, and the wiring DL are maintained. As a result, as in Period T21, a current Ie2 flowing when a voltage corresponding to "the potential Ve2−the potential Vc" is applied to the both ends of the light-emitting element 61 can be obtained. Similarly, in Period T23, when the potential Ve3 is supplied to the wiring ML, a current Ie3 flowing when a voltage corresponding to "the potential Ve3−the potential Vc" is applied to the both ends of the light-emitting element 61 can be obtained. Similarly, in Period T24, when the potential Ve4 is supplied to the wiring ML, the current Ie4 flowing when a voltage corresponding to "the potential Ve4−the potential Vc" is applied to the both ends of the light-emitting element 61 can be obtained. Note that when the potential L is supplied to the wiring GLa and the wiring GLc after Period T24 is terminated, the transistor M1, the transistor M5, and the transistor M6 are turned off.

By performing the processing in Period T21 to Period T24, the current Ie1 to the current Ie4 flowing through the light-emitting element 61 can be measured when the potential Ve1 to the potential Ve4 are supplied to the anode terminal of the light-emitting element 61. That is, the current voltage characteristics of the light-emitting element 61 can be obtained.

Although an example in which four pieces of characteristics data are obtained in the case where a value of the voltage applied to the both ends of the light-emitting element 61 and a value of the current flowing through the light-emitting element 61 are regarded as a piece of characteristics data is described here, one embodiment of the present invention is not limited to this example. The number of characteristics data obtained may be two, three, five, or larger. As the number of characteristics data obtained is larger, more accurate current voltage characteristics of the light-emitting element 61 can be obtained.

Correction of Image Data

Next, in Step S03, image data is corrected using the current voltage characteristics of the light-emitting element 61 obtained in Step S02, whereby the display data Vdata is generated.

For example, the current voltage characteristics of the light-emitting elements 61 in the pixels may be obtained and image data may be corrected to cancel the variations. For example, an image data correction amount ΔVthO for each pixel is obtained and image data is corrected by the formula "display data Vdata=image data+ΔVthO", whereby the display data Vdata can be generated.

Through the processing in Step S02 and Step S03, image data correction can be performed using the current voltage characteristics of the light-emitting element 61. Note that in this embodiment and the like, such a correction method of a display apparatus is sometimes referred to as "external correction".

Although an example in which the current voltage characteristics of the light-emitting element 61 are obtained and image data is corrected is described as external correction in this embodiment, one embodiment of the present invention is not limited to this example. For example, image data may be corrected by obtaining the characteristics of the driving transistor, or image data may be corrected by obtaining characteristics of both the light-emitting element 61 and the driving transistor.

Writing of Display Data

Next, in Step S04, processing for writing the display data Vdata to the pixel 11 is performed.

Figure 11:
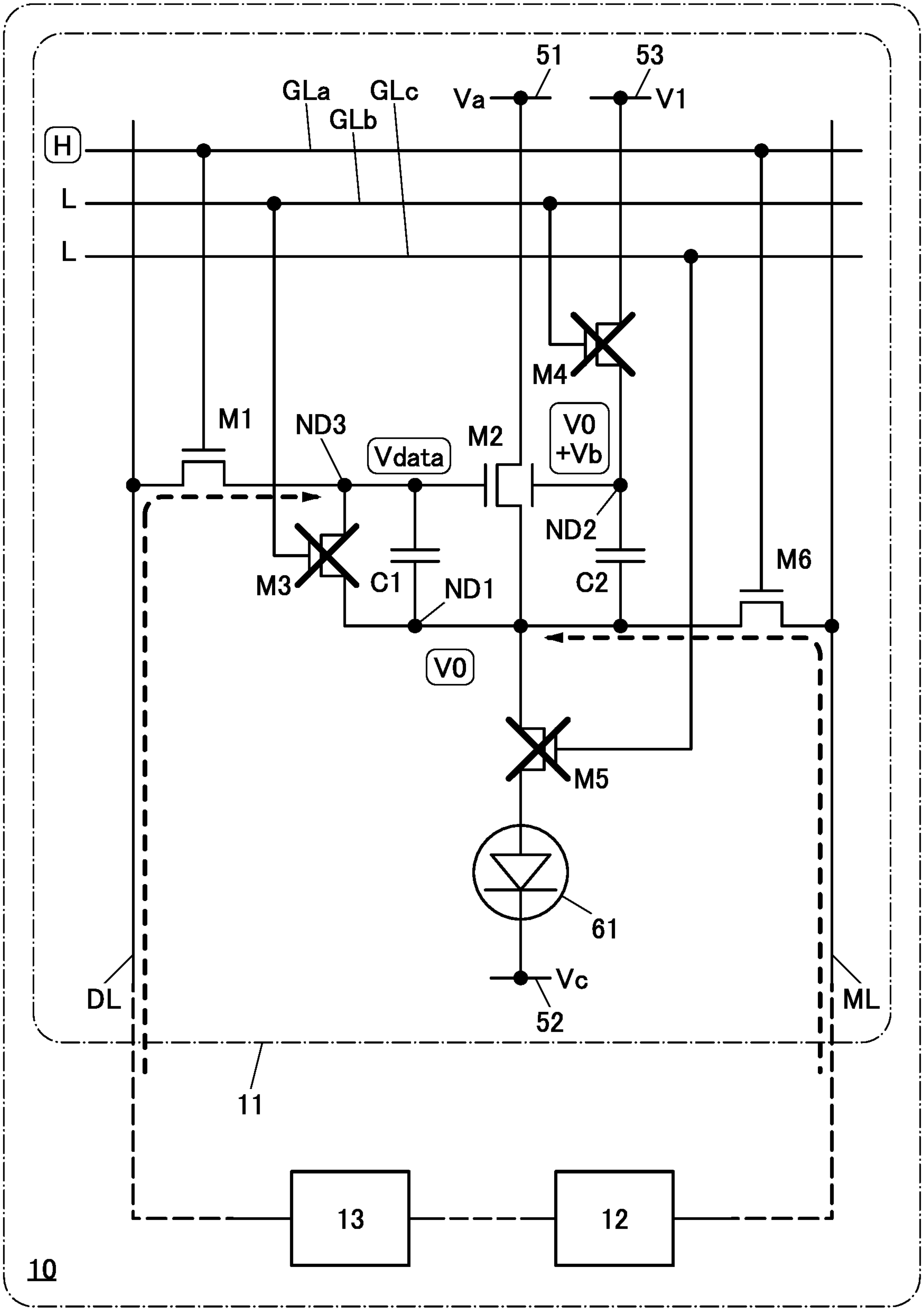
FIG. 11 is a diagram illustrating an operation example of a display apparatus.

In Period T31, the potential H is supplied to the wiring GLa, and the potential L is supplied to the wiring GLb and the wiring GLc (see FIG. 11). This turns on the transistor M1, so that the display data Vdata is supplied to the node ND3. Furthermore, the transistor M6 is turned on, so that the potential V0 is supplied to the node ND1. In other words, "the display potential Vdata−the potential V0" is applied as the gate voltage of the transistor M2.

The node ND1 and the node ND2 are capacitively coupled through the capacitor C2; thus, when the potential of the node ND1 changes to the potential V0, the potential of the node ND2 also changes to the potential V0+Vb in a similar manner. That is, the display data Vdata can be written while the state where Vb is applied to the back gate voltage of the transistor M2 and the threshold voltage of the transistor M2 is corrected to 0 V is maintained.

Figure 12:
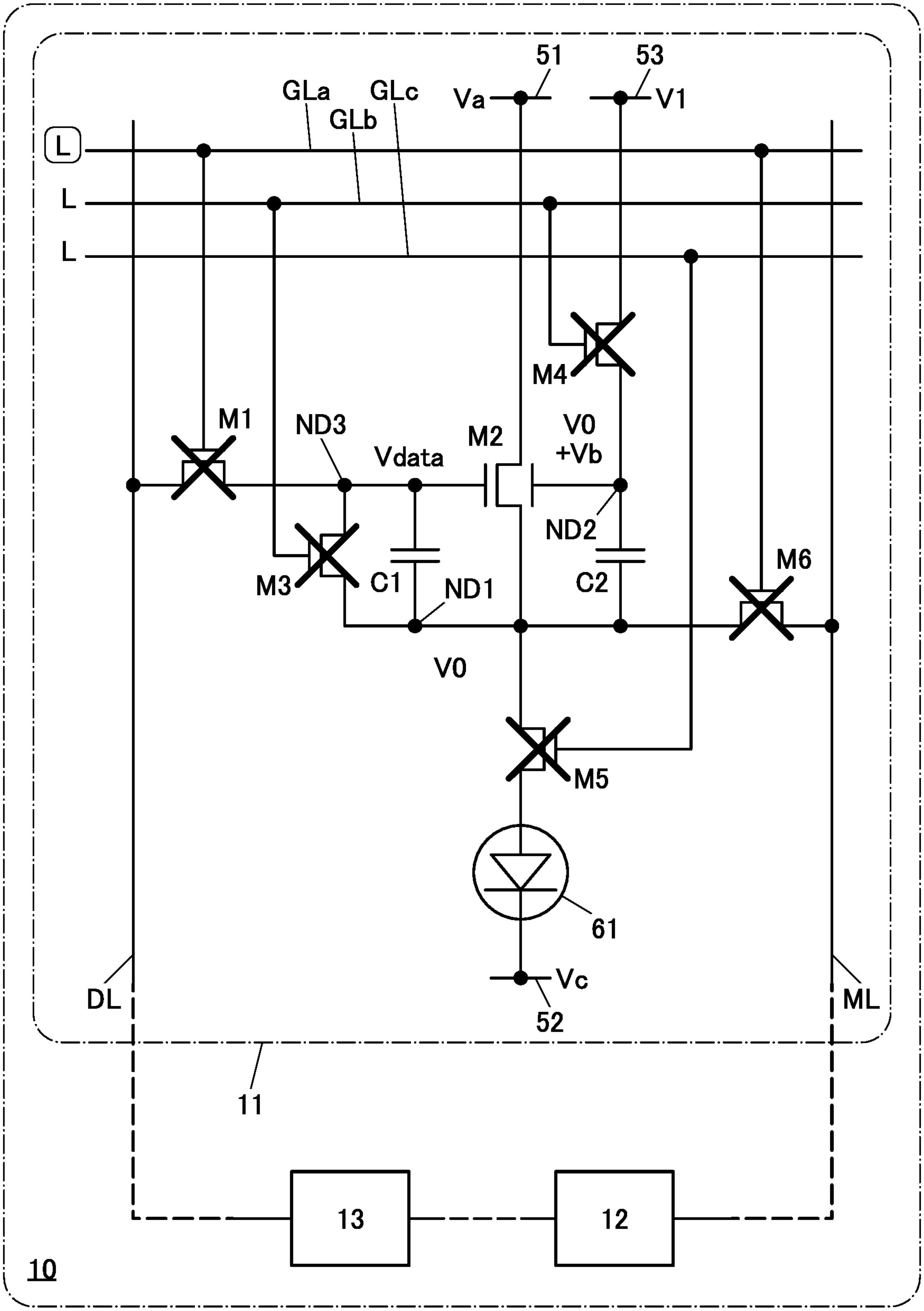
FIG. 12 is a diagram illustrating an operation example of a display apparatus.

Next, in Period T32, the potential L is supplied to the wiring GLa (see FIG. 12). Then, the transistor M1 is turned off and the node ND3 is brought into a floating state. The transistor M6 is turned off and electric charge is supplied from the wiring 51 to the node ND1 through the transistor M2, so that the potential of the node ND1 gradually increases.

Here, the node ND3 is in a floating state, and the node ND1 and the node ND3 are capacitively coupled through the capacitor C1. Accordingly, in accordance with the increase in the potential of the node ND1, the potential of the node ND3 also increases. That is, the gate voltage of the transistor M2 remains at the display data Vdata−the potential V0. Similarly, the node ND2 is in a floating state, and the node ND1 and the node ND2 are capacitively coupled through the capacitor C2. Accordingly, in accordance with the increase in the potential of the node ND1, the potential of the node ND2 also increases. That is, the back gate voltage of the transistor M2 remains at Vb.

Light Emission of Light-Emitting Element

Figure 13:
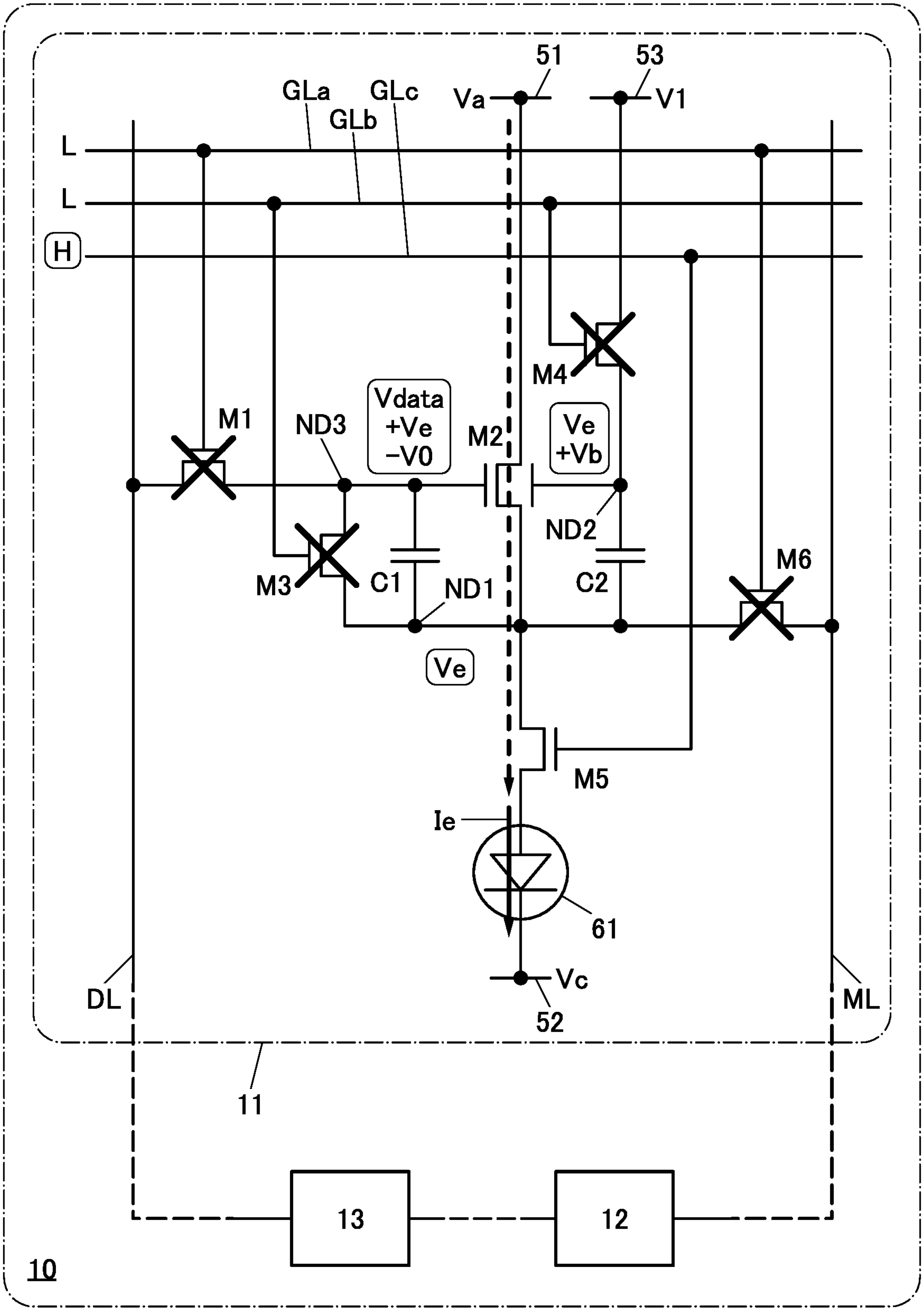
FIG. 13 is a diagram illustrating an operation example of a display apparatus.

Next, in Period T33, the potential H is supplied to the wiring GLc (see FIG. 13). Then, the transistor M5 is turned on and current flows from the wiring 51 to the wiring 52. That is, the current Ie flows through the light-emitting element 61, and the light-emitting element 61 emits light with emission intensity corresponding to the current Ie.

The current flow from the wiring 51 to the wiring 52 changes the potential of the node ND1. As in Period T32 described above, the node ND2 and the node ND3 are in a floating state. Thus, the gate voltage of the transistor M2 remains at "the display data Vdata−the potential V0", and the back gate voltage of the transistor M2 remains at Vb.

Here, the current Ie is determined by the gate voltage and the back gate voltage of the transistor M2. That is, the current Ie has a value proportional to the square of ("the gate voltage of the transistor M2"−"the threshold voltage of the transistor M2"). The state where "the display data Vdata−the potential V0" is applied as the gate voltage of the transistor M2 is maintained. Furthermore, the state where Vb is applied as the back gate voltage of the transistor M2 is maintained. In other words, the state where correction is performed so that the threshold voltage of the transistor M2 becomes 0 V is maintained. That is, the current Ie becomes a value proportional to the square of (the display data Vdata−the potential V0) and a state where a current, the amount of which does not depends on the threshold voltage of the transistor M2, flows is maintained.

In the display apparatus 10 of one embodiment of the present invention, the threshold voltage of the transistor M2 is corrected by internal correction, and the current voltage characteristics of the light-emitting element 61 are corrected by external correction, whereby the display quality of the display apparatus 10 can be increased.

Example 2 of Correction Operation of Display Apparatus

Note that the correction method of the display apparatus of one embodiment of the present invention is not limited to the above description. In the correction method of the display apparatus of one embodiment of the present invention, correction of the threshold voltage of the driving transistor in Step S01 and correction of image data in Step S03 are both terminated before writing of display data in Step S04.

Figure 14:
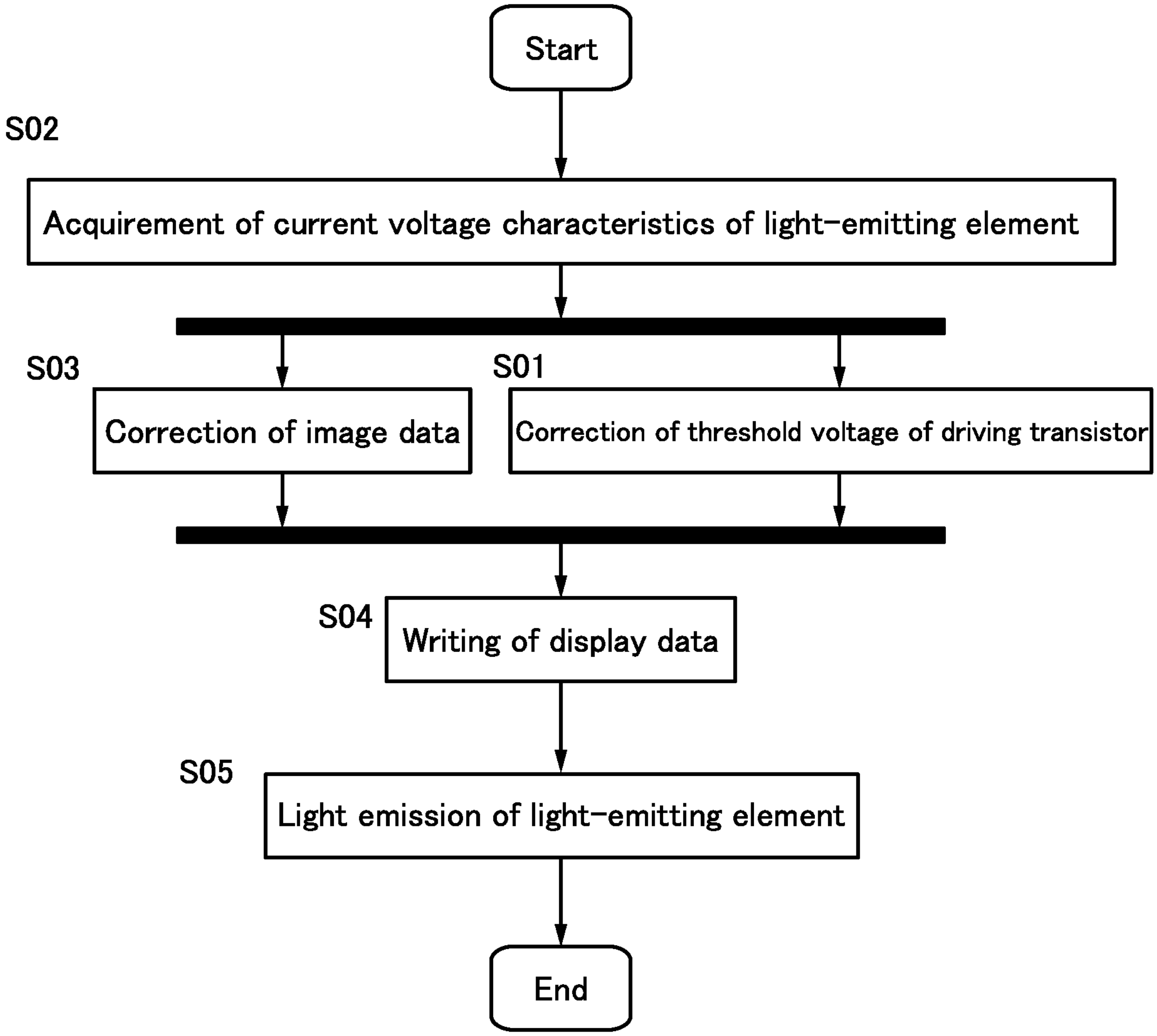
FIG. 14 is a flow chart showing an example of a correction method of a display apparatus.

FIG. 14 is a flow chart showing another example of a correction method of the display apparatus 10. The correction method of the display apparatus shown in FIG. 14 differs from the correction method of the display apparatus shown in FIG. 5 in the order of executing Step S01 to Step S05. First, Step S02 starts. After Step S02 is terminated, Step S01 and Step S03 start. After Step S01 and Step S03 are terminated, Step S04 starts. After Step S04 is terminated, Step S05 starts. Note that the above description can be referred to for the operation of the display apparatus 10 in Step S01 to Step S05.

Note that Step S01 is processing in the pixel 11 and Step S03 is processing in the image processing circuit 13. Thus, Step S01 and Step S03 can be performed at the same time. That is, Step S01 and Step S03 may start at the same time after Step S02. Performing Step S01 and Step S03 at the same time can reduce the time taken for correction of the display apparatus 10. Consequently, the operating speed of the display apparatus 10 can be increased.

Specific Structure Example of Display Apparatus

Figure 15:
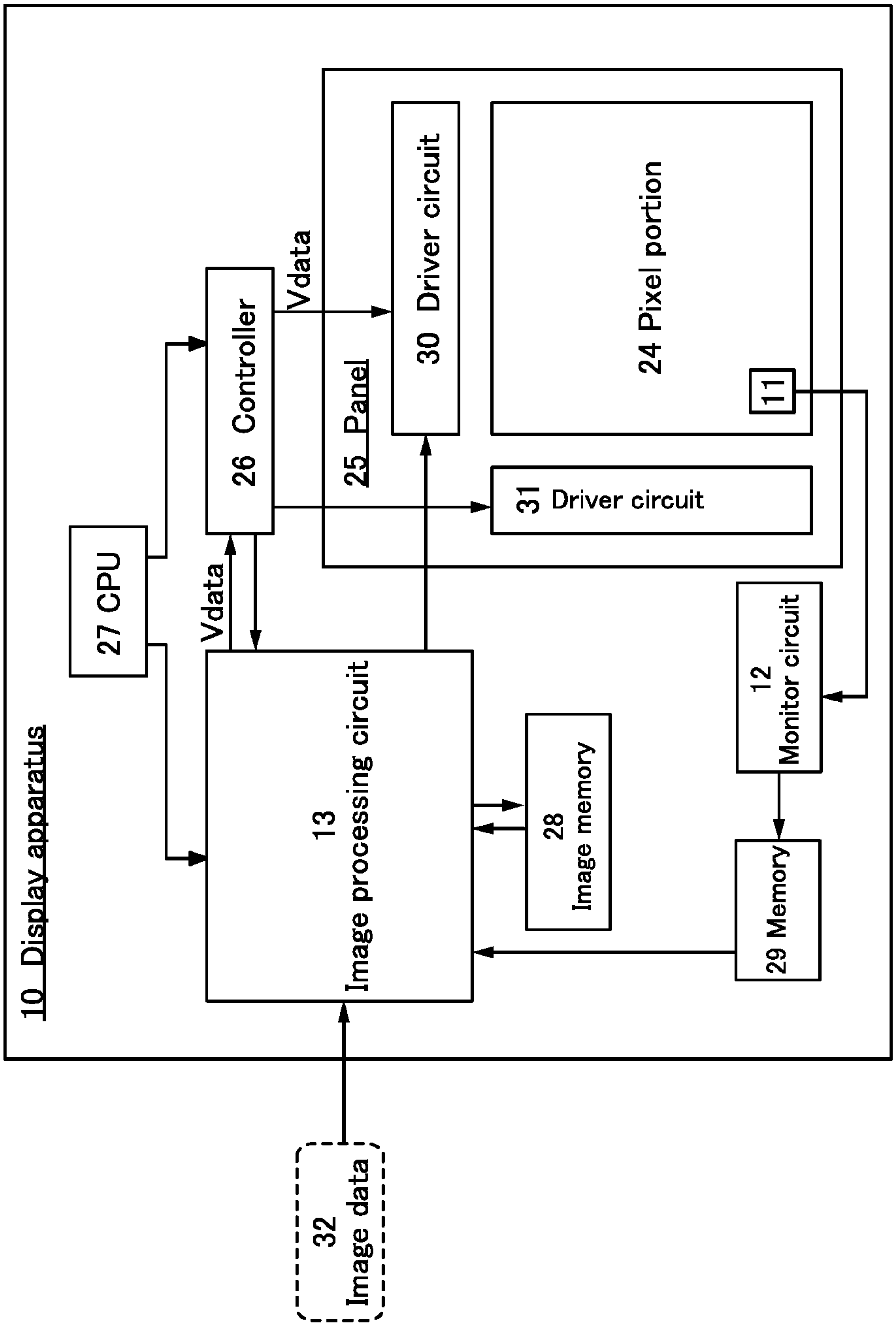
FIG. 15 is a diagram illustrating an example of a specific structure of a display apparatus.

Next, an example of a more detailed structure of the display apparatus 10 illustrated in FIG. 1 is described. FIG. 15 is an example of a block diagram illustrating the structure of the display apparatus 10 of one embodiment of the present invention. Although in the block diagram, components are classified by their functions and illustrated as independent blocks, it is difficult to completely divide actual components according to their functions and one component can relate to a plurality of functions.

The display apparatus 10 illustrated in FIG. 15 includes a panel 25 including a plurality of pixels 11 in a pixel portion 24, a controller 26, a CPU 27, an image processing circuit 13, an image memory 28, a memory 29, and the monitor circuit 12. In addition, the display apparatus 10 illustrated in FIG. 15 includes a driver circuit 30 and a driver circuit 31 in the panel 25.

The CPU 27 has a function of decoding an instruction input from the outside or an instruction stored in a memory provided in the CPU 27 and executing the instruction by controlling the operation of various circuits included in the display apparatus 10.

The monitor circuit 12 has a function of supplying a given potential to the pixel 11 and measuring current flowing through the pixel 11. In addition, the monitor circuit 12 has a function of generating given data (e.g., the current voltage characteristics of the light-emitting element 61) based on the measured current. The memory 29 has a function of storing the information included in the signal. For example, a volatile memory, such as a DRAM or an SRAM, or a nonvolatile memory, such as a flash memory, an MRAM, a magnetic memory, a magnetic disk, or a magneto-optical disk, may be used as the memory 29. For example, when a nonvolatile memory is used as the memory 29, information of the pixels can be stored even after the power supply is stopped; thus, the operation of measuring a current flowing through the pixel 11 is not necessarily always performed. For example, only before shipment of a product, immediately before stop of power supply, and immediately after start of power supply, operation of measuring a current flowing through the pixel 11 can be performed and the information can be stored in the memory 29.

The image memory 28 has a function of storing image data 32 which is input to the display apparatus 10. Note that although FIG. 15 illustrates an example in which just one image memory 28 is provided in the display apparatus 10, a plurality of image memories 28 may be provided in the display apparatus 10. For example, in the case where the pixel portion 24 displays a full-color image with the use of three pieces of image data 32 corresponding to hues such as red, blue, and green, three image memories 28 corresponding to the three pieces of image data 32 may be provided.

For the image memory 28, a memory circuit such as a DRAM (Dynamic Random Access Memory) or an SRAM (Static Random Access Memory) can be used. Alternatively, a VRAM (Video RAM) may be used as the image memory 28.

The image processing circuit 13 has functions of writing the image data 32 to the image memory 28 and reading the image data 32 from the image memory 28 in response to an instruction from the CPU 27 and generating the display data Vdata from the image data 32. In addition, the image processing circuit 13 has a function of reading the information stored in the memory 29 in response to an instruction from the CPU 27 and correcting the image data using the information. Here, the memory 29 stores given data (e.g., the current voltage characteristics of the light-emitting element 61) generated in the monitor circuit 12. That is, the image data 32 can be corrected using the current voltage characteristics of the light-emitting element 61, for example.

When the display data Vdata including image data is input to the controller 26, the controller 26 has a function of performing signal processing on the display data Vdata in accordance with the specifications of the panel 25 and supplying the display data Vdata to the panel 25.

The driver circuit 31 has a function of selecting a plurality of pixels 11 included in the pixel portion 24 row by row. The driver circuit 30 has a function of supplying the display data Vdata supplied from the controller 26 to the pixels 11 in a row selected by the driver circuit 31.

Note that, for example, the controller 26 has a function of supplying various driving signals used for driving the driver circuit 30, the driver circuit 31, and the like to the panel 25. The driving signals include a start pulse signal SSP which controls the operation of the driver circuit 30, a clock signal SCK, a latch signal LP, a start pulse signal GSP which controls the operation of the driver circuit 31, and a clock signal GCK, for example.

Note that the display apparatus 10 may include, for example, an input device having a function of supplying information or an instruction to the CPU 27 included in the display apparatus 10. As the input device, a keyboard, a pointing device, a touch panel, a sensor, or the like can be used, for example.

The structure described in this embodiment can be used in an appropriate combination with any of the structures described in the other embodiments.

Embodiment 2

In this embodiment, structure examples of a display apparatus that can employ the correction method of one embodiment of the present invention will be described. A display apparatus described below as an example can be employed for, for example, the pixel 11 or the like in Embodiment 1.

One embodiment of the present invention is a display apparatus including a light-emitting element (also referred to as a light-emitting device). The display apparatus includes two or more light-emitting elements that emit light of different colors. Each of the light-emitting element includes a pair of electrodes and an EL layer therebetween. The light-emitting elements are preferably organic EL elements (organic electroluminescent elements). The two or more light-emitting elements that emit light of different colors include EL layers containing different light-emitting materials. For example, when three kinds of light-emitting elements that emit red (R), green (G), and blue (B) light are included, a full-color display apparatus can be achieved.

In the case of manufacturing a display apparatus including a plurality of light-emitting elements of different emission colors, layers (light-emitting layers) containing at least light-emitting materials each need to be formed in an island shape. In the case of separately forming some or all of EL layers, for example, a method for forming an island-shaped organic film by an evaporation method using a shadow mask such as a metal mask is known. However, this method causes a deviation from the designed shape and position of the island-shaped organic film due to various influences such as the accuracy of the metal mask, the positional deviation between the metal mask and a substrate, a warp of the metal mask, and expansion of the outline of a deposited film due to vapor scattering, for example; accordingly, it is difficult to achieve the high definition and high aperture ratio. In addition, the outline of the layer might blur during evaporation, so that the thickness of an end portion might be reduced. That is, the thickness of an island-shaped light-emitting layer might vary from place to place. In addition, in the case of manufacturing a display apparatus with a large size, high resolution, or high definition, for example, a manufacturing yield might be reduced because of low dimensional accuracy of the metal mask and deformation due to heat or the like. Thus, a measure has been taken for a pseudo increase in definition (also referred to as pixel density) by employing a unique pixel arrangement such as a PenTile arrangement.

Note that in this specification and the like, the term "island shape" refers to a state where two or more layers formed using the same material in the same step are physically separated from each other. For example, the term "island-shaped light-emitting layer" refers to a state where the light-emitting layer and its adjacent light-emitting layer are physically separated from each other.

In one embodiment of the present invention, fine patterning of EL layers is performed by photolithography without using, for example, a shadow mask such as a fine metal mask (an FMM). Accordingly, it is possible to achieve a display apparatus with high definition and a high aperture ratio, which has been difficult to achieve. Moreover, since the EL layers can be formed separately, it is possible to achieve a display apparatus that performs extremely clear display with high contrast and high display quality. Note that, fine patterning of the EL layers may be performed using both a metal mask and photolithography, for example.

In addition, some or all of the EL layers can be physically divided from each other. This can inhibit leakage current flowing between adjacent light-emitting elements through a layer (also referred to as a common layer) shared by the light-emitting elements. Thus, it is possible to prevent crosstalk due to unintended light emission, so that a display apparatus with extremely high contrast can be achieved. In particular, a display apparatus having high current efficiency at low luminance can be achieved.

Note that in one embodiment of the present invention, the display apparatus can be also obtained by combining a light-emitting element that emits white light with a color filter. In that case, light-emitting elements having the same structure can be employed as light-emitting elements provided in pixels (subpixels) that emit light of different colors, which allows all the layers to be common layers. In addition, some or all of the EL layers are divided from each other by photolithography. Thus, leakage current through the common layer is suppressed; accordingly, a high-contrast display apparatus can be achieved. In particular, when an element has a tandem structure in which a plurality of light-emitting layers are stacked with a highly conductive intermediate layer therebetween, leakage current through the intermediate layer can be effectively prevented, so that a display apparatus with high luminance, high definition, and high contrast can be achieved.

Furthermore, an insulating layer covering at least a side surface of the island-shaped light-emitting layer is preferably provided. The insulating layer may cover part of a top surface of an island-shaped EL layer. For the insulating layer, a material having a barrier property against water and oxygen is preferably used. For example, an inorganic insulating film that is less likely to diffuse water or oxygen can be used. This can inhibit degradation of the EL layer and can achieve a highly reliable display apparatus.

Moreover, between two adjacent light-emitting elements, there is a region (a concave portion) where none of the EL layers of the light-emitting elements is provided. In the case where a common electrode or a common electrode and a common layer are formed to cover the concave portion, a phenomenon where the common electrode is divided by a step at an end portion of the EL layer (such a phenomenon is also referred to as disconnection) might occur, which might cause insulation of the common electrode over the EL layer. In view of this, a local gap between the two adjacent light-emitting elements is preferably filled with a resin layer (also referred to as local filling planarization, or LFP) functioning as a planarization film. The resin layer has a function of a planarization film. This structure can inhibit disconnection of the common layer or the common electrode and can achieve a highly reliable display apparatus.

More specific structure examples of the display apparatus according to one embodiment of the present invention will be described below with reference to drawings.

Structure Example 1

Figure 16A:
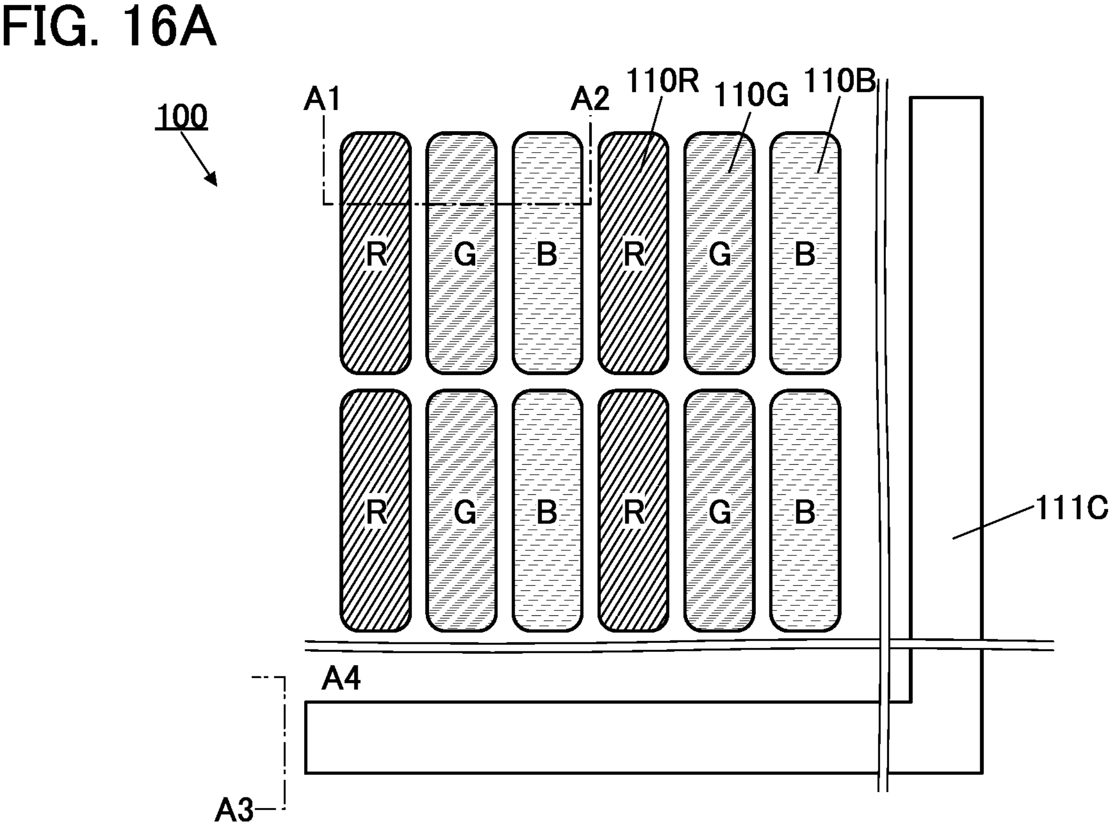
FIG. 16A to FIG. 16C are diagrams illustrating a structure example of a display apparatus.

FIG. 16A illustrates a schematic top view of a display apparatus 100 according to one embodiment of the present invention. The display apparatus 100 includes, over a substrate 101, a plurality of light-emitting elements 110R exhibiting red, a plurality of light-emitting elements 110G exhibiting green, and a plurality of light-emitting elements 110B exhibiting blue. In FIG. 16A, light-emitting regions of the light-emitting elements are denoted by R, G, and B to easily differentiate the light-emitting elements.

The light-emitting elements 110R, the light-emitting elements 110G, and the light-emitting elements 110B are each arranged in a matrix. FIG. 16A illustrates what is called a stripe arrangement, in which the light-emitting elements that emit light of the same color are arranged in one direction. Note that an arrangement method of the light-emitting elements is not limited thereto; for example, an arrangement method such as an S-stripe arrangement, a delta arrangement, a Bayer arrangement, or a zigzag arrangement may be employed, or a PenTile arrangement, a diamond arrangement, or the like can be also used.

As each of the light-emitting elements 110R, the light-emitting elements 110G, and the light-emitting elements 110B, an OLED (Organic Light Emitting Diode) or a QLED (Quantum-dot Light Emitting Diode) is preferably used, for example. As a light-emitting substance contained in the EL element, a substance that emits fluorescent light (a fluorescent material), a substance that emits phosphorescent light (a phosphorescent material), an inorganic compound (a quantum dot material or the like), and a substance that exhibits thermally activated delayed fluorescence (a thermally activated delayed fluorescent (TADF) material) can be given, for example.

FIG. 16A also illustrates a connection electrode 111C that is electrically connected to a common electrode 113. The connection electrode 111C is supplied with a potential (e.g., an anode potential or a cathode potential) that is to be supplied to the common electrode 113. The connection electrode 111C is, for example, provided outside a display region where the light-emitting elements 110R and the like are arranged.

The connection electrode 111C can be provided along the outer periphery of the display region. For example, the connection electrode 111C may be provided along one side of the outer periphery of the display region, or the connection electrode 111C may be provided across two or more sides of the outer periphery of the display region. That is, in the case where the display region has a rectangular top surface shape, the top surface shape of the connection electrode 111C can be, for example, a band shape (a rectangle), an L shape, a U shape (a square bracket shape), a quadrangular shape, or the like.

Figure 16B:
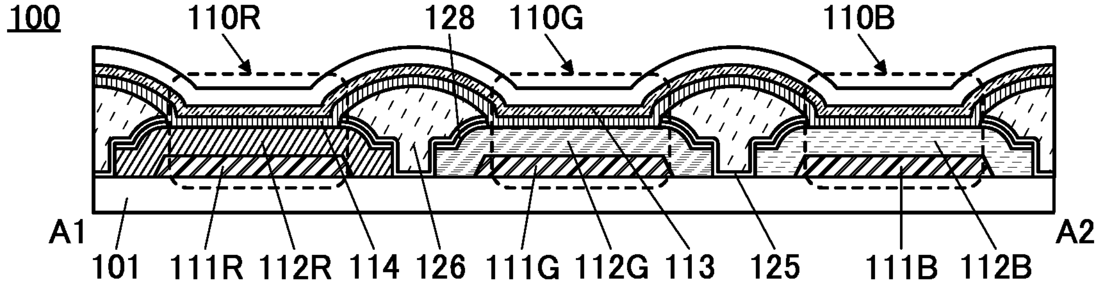
Figure 16C:
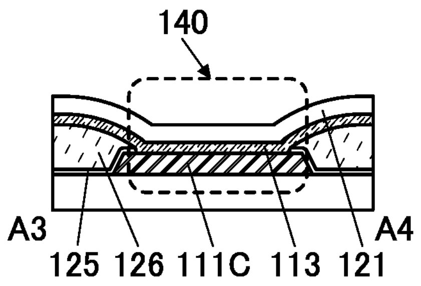

FIG. 16B and FIG. 16C are schematic cross-sectional views corresponding to the dashed-dotted line A1-A2 and the dashed-dotted line A3-A4 in FIG. 16A. FIG. 16B illustrates a schematic cross-sectional view of the light-emitting element 110R, the light-emitting element 110G, and the light-emitting element 110B, and FIG. 16C illustrates a schematic cross-sectional view of a connection portion 140 where the connection electrode 111C and the common electrode 113 are connected to each other.

The light-emitting element 110R includes a pixel electrode 111R, an organic layer 112R, a common layer 114, and the common electrode 113. The light-emitting element 110G includes a pixel electrode 111G, an organic layer 112G, the common layer 114, and the common electrode 113. The light-emitting element 110B includes a pixel electrode 111B, an organic layer 112B, the common layer 114, and the common electrode 113. The common layer 114 and the common electrode 113 are provided to be shared by the light-emitting element 110R, the light-emitting element 110G, and the light-emitting element 110B.

The organic layer 112R included in the light-emitting element 110R contains at least a light-emitting organic compound that emits light with intensity in a red wavelength range. The organic layer 112G included in the light-emitting element 110G contains at least a light-emitting organic compound that emits light with intensity in a green wavelength range. The organic layer 112B included in the light-emitting element 110B contains at least a light-emitting organic compound that emits light with intensity in a blue wavelength range. Each of the organic layer 112R, the organic layer 112G, and the organic layer 112B can be also referred to as an EL layer and includes at least a layer containing a light-emitting organic compound (a light-emitting layer).

Hereinafter, the term "light-emitting element 110" is sometimes used to describe matters common to the light-emitting element 110R, the light-emitting element 110G, and the light-emitting element 110B. Similarly, for example, in the description of matters common to components that are distinguished from each other using alphabets, such as the organic layer 112R, the organic layer 112G, and the organic layer 112B, reference numerals without alphabets are sometimes used.

The organic layer 112 and the common layer 114 can each independently include one or more of an electron-injection layer, an electron-transport layer, a hole-injection layer, and a hole-transport layer. For example, it is possible to employ a structure in which the organic layer 112 includes a stacked-layer structure of a hole-injection layer, a hole-transport layer, a light-emitting layer, and an electron-transport layer from the pixel electrode 111 side and the common layer 114 includes an electron-injection layer.

The pixel electrode 111R, the pixel electrode 111G, and the pixel electrode 111B are provided for the respective light-emitting elements. In addition, the common layer 114 and the common electrode 113 are each provided as a continuous layer shared by the light-emitting elements. A conductive film having a property of transmitting visible light is used for either the pixel electrodes or the common electrode 113, and a conductive film having a reflective property is used for the other. When the respective pixel electrodes are light-transmitting electrodes and the common electrode 113 is a reflective electrode, a bottom-emission display apparatus can be obtained. By contrast, when the respective pixel electrodes are reflective electrodes and the common electrode 113 is a light-transmitting electrode, a top-emission display apparatus can be obtained. Note that when both the pixel electrodes and the common electrode 113 have light-transmitting properties, a dual-emission display apparatus can be also obtained.

A protective layer 121 is provided over the common electrode 113 to cover the light-emitting element 110R, the light-emitting element 110G, and the light-emitting element 110B. The protective layer 121 has a function of preventing diffusion of impurities such as water into each light-emitting element from the above.

An end portion of the pixel electrode 111 preferably has a tapered shape. In the case where the end portion of the pixel electrode has a tapered shape, the organic layer 112 that is provided along a side surface of the pixel electrode also has a tapered shape. When the side surface of the pixel electrode has a tapered shape, coverage with the EL layer provided along the side surface of the pixel electrode can be improved. Furthermore, when the side surface of the pixel electrode has a tapered shape, a material (for example, also referred to as dust or particles) in a manufacturing step is easily removed by, for example, processing such as cleaning, which is preferable.

Note that in this specification and the like, a tapered shape indicates a shape in which at least part of a side surface of a structure is inclined to a substrate surface. For example, a tapered shape preferably includes a region where an angle formed between the inclined side surface and the substrate surface (such an angle is also referred to as a taper angle) is less than 90°.

The organic layer 112 is processed into an island shape by a photolithography method. Thus, an angle formed between a top surface and a side surface of an end portion of the organic layer 112 is approximately 90°. In contrast, an organic film formed using an FMM (Fine Metal Mask) or the like has a thickness that tends to gradually decrease with decreasing the distance from an end portion, and has a top surface forming a slope in an area extending in the range of greater than or equal to 1 μm and less than or equal to 10 μm from the end portion, for example. Thus, such an organic film has a shape whose top surface and side surface are difficult to distinguish from each other.

An insulating layer 125, a resin layer 126, and a layer 128 are included between two adjacent light-emitting elements.

Between two adjacent light-emitting elements, side surfaces of the organic layers 112 are provided to face each other with the resin layer 126 therebetween. The resin layer 126 is positioned between the two adjacent light-emitting elements and is provided to fill end portions of the organic layers 112 and a region between the two organic layers 112. The resin layer 126 has a top surface with a smooth convex shape. The common layer 114 and the common electrode 113 are provided to cover the top surface of the resin layer 126.

The resin layer 126 functions as a planarization film that fills a step positioned between two adjacent light-emitting elements. Providing the resin layer 126 can prevent a phenomenon in which the common electrode 113 is divided by a step at an end portion of the organic layer 112 (such a phenomenon is also referred to as disconnection) from occurring and the common electrode over the organic layer 112 from being insulated. The resin layer 126 can be also referred to as LFP (Local Filling Planarization).

An insulating layer containing an organic material can be suitably used as the resin layer 126. For the resin layer 126, for example, an acrylic resin, a polyimide resin, an epoxy resin, an imide resin, a polyamide resin, a polyimide-amide resin, a silicone resin, a siloxane resin, a benzocyclobutene-based resin, a phenol resin, a precursor of these resins, or the like can be used. For the resin layer 126, for example, an organic material such as polyvinyl alcohol (PVA), polyvinylbutyral, polyvinylpyrrolidone, polyethylene glycol, polyglycerin, pullulan, water-soluble cellulose, or an alcohol-soluble polyamide resin may be used.

Alternatively, a photosensitive resin can be used for the resin layer 126. A photoresist may be used for the photosensitive resin. As the photosensitive resin, a positive photosensitive material or a negative photosensitive material can be used.

The resin layer 126 may contain a material absorbing visible light. For example, the resin layer 126 itself may be made of a material absorbing visible light, or the resin layer 126 may contain a pigment absorbing visible light. For example, for the resin layer 126, it is possible to use a resin that can be used as a color filter transmitting red, blue, or green light and absorbing other light, a resin that contains carbon black as a pigment and functions as a black matrix, or the like.

The insulating layer 125 is provided in contact with the side surfaces of the organic layers 112. In addition, the insulating layer 125 is provided to cover an upper end portion of the organic layer 112. Furthermore, part of the insulating layer 125 is provided in contact with a top surface of the substrate 101.

The insulating layer 125 is positioned between the resin layer 126 and the organic layer 112 and functions as a protective film for preventing contact between the resin layer 126 and the organic layer 112. When the organic layer 112 and the resin layer 126 are in contact with each other, the organic layer 112 might be dissolved by an organic solvent or the like used at the time of forming the resin layer 126. Therefore, the insulating layer 125 is provided between the organic layer 112 and the resin layer 126 as described in this embodiment to protect the side surfaces of the organic layer.

An insulating layer containing an organic material can be used for the insulating layer 125. For the insulating layer 125, an inorganic insulating film such as an oxide insulating film, a nitride insulating film, an oxynitride insulating film, or a nitride oxide insulating film can be used, for example. The insulating layer 125 may have either a single-layer structure or a stacked-layer structure. Examples of the oxide insulating film include a silicon oxide film, an aluminum oxide film, a magnesium oxide film, an indium gallium zinc oxide film, a gallium oxide film, a germanium oxide film, an yttrium oxide film, a zirconium oxide film, a lanthanum oxide film, a neodymium oxide film, a hafnium oxide film, and a tantalum oxide film. Examples of the nitride insulating film include a silicon nitride film and an aluminum nitride film. Examples of the oxynitride insulating film include a silicon oxynitride film and an aluminum oxynitride film. Examples of the nitride oxide insulating film include a silicon nitride oxide film and an aluminum nitride oxide film. In particular, when a metal oxide film such as an aluminum oxide film or a hafnium oxide film or an inorganic insulating film such as a silicon oxide film that is formed by an ALD method is employed for the insulating layer 125, it is possible to form the insulating layer 125 that has a small number of pinholes and has an excellent function of protecting the EL layer.

Note that in this specification and the like, oxynitride refers to a material that contains more oxygen than nitrogen in its composition, and nitride oxide refers to a material that contains more nitrogen than oxygen in its composition. For example, in the case where silicon oxynitride is described, it refers to a material that contains more oxygen than nitrogen in its composition. In the case where silicon nitride oxide is described, it refers to a material that contains more nitrogen than oxygen in its composition.

For the formation of the insulating layer 125, a sputtering method, a CVD method, a PLD method, an ALD method, or the like can be used, for example. The insulating layer 125 is preferably formed by an ALD method achieving good coverage.

In addition, a structure may be employed in which a reflective film (e.g., a metal film containing one or more selected from silver, palladium, copper, titanium, aluminum, and the like) is provided between the insulating layer 125 and the resin layer 126 so that light emitted from the light-emitting layer is reflected by the reflective film. This can improve light extraction efficiency.

The layer 128 is a remaining part of a protective layer (also referred to as a mask layer or a sacrificial layer) for protecting the organic layer 112 during etching of the organic layer 112. For the layer 128, a material that can be used for the insulating layer 125 can be used. It is particularly preferable to use the same material for the layer 128 and the insulating layer 125 because an apparatus or the like for processing can be used in common, for example.

In particular, since a metal oxide film such as an aluminum oxide film or a hafnium oxide film or an inorganic insulating film such as a silicon oxide film that is formed by an ALD method has a small number of pinholes, such a film has an excellent function of protecting the EL layer and can be suitably used for the insulating layer 125 and the layer 128.

The protective layer 121 is provided to cover the common electrode 113.

The protective layer 121 can have, for example, a single-layer structure or a stacked-layer structure including at least an inorganic insulating film. Examples of the inorganic insulating film include an oxide film and a nitride film, such as a silicon oxide film, a silicon oxynitride film, a silicon nitride oxide film, a silicon nitride film, an aluminum oxide film, an aluminum oxynitride film, and a hafnium oxide film. Alternatively, for example, a semiconductor material or a conductive material such as indium gallium oxide, indium zinc oxide, indium tin oxide, or indium gallium zinc oxide may be used for the protective layer 121.

For the protective layer 121, a stacked film of an inorganic insulating film and an organic insulating film can be used. For example, a structure in which an organic insulating film is sandwiched between a pair of inorganic insulating films is preferable. Furthermore, the organic insulating film preferably functions as a planarization film. This enables a top surface of the organic insulating film to be flat, which results in improved coverage with the inorganic insulating film thereover and a higher barrier property. Moreover, the top surface of the protective layer 121 is flat; therefore, when a structural object (e.g., a color filter, an electrode of a touch sensor, a lens array, or the like) is provided above the protective layer 121, the structural object can be less affected by an uneven shape caused by a lower structure.

FIG. 16C illustrates the connection portion 140 in which the connection electrode 111C and the common electrode 113 are electrically connected to each other. In the connection portion 140, an opening portion is provided in the insulating layer 125 and the resin layer 126 over the connection electrode 111C. The connection electrode 111C and the common electrode 113 are electrically connected to each other in the opening portion.

Note that although FIG. 16C illustrates the connection portion 140 in which the connection electrode 111C and the common electrode 113 are electrically connected to each other, the common electrode 113 may be provided over the connection electrode 111C with the common layer 114 therebetween. Particularly in the case where a carrier-injection layer is used as the common layer 114, for example, a material used for the common layer 114 has sufficiently low electrical resistivity and the common layer 114 can be formed to be thin. Thus, problems do not arise in many cases even when the common layer 114 is positioned in the connection portion 140. Accordingly, the common electrode 113 and the common layer 114 can be formed using the same shielding mask, so that manufacturing cost can be reduced.

The above is the description of the structure example of the display apparatus.

Pixel Layout

Pixel layout different from that in FIG. 16A will be mainly described below. There is no particular limitation on the arrangement of light-emitting elements (subpixels), and a variety of methods can be employed.

In addition, examples of a top surface shape of the subpixel include polygons such as a triangle, a tetragon (including a rectangle and a square), and a pentagon; polygons with rounded corners; an ellipse; and a circle. Here, the top surface shape of the subpixel corresponds to a top surface shape of a light-emitting region of the light-emitting element.

Figure 17A:
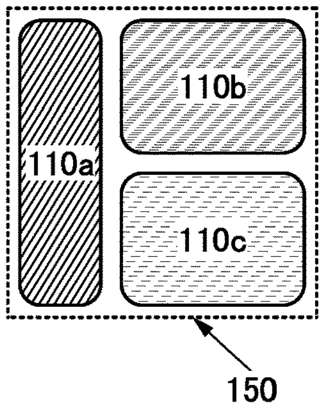
FIG. 17A to FIG. 17F are diagrams illustrating structure examples of a pixel.

A pixel 150 illustrated in FIG. 17A employs an S-stripe arrangement. The pixel 150 illustrated in FIG. 17A is composed of three subpixels: a light-emitting element 110*a*, a light-emitting element 110*b*, and a light-emitting element 110*c*. For example, the light-emitting element 110*a* may be a blue-light-emitting element, the light-emitting element 110*b* may be a red-light-emitting element, and the light-emitting element 110*c* may be a green-light-emitting element.

Figure 17B:
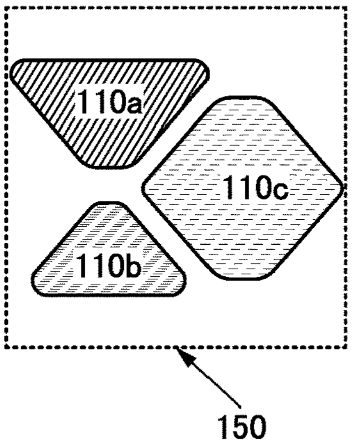

The pixel 150 illustrated in FIG. 17B includes the light-emitting element 110*a* whose top surface has a rough trapezoidal shape with rounded corners, the light-emitting element 110*b* whose top surface has a rough triangle shape with rounded corners, and the light-emitting element 110*c* whose top surface has a rough tetragonal or rough hexagonal shape with rounded corners. In addition, the light-emitting element 110*a* has a larger light-emitting area than the light-emitting element 110*b*. In this manner, the shapes and sizes of the light-emitting elements can be determined independently. For example, the size of a light-emitting element with higher reliability can be made smaller. For example, the light-emitting element 110*a* may be a green light-emitting element, the light-emitting element 110*b* may be a red light-emitting element, and the light-emitting element 110*c* may be a blue light-emitting element.

Figure 17C:
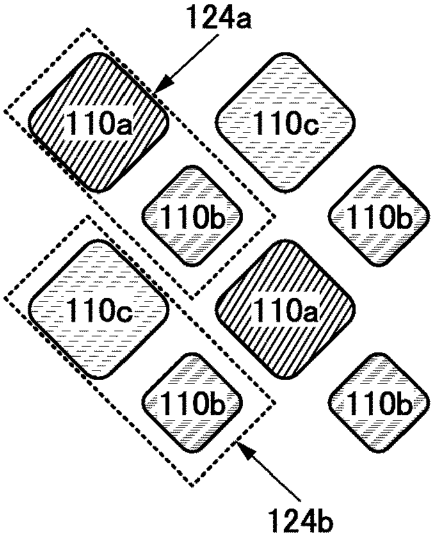

A pixels 124*a* and a pixel 124*b* illustrated in FIG. 17C employ a PenTile arrangement. FIG. 17C illustrates an example in which the pixels 124*a* each including the light-emitting element 110*a* and the light-emitting element 110*b* and the pixels 124*b* each including the light-emitting element 110*b* and the light-emitting element 110*c* are alternately arranged. For example, the light-emitting element 110*a* may be a red light-emitting element, the light-emitting element 110*b* may be a green light-emitting element, and the light-emitting element 110*c* may be a blue light-emitting element.

Figure 17D:
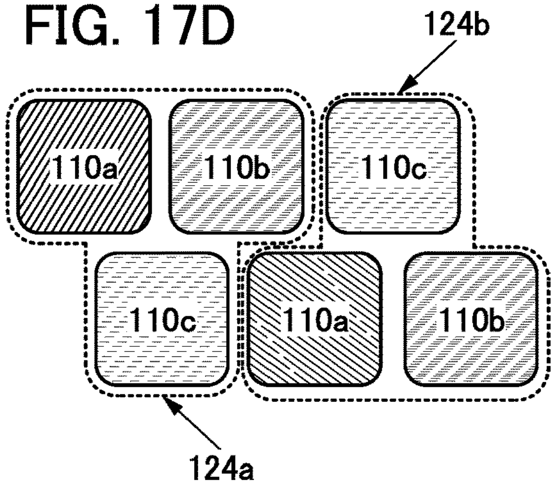
Figure 17E:
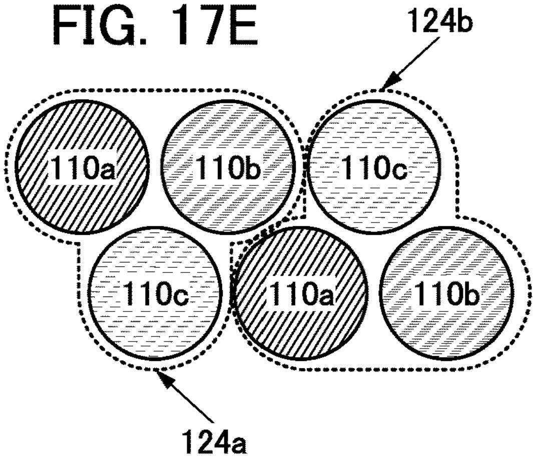

The pixel 124*a* and the pixel 124*b* illustrated in FIG. 17D and FIG. 17E employ a delta arrangement. The pixel 124*a* includes two light-emitting elements (the light-emitting element 110*a* and the light-emitting element 110*b*) in an upper row (a first row) and one light-emitting element (the light-emitting element 110*c*) in a lower row (a second row). The pixel 124*b* includes one light-emitting element (the light-emitting element 110*c*) in the upper row (the first row) and two light-emitting elements (the light-emitting element 110_a_ and the light-emitting element 110_b_) in the lower row (the second row). For example, the light-emitting element 110_a_ may be a red light-emitting element, the light-emitting element 110_b_ may be a green light-emitting element, and the light-emitting element 110_c_ may be a blue light-emitting element.

FIG. 17D illustrates an example in which the top surface of each light-emitting element has a rough tetragonal shape with rounded corners, and FIG. 17E illustrates an example in which the top surface of each light-emitting element is circular.

Figure 17F:
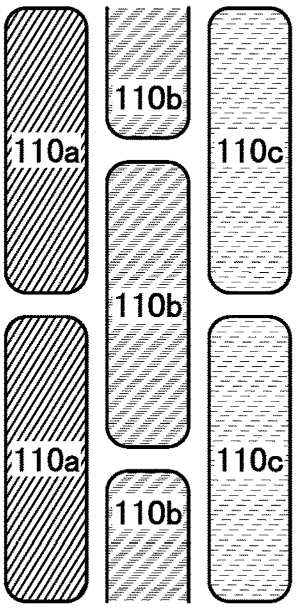

FIG. 17F illustrates an example in which light-emitting elements of different colors are arranged in a zigzag manner. Specifically, the positions of top sides of two light-emitting elements arranged in a column direction (e.g., the light-emitting element 110_a_ and the light-emitting element 110_b_ or the light-emitting element 110_b_ and the light-emitting element 110_c_) are not aligned in a top view. For example, the light-emitting element 110_a_ may be a red light-emitting element, the light-emitting element 110_b_ may be a green light-emitting element, and the light-emitting element 110_c_ may be a blue light-emitting element.

In a photolithography method, as a pattern to be processed becomes finer, the influence of light diffraction becomes more difficult to ignore; accordingly, fidelity in transferring a photomask pattern by light exposure is degraded, and it becomes difficult to process a resist mask into a desired shape. Thus, a pattern with rounded corners is likely to be formed even with a rectangular photomask pattern. Consequently, the top surface of a light-emitting element has, for example, a polygonal shape with rounded corners, an elliptical shape, a circular shape, or the like in some cases.

Furthermore, in a method for manufacturing a display panel according to one embodiment of the present invention, the EL layer is processed into an island shape with the use of a resist mask. A resist film formed over the EL layer needs to be cured at a temperature lower than the upper temperature limit of the EL layer. Thus, the resist film is insufficiently cured in some cases depending on the upper temperature limit of the material of the EL layer and the curing temperature of a resist material. An insufficiently cured resist film might have a shape different from a desired shape at the time of processing. As a result, a top surface of the EL layer has, for example, a polygonal shape with rounded corners, an elliptical shape, a circular shape, or the like in some cases. For example, when a resist mask with a square top surface is intended to be formed, a resist mask with a circular top surface might be formed, and the top surface of the EL layer might be circular.

Note that to obtain a desired top surface shape of the EL layer, a technique of correcting a mask pattern in advance so that a transferred pattern agrees with a design pattern (an OPC (Optical Proximity Correction) technique) may be used. Specifically, with the OPC technique, a pattern for correction is added to a corner portion or the like of a figure on a mask pattern, for example.

The above is the description of the pixel layout.

At least part of this embodiment can be implemented in appropriate combination with the other embodiments described in this specification.

Embodiment 3

In this embodiment, structure examples of a display apparatus that can be employed for the correction method of one embodiment of the present invention will be described.

The display apparatus of this embodiment can be used for, for example, display portions of a digital camera, a digital video camera, a digital photo frame, a cellular phone, a portable game machine, a smartphone, a wristwatch-type terminal, a tablet terminal, a portable information terminal, and an audio reproducing device, in addition to electronic devices with comparatively large screens, such as a television device, a desktop or laptop personal computer, a monitor for a computer or the like, digital signage, and a large game machine such as a pachinko machine.

Display Apparatus 400

Figure 18:
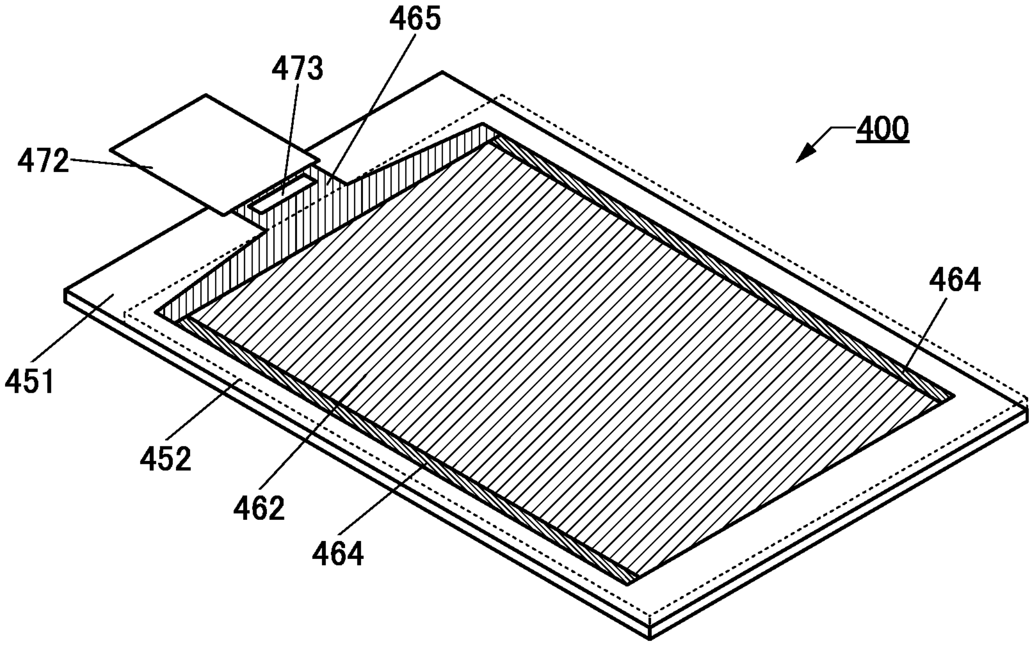
FIG. 18 is a diagram illustrating a structure example of a display apparatus.
Figure 19A:
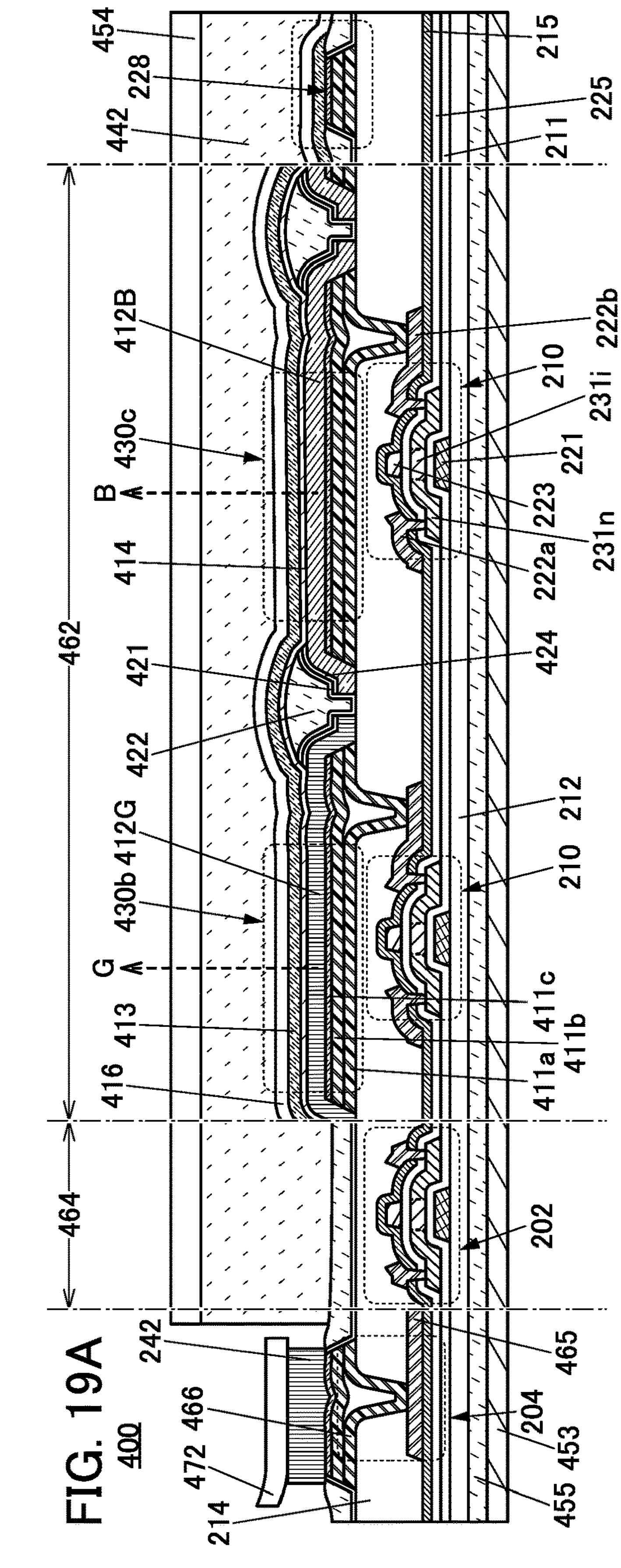
FIG. 19A and FIG. 19B are diagrams illustrating a structure example of a display apparatus.

FIG. 18 is a perspective view of a display apparatus 400, and FIG. 19A is a cross-sectional view of the display apparatus 400.

The display apparatus 400 has a structure in which a substrate 452 and a substrate 451 are attached to each other. In FIG. 18, the substrate 452 is denoted by a dashed line.

The display apparatus 400 includes, for example, a display portion 462, a circuit 464, a wiring 465, and the like. FIG. 18 illustrates an example in which an IC 473 and an FPC 472 are implemented on the display apparatus 400. Thus, the structure illustrated in FIG. 18 can be regarded as a display module including the display apparatus 400, the IC (integrated circuit), and the FPC.

As the circuit 464, a scan line driver circuit can be used, for example.

The wiring 465 has a function of supplying a signal and power to the display portion 462 and the circuit 464. The signal and power are input to the wiring 465 from the outside of the display apparatus 400 through the FPC 472 or input to the wiring 465 from the IC 473.

FIG. 18 illustrates an example in which the IC 473 is provided over the substrate 451 by a COG (Chip On Glass) method, a COF (Chip on Film) method, or the like. An IC including a scan line driver circuit, a signal line driver circuit, or the like can be employed as the IC 473, for example. Note that the display apparatus 400 and the display module are not necessarily provided with an IC. In addition, the IC may be implemented on the FPC by a COF method or the like.

FIG. 19A illustrates an example of a cross section of the display apparatus 400 when part of a region including the FPC 472, part of the circuit 464, part of the display portion 462, and part of a region including a connection portion are cut. FIG. 19A particularly illustrates an example of a cross section of the display portion 462 when a region including a light-emitting element 430_b_ that emits green light and a light-emitting element 430_c_ that emits blue light is cut.

The display apparatus 400 illustrated in FIG. 19A includes a transistor 202, transistors 210, the light-emitting element 430_b_, the light-emitting element 430_c_, and the like, for example, between a substrate 453 and a substrate 454.

The light-emitting element illustrated in Embodiment 1 can be employed as the light-emitting element 430_b_ and the light-emitting element 430_c_.

Here, in the case where a pixel of the display apparatus includes three kinds of subpixels including light-emitting elements that emit light of different colors, subpixels of three colors of red (R), green (G), and blue (B), subpixels of three colors of yellow (Y), cyan (C), and magenta (M), and the like can be given as examples of the three subpixels. In the case where the pixel includes four subpixels, subpixels of four colors of R, G, B, and white (W), subpixels of four colors of R, G, B, and Y, and the like can be given as the four subpixels.

The substrate 454 and a protective layer 416 are bonded to each other with an adhesive layer 442. The adhesive layer 442 is provided to overlap with the light-emitting element 430*b* and the light-emitting element 430*c*, and the display apparatus 400 employs a solid sealing structure.

The light-emitting element 430*b* and the light-emitting element 430*c* each include a conductive layer 411*a*, a conductive layer 411*b*, and a conductive layer 411*c* as a pixel electrode. The conductive layer 411*b* has a property of reflecting visible light and functions as a reflective electrode. The conductive layer 411*c* has a property of transmitting visible light and functions as an optical adjustment layer.

The conductive layer 411*a* is connected to a conductive layer 222*b* included in the transistor 210 through an opening provided in an insulating layer 214. The transistor 210 has a function of controlling driving of the light-emitting element.

An EL layer 412G or an EL layer 412B is provided to cover the pixel electrode. An insulating layer 421 is provided in contact with a side surface of the EL layer 412G and a side surface of the EL layer 412B, and a resin layer 422 is provided to fill a concave portion of the insulating layer 421. A layer 424 is provided between the EL layer 412G and the insulating layer 421 and between the EL layer 412B and the insulating layer 421. A common layer 414, a common electrode 413, and the protective layer 416 are provided to cover the EL layer 412G and the EL layer 412B.

Light emitted from the light-emitting element is emitted toward the substrate 452 side. For the substrate 452, a material having a high property of transmitting visible light is preferably used.

The transistor 202 and the transistor 210 are each formed over the substrate 451. These transistors can be manufactured using the same material in the same step.

The substrate 453 and an insulating layer 212 are attached to each other with an adhesive layer 455.

As a method for manufacturing the display apparatus 400, first, for example, a manufacture substrate provided with the insulating layer 212, the transistors, the light-emitting elements, and the like is attached to the substrate 454 with the adhesive layer 442. Then, the substrate 453 is attached to a surface exposed by separation of the manufacture substrate, so that the components formed over the manufacture substrate are transferred to the substrate 453. The substrate 453 and the substrate 454 each preferably have flexibility. This can increase the flexibility of the display apparatus 400.

An inorganic insulating film that can be used for each of an insulating layer 211 and an insulating layer 215 can be used for the insulating layer 212.

A connection portion 204 is provided in a region of the substrate 453 where the substrate 453 and the substrate 454 do not overlap with each other. In the connection portion 204, the wiring 465 is electrically connected to the FPC 472 through a conductive layer 466 and a connection layer 242. The conductive layer 466 can be obtained by processing the same conductive film as the pixel electrode. Thus, the connection portion 204 and the FPC 472 can be electrically connected to each other through the connection layer 242.

Each of the transistor 202 and the transistor 210 includes a conductive layer 221 functioning as a gate, the insulating layer 211 functioning as a gate insulating layer, a semiconductor layer 231 including a channel formation region 231*i* and a pair of low-resistance regions 231*n*, a conductive layer 222*a* connected to one of the pair of low-resistance regions 231*n*, the conductive layer 222*b* connected to the other of the pair of low-resistance regions 231*n*, an insulating layer 225 functioning as a gate insulating layer, a conductive layer 223 functioning as a gate, and the insulating layer 215 covering the conductive layer 223. The insulating layer 211 is positioned between the conductive layer 221 and the channel formation region 231*i*. The insulating layer 225 is positioned between the conductive layer 223 and the channel formation region 231*i*.

The conductive layer 222*a* and the conductive layer 222*b* are connected to the low-resistance regions 231*n* through openings provided in the insulating layer 215. One of the conductive layer 222*a* and the conductive layer 222*b* functions as a source, and the other of the conductive layer 222*a* and the conductive layer 222*b* functions as a drain.

FIG. 19A illustrates an example in which the insulating layer 225 covers a top surface and side surfaces of the semiconductor layer. The conductive layer 222*a* and the conductive layer 222*b* are connected to the low-resistance regions 231*n* through openings provided in the insulating layer 225 and the insulating layer 215.

Figure 19B:
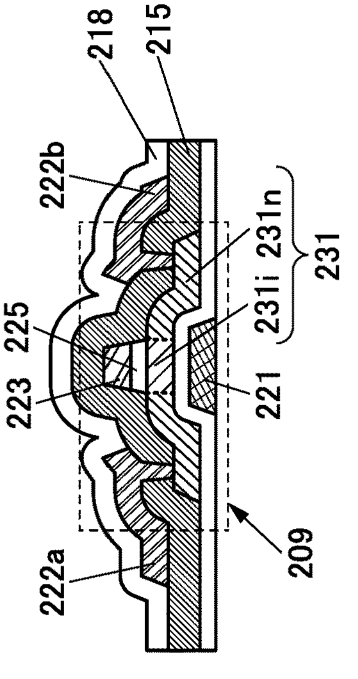

In contrast, in a transistor 209 illustrated in FIG. 19B, the insulating layer 225 overlaps with the channel formation region 231*i* of the semiconductor layer 231 and does not overlap with the low-resistance regions 231*n*. The structure illustrated in FIG. 19B can be manufactured by processing the insulating layer 225 with the conductive layer 223 as a mask, for example. In FIG. 19B, the insulating layer 215 is provided to cover the insulating layer 225 and the conductive layer 223, and the conductive layer 222*a* and the conductive layer 222*b* are connected to the low-resistance regions 231*n* through openings in the insulating layer 215. Furthermore, an insulating layer 218 covering the transistor 209 may be provided.

There is no particular limitation on the structure of the transistors included in the display apparatus of this embodiment. For example, a planar transistor, a staggered transistor, an inverted staggered transistor, or the like can be used. In addition, either of a top-gate transistor structure and a bottom-gate transistor structure may be employed. Alternatively, gates may be provided above and below a semiconductor layer where a channel is formed.

The structure in which the semiconductor layer where a channel is formed is sandwiched between two gates is employed for the transistor 202 and the transistor 210. The two gates may be connected to the transistor and supplied with the same signal to drive the transistor. Alternatively, the threshold voltage of the transistor may be controlled by applying a potential for controlling the threshold voltage to one of the two gates and a potential for driving to the other of the two gates.

There is no particular limitation on the crystallinity of a semiconductor material used for the semiconductor layer of the transistor, and any of an amorphous semiconductor, a single crystal semiconductor, and a semiconductor having crystallinity other than single crystal (a microcrystalline semiconductor, a polycrystalline semiconductor, or a semiconductor partly including crystal regions) may be used. It is preferable to use a single crystal semiconductor or a semiconductor having crystallinity because degradation of transistor characteristics can be inhibited.

The semiconductor layer of the transistor preferably contains a metal oxide (also referred to as an oxide semiconductor). That is, a transistor using a metal oxide in its channel formation region (hereinafter an OS transistor) is preferably used for the display apparatus of this embodiment.

The band gap of a metal oxide used for the semiconductor layer of the transistor is preferably greater than or equal to 2 eV, further preferably greater than or equal to 2.5 eV. With the use of a metal oxide having a wide bandgap, the off-state current of the OS transistor can be reduced.

A metal oxide preferably contains at least indium or zinc, and further preferably contains indium and zinc. The metal oxide preferably contains indium, M (M is one or more kinds selected from gallium, aluminum, yttrium, tin, silicon, boron, copper, vanadium, beryllium, titanium, iron, nickel, germanium, zirconium, molybdenum, lanthanum, cerium, neodymium, hafnium, tantalum, tungsten, magnesium, and cobalt), and zinc, for example.

Alternatively, the semiconductor layer of the transistor may contain silicon. Examples of silicon include amorphous silicon and crystalline silicon (e.g., low-temperature polysilicon, single crystal silicon, or the like).

The transistor included in the circuit 464 and the transistor included in the display portion 462 may have either the same structure or different structures. A plurality of transistors included in the circuit 464 may have either the same structure or two or more kinds of structures. Similarly, a plurality of transistors included in the display portion 462 may have either the same structure or two or more kinds of structures.

For example, a material through which impurities such as water and hydrogen do not easily diffuse is preferably used for at least one of the insulating layers covering the transistors. Thus, such an insulating layer can function as a barrier layer. Such a structure can effectively inhibit diffusion of impurities into the transistors from the outside and can increase the reliability of the display apparatus.

An inorganic insulating film is preferably used for each of the insulating layer 211, the insulating layer 212, the insulating layer 215, the insulating layer 218, and the insulating layer 225. As the inorganic insulating film, a silicon nitride film, a silicon oxynitride film, a silicon oxide film, a silicon nitride oxide film, an aluminum oxide film, an aluminum nitride film, or the like can be used, for example. Alternatively, a hafnium oxide film, an yttrium oxide film, a zirconium oxide film, a gallium oxide film, a tantalum oxide film, a magnesium oxide film, a lanthanum oxide film, a cerium oxide film, a neodymium oxide film, or the like may be used. A stack including two or more of the above inorganic insulating films may also be used.

An organic insulating film is suitable for the insulating layer 214 functioning as a planarization layer. Examples of materials that can be used for the organic insulating film include an acrylic resin, a polyimide resin, an epoxy resin, a polyamide resin, a polyimide-amide resin, a siloxane resin, a benzocyclobutene-based resin, a phenol resin, and precursors of these resins.

A variety of optical members can be arranged on the inner or outer surface of the substrate 454. Examples of the optical members include a light-blocking layer, a polarizing plate, a retardation plate, a light diffusion layer (e.g., a diffusion film or the like), an anti-reflection layer, a microlens array, and a light-condensing film. Furthermore, for example, an anti-static film inhibiting attachment of dust, a water repellent film suppressing attachment of stain, a hard coat film inhibiting generation of a scratch caused by the use, a shock absorbing layer, or the like may be provided on the outside of the substrate 454.

Providing the protective layer 416 that covers the light-emitting element can inhibit entry of impurities such as water into the light-emitting element, so that the reliability of the light-emitting element can be increased.

FIG. 19A illustrates a connection portion 228. In the connection portion 228, the common electrode 413 is electrically connected to a wiring. FIG. 19A illustrates an example in which the wiring has the same stacked-layer structure as the pixel electrode.

For each of the substrate 453 and the substrate 454, glass, quartz, ceramics, sapphire, a resin, a metal, an alloy, a semiconductor, or the like can be used, for example. For the substrate on the side from which light from the light-emitting element is extracted, a material that transmits the light is used. When a flexible material is used for the substrate 453 and the substrate 454, the flexibility of the display apparatus can be increased. Furthermore, a polarizing plate may be used as the substrate 453 or the substrate 454.

For each of the substrate 453 and the substrate 454, a polyester resin such as polyethylene terephthalate (PET) or polyethylene naphthalate (PEN), a polyacrylonitrile resin, an acrylic resin, a polyimide resin, a polymethyl methacrylate resin, a polycarbonate (PC) resin, a polyether sulfone (PES) resin, a polyamide resin (e.g., nylon, aramid, or the like), a polysiloxane resin, a cycloolefin resin, a polystyrene resin, a polyamide-imide resin, a polyurethane resin, a polyvinyl chloride resin, a polyvinylidene chloride resin, a polypropylene resin, a polytetrafluoroethylene (PTFE) resin, an ABS resin, cellulose nanofiber, or the like can be used, for example. Glass that is thin enough to have flexibility may be used for one or both of the substrate 453 and the substrate 454.

For the adhesive layer, a variety of curable adhesives, e.g., a photocurable adhesive such as an ultraviolet curable adhesive, a reactive curable adhesive, a thermosetting adhesive, and an anaerobic adhesive can be used, for example. Examples of these adhesives include an epoxy resin, an acrylic resin, a silicone resin, a phenol resin, a polyimide resin, an imide resin, a PVC (polyvinyl chloride) resin, a PVB (polyvinyl butyral) resin, and an EVA (ethylene vinyl acetate) resin. In particular, for example, a material with low moisture permeability, such as an epoxy resin, is preferred. Alternatively, a two-liquid-mixture-type resin may be used. Alternatively, an adhesive sheet or the like may be used, for example.

As the connection layer 242, an anisotropic conductive film (ACF), an anisotropic conductive paste (ACP), or the like can be used, for example.

As examples of materials that can be used for conductive layers such as a variety of wirings and electrodes that constitute the display apparatus, in addition to a gate, a source, and a drain of a transistor, a metal such as aluminum, titanium, chromium, nickel, copper, yttrium, zirconium, molybdenum, silver, tantalum, or tungsten, an alloy containing the metal as its main component, and the like can be given. A film containing these materials can be used in a single layer or as a stacked-layer structure.

In addition, as a light-transmitting conductive material, a conductive oxide such as indium oxide, indium tin oxide, indium zinc oxide, zinc oxide, or zinc oxide containing gallium, or graphene can be used, for example. Alternatively, a metal material such as gold, silver, platinum, magnesium, nickel, tungsten, chromium, molybdenum, iron, cobalt, copper, palladium, or titanium, or an alloy material containing the metal material can be used, for example. Alternatively, a nitride of the metal material (e.g., titanium nitride) or the like may be used, for example. Note that in the case of using the metal material or the alloy material (or the nitride thereof), the material is made thin enough to have a light-transmitting property. Furthermore, a stacked-layer film of the above materials can be used for a conductive layer. For example, a stacked-layer film of indium tin oxide and an alloy of silver and magnesium, or the like is preferably used because conductivity can be increased. They can be also used for, for example, conductive layers such as a variety of wirings and electrodes that constitute the display apparatus, and conductive layers (conductive layers functioning as a pixel electrode or a common electrode) included in the light-emitting element.

As an insulating material that can be used for each insulating layer, for example, a resin such as an acrylic resin or an epoxy resin, and an inorganic insulating material such as silicon oxide, silicon oxynitride, silicon nitride oxide, silicon nitride, or aluminum oxide can be given.

At least part of this embodiment can be implemented in appropriate combination with the other embodiments described in this specification.

Embodiment 4

In this embodiment, a light-emitting element (also referred to as a light-emitting device) that can be used in the display apparatus according to one embodiment of the present invention will be described.

In this specification and the like, a device manufactured using a metal mask or an FMM (a fine metal mask or a high-definition metal mask) is sometimes referred to as a device having an MM (metal mask) structure. In addition, in this specification and the like, a device manufactured without using a metal mask or an FMM is sometimes referred to as a device having an MML (metal maskless) structure.

Note that in this specification and the like, a structure where light-emitting layers in light-emitting devices that emit light of different colors (here, blue (B), green (G), and red (R)) are separately formed or separately patterned is sometimes referred to as an SBS (Side By Side) structure. In addition, in this specification and the like, a light-emitting device capable of emitting white light is sometimes referred to as a white-light-emitting device. Note that a combination of white-light-emitting devices with coloring layers (e.g., color filters) can achieve a full-color display apparatus.

Light-emitting Device

Structures of light-emitting devices can be classified roughly into a single structure and a tandem structure. A light-emitting device having a single structure includes one light-emitting unit between a pair of electrodes. The light-emitting unit includes one or more light-emitting layers. To obtain white light emission with a single structure, two light-emitting layers whose emission colors are complementary colors may be selected. For example, when the emission color of a first light-emitting layer and the emission color of a second light-emitting layer have a relationship of complementary colors, it is possible to obtain a structure where the light-emitting device emits white light as a whole. Furthermore, in the case where white light emission is obtained using three or more light-emitting layers, the light-emitting device is configured to be able to emit white light as a whole by combining the emission colors of the three or more light-emitting layers.

A light-emitting device having a tandem structure includes a plurality of light-emitting units between a pair of electrodes, and each light-emitting unit includes one or more light-emitting layers. When light-emitting layers that emit light of the same color are used in each light-emitting unit, luminance per predetermined current can be increased, and the light-emitting device can have higher reliability than that with a single structure. To obtain white light emission with a tandem structure, the structure is made so that light from light-emitting layers of the plurality of light-emitting units can be combined to be white light. Note that a combination of emission colors for obtaining white light emission is similar to that in the case of a single structure. Note that in the device having a tandem structure, it is suitable to provide, for example, an intermediate layer such as a charge-generation layer between a plurality of light-emitting units.

When a white light-emitting device and a light-emitting device having an SBS structure are compared with each other, the light-emitting device having the SBS structure can have lower power consumption than the white light-emitting device. Meanwhile, the white-light-emitting device can achieve lower manufacturing cost and a higher manufacturing yield because the manufacturing process of the white-light-emitting device is simpler than that of the light-emitting device having the SBS structure.

Structure Example of Light-Emitting Device

Figure 20A:
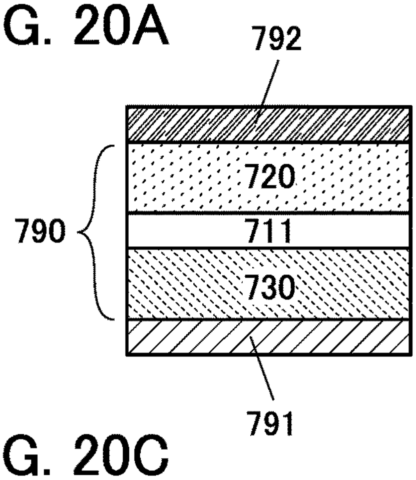
FIG. 20A to FIG. 20F are diagrams illustrating structure examples of a light-emitting device.

As illustrated in FIG. 20A, the light-emitting device includes an EL layer 790 between a pair of electrodes (a lower electrode 791 and an upper electrode 792). The EL layer 790 can be formed of a plurality of layers such as a layer 720, a light-emitting layer 711, and a layer 730, for example. The layer 720 can include, for example, a layer containing a substance with a high electron-injection property (an electron-injection layer), a layer containing a substance with a high electron-transport property (an electron-transport layer), and the like. The light-emitting layer 711 contains a light-emitting compound, for example. The layer 730 can include a layer containing a substance having a high hole-injection property (a hole-injection layer) and a layer containing a substance having a high hole-transport property (a hole-transport layer), for example.

The structure including the layer 720, the light-emitting layer 711, and the layer 730 that are provided between a pair of electrodes can function as a single light-emitting unit. The structure in FIG. 20A is referred to as a single structure in this specification.

Figure 20B:
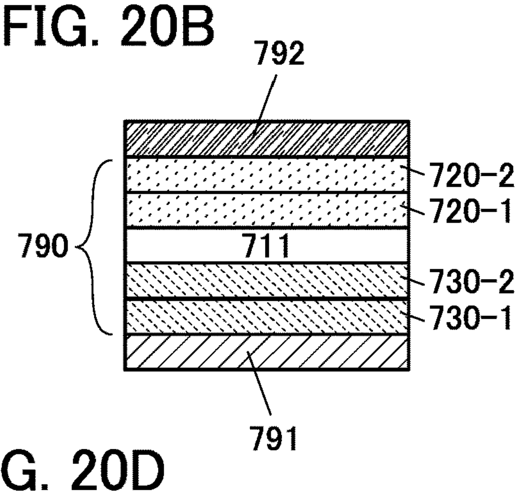

Specifically, a light-emitting device illustrated in FIG. 20B includes, over the lower electrode 791, a layer 730-1, a layer 730-2, the light-emitting layer 711, a layer 720-1, a layer 720-2, and the upper electrode 792. For example, the lower electrode 791 functions as an anode, and the upper electrode 792 functions as a cathode. In that case, the layer 730-1 functions as a hole-injection layer, the layer 730-2 functions as a hole-transport layer, the layer 720-1 functions as an electron-transport layer, and the layer 720-2 functions as an electron-injection layer. In contrast, when the lower electrode 791 functions as a cathode and the upper electrode 792 functions as an anode, the layer 730-1 functions as an electron-injection layer, the layer 730-2 functions as an electron-transport layer, the layer 720-1 functions as a hole-transport layer, and the layer 720-2 functions as a hole-injection layer. With such a layer structure, carriers can be efficiently injected to the light-emitting layer 711, and the efficiency of recombination of carriers in the light-emitting layer 711 can be increased.

Figure 20C:
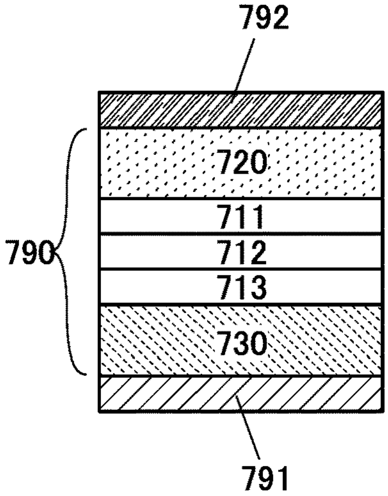
Figure 20D:
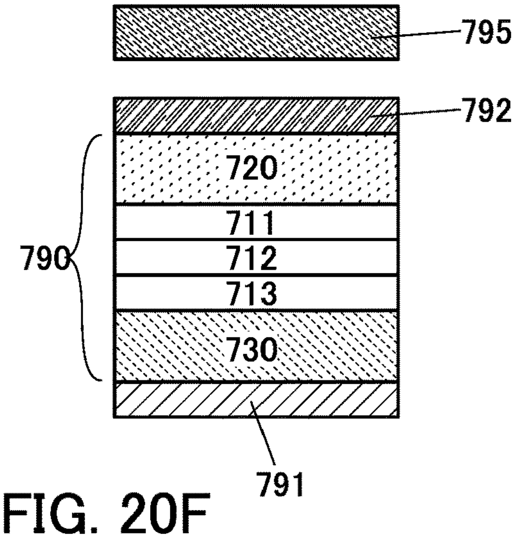

Note that the structures in which a plurality of light-emitting layers (a light-emitting layer 711, a light-emitting layer 712, and a light-emitting layer 713) are provided between the layer 720 and the layer 730 as illustrated in FIG. 20C and FIG. 20D are also variations of the single structure.

Figure 20E:
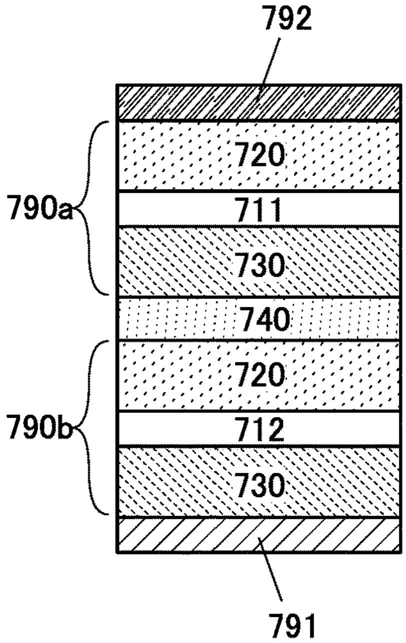
Figure 20F:
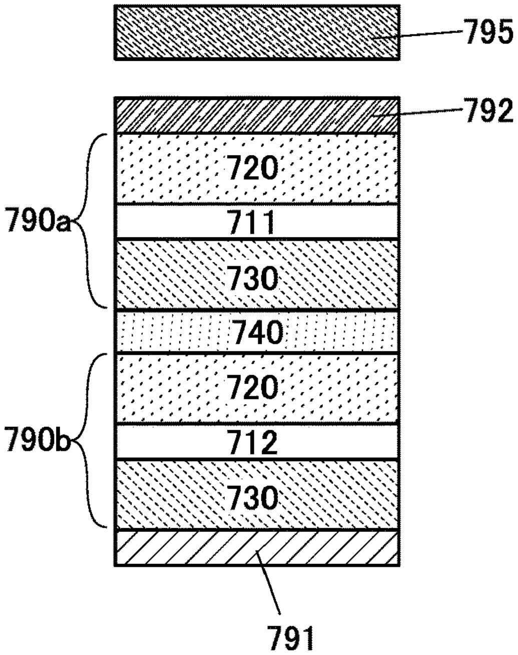

A structure in which a plurality of light-emitting units (an EL layer 790*a* and an EL layer 790*b*) are connected in series with an intermediate layer (a charge-generation layer) 740 therebetween as illustrated in FIG. 20E and FIG. 20F is referred to as a tandem structure in this specification. The tandem structure may be referred to as a stack structure. Note that the tandem structure enables a light-emitting device capable of high luminance light emission.

In FIG. 20C, light-emitting materials that emit light of the same color or the same light-emitting material may be used for the light-emitting layer 711, the light-emitting layer 712, and the light-emitting layer 713. The stacked light-emitting layers can increase emission luminance.

Alternatively, different light-emitting materials may be used for the light-emitting layer 711, the light-emitting layer 712, and the light-emitting layer 713. Light-emitting materials from which white light emission can be obtained by combining the colors of light emitted from the light-emitting layer 711, the light-emitting layer 712, and the light-emitting layer 713 may be used. FIG. 20D illustrates an example in which a coloring layer 795 functioning as a color filter is provided. When white light passes through the color filter, light of a desired color can be obtained.

In addition, in FIG. 20E, light-emitting materials that emit light of the same color may be used for the light-emitting layer 711 and the light-emitting layer 712. Alternatively, light-emitting materials that emit light of different colors may be used for the light-emitting layer 711 and the light-emitting layer 712. White light emission can be obtained when the light-emitting layer 711 and the light-emitting layer 712 emit light having a relationship of complementary colors. FIG. 20F illustrates an example in which the coloring layer 795 is further provided.

Note that also in FIG. 20C, FIG. 20D, FIG. 20E, and FIG. 20F, the layer 720 and the layer 730 may each have a stacked-layer structure of two or more layers as illustrated in FIG. 20B.

In addition, in FIG. 20D, light-emitting materials that emit light of the same color may be used for the light-emitting layer 711, the light-emitting layer 712, and the light-emitting layer 713. Similarly, in FIG. 20F, light-emitting materials that emit light of the same color may be used for the light-emitting layer 711 and the light-emitting layer 712. In that case, when a color conversion layer is employed instead of the coloring layer 795, light of a desired color that is different from the color of the light-emitting material can be obtained. For example, a blue light-emitting material is used for each light-emitting layer and blue light passes through the color conversion layer, so that light with a wavelength longer than that of blue light (e.g., red light, green light, or the like) can be obtained. For the color conversion layer, a fluorescent material, a phosphorescent material, quantum dots, or the like can be used.

The emission color of the light-emitting device can be red, green, blue, cyan, magenta, yellow, white, or the like depending on the material that constitutes the EL layer 790. In addition, when the light-emitting device has a microcavity structure, color purity can be further increased.

In the light-emitting device that emits white light, a light-emitting layer may contain two or more kinds of light-emitting substances, or two or more light-emitting layers containing different light-emitting substances may be stacked. At this time, light-emitting substances are selected so that when the colors of light emitted from the light-emitting substances are combined, the light-emitting device can emit white light as a whole.

Light-Emitting Device

A specific structure example of the light-emitting device is described here.

The light-emitting device includes at least the light-emitting layer. In addition, the light-emitting device may further include, as a layer other than the light-emitting layer, for example, a layer containing a substance with a high hole-injection property, a substance with a high hole-transport property, a hole-blocking material, a substance with a high electron-transport property, an electron-blocking material, a substance with a high electron-injection property, an electron-blocking material, a substance with a bipolar property (a substance with a high electron-transport property and a high hole-transport property), or the like.

Either a low molecular compound or a high molecular compound can be used in the light-emitting device. An inorganic compound may also be included in the light-emitting device. Each layer included in the light-emitting device can be formed by, for example, a method such as an evaporation method (including a vacuum evaporation method), a transfer method, a printing method, an inkjet method, or a coating method.

For example, the light-emitting device can include one or more of a hole-injection layer, a hole-transport layer, a hole-blocking layer, an electron-blocking layer, an electron-transport layer, and an electron-injection layer.

The hole-injection layer is a layer injecting holes from an anode to a hole-transport layer and containing a material with a high hole-injection property. Examples of a material with a high hole-injection property include an aromatic amine compound, and a composite material containing a hole-transport material and an acceptor material (an electron-accepting material).

The hole-transport layer is a layer transporting holes, which are injected from the anode by the hole-injection layer, to the light-emitting layer. The hole-transport layer is a layer containing a hole-transport material. The hole-transport material preferably has a hole mobility of higher than or equal to $1\times10^{-6}$ $cm^2/Vs$. Note that other substances can be also used as long as the substances have a hole-transport property higher than an electron-transport property. As the hole-transport material, for example, a material with a high hole-transport property, such as a π-electron rich heteroaromatic compound (e.g., a carbazole derivative, a thiophene derivative, or a furan derivative) or an aromatic amine (a compound having an aromatic amine skeleton) is preferable.

The electron-transport layer is a layer transporting electrons, which are injected from the cathode by the electron-injection layer, to the light-emitting layer. The electron-transport layer contains an electron-transport material. The electron-transport material preferably has an electron mobility of higher than or equal to $1\times10^{-6}$ $cm^2/Vs$. Note that other substances can be also used as long as the substances have an electron-transport property higher than a hole-transport property. As the electron-transport material, it is possible to use a material with a high electron-transport property, such as a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative having a quinoline ligand, a benzoquinoline derivative, a quinoxaline derivative, a dibenzoquinoxaline derivative, a pyridine derivative, a bipyridine derivative, a pyrimidine derivative, or a π-electron deficient heteroaromatic compound including a nitrogen-containing heteroaromatic compound, for example.

The electron-injection layer is a layer injecting electrons from the cathode to the electron-transport layer and containing a material with a high electron-injection property. As the material with a high electron-injection property, an alkali metal, an alkaline earth metal, or a compound thereof can be used. As the material with a high electron-injection property, a composite material containing an electron-transport material and a donor material (an electron-donating material) can be also used.

For the electron-injection layer, for example, an alkali metal, an alkaline earth metal, or a compound thereof, such as lithium, cesium, ytterbium, lithium fluoride (LiF), cesium fluoride (CsF), calcium fluoride ($CaF_2$), 8-(quinolinolato) lithium (abbreviation: Liq), 2-(2-pyridyl)phenolatolithium (abbreviation: LiPP), 2-(2-pyridyl)-3-pyridinolato lithium (abbreviation: LiPPy), 4-phenyl-2-(2-pyridyl)phenolatolithium (abbreviation: LiPPP), lithium oxide ($LiO_x$), or cesium carbonate can be used. In addition, the electron-injection layer may have a stacked-layer structure of two or more layers. In the stacked-layer structure, for example, lithium fluoride can be used for a first layer and ytterbium can be provided for a second layer.

Alternatively, as the above electron-injection layer, an electron-transport material may be used. For example, a compound having an unshared electron pair and having an electron deficient heteroaromatic ring can be used as the electron-transport material. Specifically, a compound having at least one of a pyridine ring, a diazine ring (a pyrimidine ring, a pyrazine ring, or a pyridazine ring), and a triazine ring can be used.

Note that the lowest unoccupied molecular orbital (LUMO) level of the organic compound having an unshared electron pair is preferably greater than or equal to −3.6 eV and less than or equal to −2.3 eV. In addition, in general, the highest occupied molecular orbital (HOMO) level and the LUMO level of an organic compound can be estimated by, for example, CV (cyclic voltammetry), photoelectron spectroscopy, optical absorption spectroscopy, inverse photoelectron spectroscopy, or the like.

For example, 4,7-diphenyl-1,10-phenanthroline (abbreviation: BPhen), 2,9-di(naphthalen-2-yl)-4,7-diphenyl-1,10-phenanthroline (abbreviation: NBPhen), diquinoxalino[2,3-α:2',3'-c]phenazine (abbreviation: HATNA), 2,4,6-tris[3'-(pyridin-3-yl)biphenyl-3-yl]-1,3,5-triazine (abbreviation: TmPPPyTz), or the like can be used for the organic compound having an unshared electron pair. Note that NBPhen has a higher glass transition point (Tg) than BPhen and thus has high heat resistance.

The light-emitting layer is a layer containing a light-emitting substance. The light-emitting layer can contain one or more kinds of light-emitting substances. As the light-emitting substance, for example, a substance that exhibits an emission color of blue, violet, bluish violet, green, yellowish green, yellow, orange, red, or the like is used as appropriate. Alternatively, a substance that emits near-infrared light can be used as the light-emitting substance.

Examples of the light-emitting substance include a fluorescent material, a phosphorescent material, a TADF material, and a quantum dot material.

Examples of a fluorescent material include a pyrene derivative, an anthracene derivative, a triphenylene derivative, a fluorene derivative, a carbazole derivative, a dibenzothiophene derivative, a dibenzofuran derivative, a dibenzoquinoxaline derivative, a quinoxaline derivative, a pyridine derivative, a pyrimidine derivative, a phenanthrene derivative, and a naphthalene derivative.

Examples of a phosphorescent material include an organometallic complex (particularly an iridium complex) having a 4H-triazole skeleton, a 1H-triazole skeleton, an imidazole skeleton, a pyrimidine skeleton, a pyrazine skeleton, or a pyridine skeleton; an organometallic complex (particularly an iridium complex) having a phenylpyridine derivative including an electron-withdrawing group as a ligand; a platinum complex; and a rare earth metal complex.

The light-emitting layer may contain one or more kinds of organic compounds (e.g., a host material, an assist material, and the like) in addition to the light-emitting substance (a guest material). As one or more kinds of organic compounds, one or both of a hole-transport material and an electron-transport material can be used. Alternatively, as one or more kinds of organic compounds, a bipolar material or a TADF material may be used.

The light-emitting layer preferably includes a phosphorescent material and a combination of a hole-transport material and an electron-transport material that easily forms an exciplex, for example. Such a structure makes it possible to efficiently obtain light emission using ExTET (Exciplex-Triplet Energy Transfer), which is energy transfer from an exciplex to a light-emitting substance (a phosphorescent material). When a combination of materials is selected to form an exciplex that exhibits light emission whose wavelength is to overlap with the wavelength of the lowest-energy-side absorption band of the light-emitting substance, energy can be transferred smoothly and light emission can be obtained efficiently. With this structure, the high efficiency, low-voltage driving, and long lifetime of the light-emitting device can be achieved at the same time.

At least part of this embodiment can be implemented in appropriate combination with the other embodiments described in this specification.

Embodiment 5

In this embodiment, electronic devices in which the display apparatus of one embodiment of the present invention can be used will be described.

The display apparatus of one embodiment of the present invention can be used for a display portion of an electronic device. Thus, one embodiment of the present invention can achieve an electronic device having high display quality. Alternatively, one embodiment of the present invention can achieve an electronic device with extremely high definition. Alternatively, one embodiment of the present invention can achieve a highly reliable electronic device.

Examples of electronic devices using the display apparatus or the like of one embodiment of the present invention include display apparatuses such as televisions and monitors, lighting devices, desktop or laptop personal computers, word processors, image reproduction devices that reproduce still images and moving images stored in recording media such as DVDs (Digital Versatile Discs), portable CD players, radios, tape recorders, headphone stereos, stereos, table clocks, wall clocks, cordless phone handsets, transceivers, car phones, mobile phones, portable information terminals, tablet terminals, portable game machines, stationary game machines such as pachinko machines, calculators, electronic notebooks, e-book readers, electronic translators, audio input devices, video cameras, digital still cameras, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, electrical tools such as chain saws, smoke detectors, and medical equipment such as dialyzers. Other examples include industrial equipment such as guide lights, traffic lights, belt conveyors, elevators, escalators, industrial robots, power storage systems, and power storage devices for leveling the amount of power supply and smart grid. In addition, moving objects and the like driven by fuel engines and electric motors using power from power storage units may also be included in the category of electronic devices. Examples of the moving objects include electric vehicles (EVs), hybrid electric vehicles (HVs) that include both an internal-combustion engine and a motor, plug-in hybrid electric vehicles (PHVs), tracked vehicles in which caterpillar tracks are substituted for wheels of these vehicles, motorized bicycles including motor-assisted bicycles, motorcycles, electric wheelchairs, golf carts, boats, ships, submarines, helicopters, aircraft, rockets, artificial satellites, space probes, planetary probes, and spacecraft.

The electronic device of one embodiment of the present invention may include a secondary battery (battery), and furthermore, it is preferable that the secondary battery be capable of being charged by contactless power transmission.

Examples of the secondary battery include a lithium-ion secondary battery, a nickel-hydride battery, a nickel-cadmium battery, an organic radical battery, a lead-acid battery, an air secondary battery, a nickel-zinc battery, and a silver-zinc battery.

The electronic device of one embodiment of the present invention may include an antenna. With the antenna receiving a signal, the electronic device can display images, information, and the like on a display portion. When the electronic device includes an antenna and a secondary battery, the antenna may be used for contactless power transmission.

The electronic device of one embodiment of the present invention may include a sensor (e.g., a sensor having a function of measuring force, displacement, position, speed, acceleration, angular velocity, rotational frequency, distance, light, liquid, magnetism, temperature, a chemical substance, sound, time, hardness, an electric field, current, voltage, power, radiation, a flow rate, humidity, gradient, oscillation, a smell, infrared rays, or the like).

The electronic device of one embodiment of the present invention can have a variety of functions. For example, the electronic device can have a function of displaying a variety of information (e.g., a still image, a moving image, a text image, and the like) on the display portion, a touch panel function, a function of displaying a calendar, date, time, and the like, a function of executing a variety of software (programs), a wireless communication function, and a function of reading a program or data stored in a recording medium.

Furthermore, an electronic device including a plurality of display portions can have a function of displaying image information mainly on one display portion while displaying text information mainly on another display portion, a function of displaying a three-dimensional image by displaying images on the plurality of display portions with a parallax taken into account, or the like. Furthermore, an electronic device including an image receiving portion can have a function of taking a still image or a moving image, a function of automatically or manually correcting a taken image, a function of storing a taken image in a recording medium (an external recording medium or a recording medium incorporated in the electronic device), a function of displaying a taken image on a display portion, or the like. Note that the functions of the electronic device of one embodiment of the present invention are not limited to these. The electronic device of one embodiment of the present invention can have a variety of functions.

The display apparatus of one embodiment of the present invention can display a high-definition image. Thus, the display apparatus can be suitably used especially for a portable electronic device, a wearable electronic device (wearable device), an e-book reader, or the like. For example, the display apparatus can be suitably used for xR devices such as a VR device and an AR device.

Figure 21A:
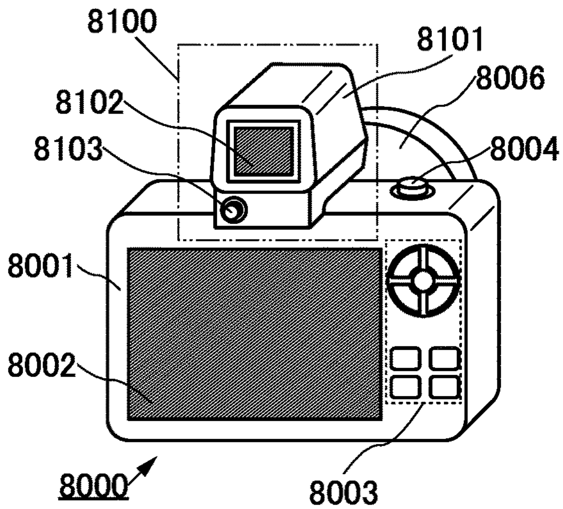
FIG. 21A to FIG. 21F are diagrams illustrating examples of electronic devices.

FIG. 21A is an external view of a camera 8000 to which a finder 8100 is attached.

The camera 8000 includes a housing 8001, a display portion 8002, operation buttons 8003, a shutter button 8004, and the like. Furthermore, a detachable lens 8006 is attached to the camera 8000. Note that the lens 8006 and the housing may be integrated with each other in the camera 8000.

Images can be taken with the camera 8000 at the press of the shutter button 8004 or the touch of the display portion 8002 serving as a touch panel.

The housing 8001 includes a mount including an electrode, so that the finder 8100, a stroboscope, or the like can be connected to the housing, for example.

The finder 8100 includes a housing 8101, a display portion 8102, a button 8103, and the like.

The housing 8101 is attached to the camera 8000 by a mount for engagement with the mount of the camera 8000. The finder 8100 can display an image and the like received from the camera 8000 on the display portion 8102, for example.

The button 8103 functions as a power button or the like, for example.

The display apparatus of one embodiment of the present invention can be used in the display portion 8002 of the camera 8000 and the display portion 8102 of the finder 8100. Note that the finder 8100 may be incorporated in the camera 8000.

Figure 21B:
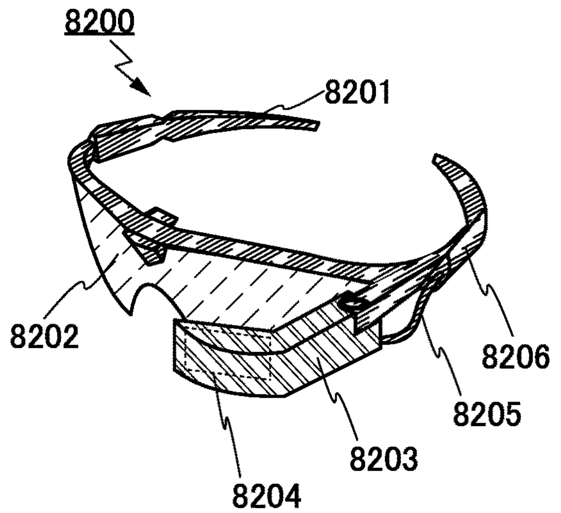

FIG. 21B is an external view of a head-mounted display 8200.

The head-mounted display 8200 includes a mounting portion 8201, a lens 8202, a main body 8203, a display portion 8204, a cable 8205, and the like. A battery 8206 is incorporated in the mounting portion 8201.

The cable 8205 has a function of supplying power from the battery 8206 to the main body 8203. The main body 8203 includes a wireless receiver or the like to receive image information and display it on the display portion 8204, for example. The main body 8203 includes a camera, and information on the movement of the eyeballs or the eyelids of the user can be used as an input means, for example.

The mounting portion 8201 may include a plurality of electrodes capable of sensing current flowing in response to the movement of the user's eyeball at a position in contact with the user to recognize the user's sight line. The mounting portion 8201 may also have a function of monitoring the user's pulse with the use of current flowing through the electrodes. The mounting portion 8201 may include a variety of sensors such as a temperature sensor, a pressure sensor, and an acceleration sensor. The head-mounted display 8200 may have a function of displaying the user's biological information on the display portion 8204, a function of changing an image displayed on the display portion 8204 in response to the movement of the user's head, or the like.

The display apparatus of one embodiment of the present invention can be used in the display portion 8204.

Figure 21C:
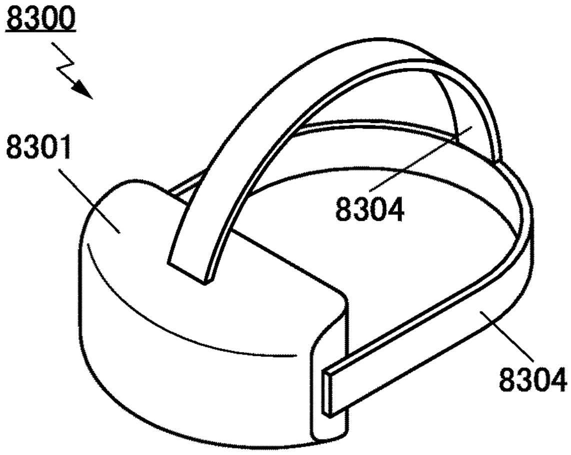
Figure 21D:
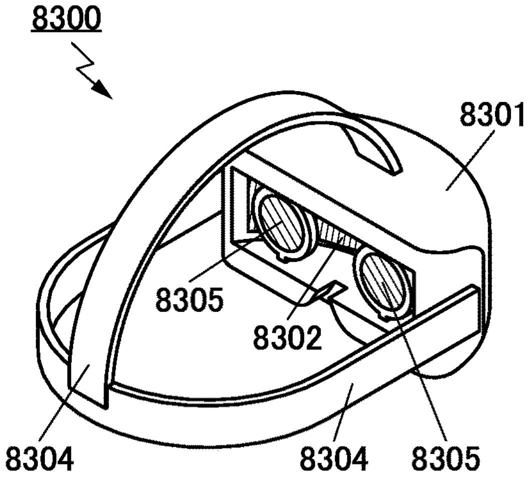
Figure 21E:
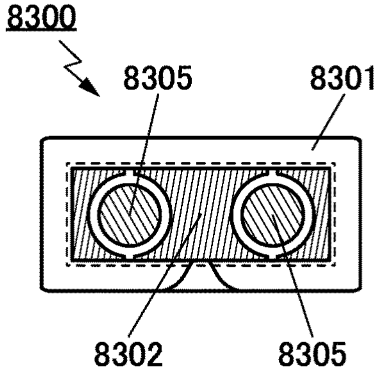

FIG. 21C to FIG. 21E are external views of a head-mounted display 8300. The head-mounted display 8300 includes a housing 8301, a display portion 8302, a band-like fixing member 8304, and a pair of lenses 8305.

A user can see display on the display portion 8302 through the lenses 8305. In the head-mounted display 8300, the display portion 8302 is preferably curved because the user can feel a high realistic sensation. For example, another image displayed on another region of the display portion 8302 is viewed through the lenses 8305, so that three-dimensional display using parallax or the like can be performed. Note that the number of display portions 8302 is not limited to one; for example, two display portions 8302 may be provided for the user's respective eyes.

The display apparatus of one embodiment of the present invention can be used for the display portion 8302. The display apparatus of one embodiment of the present invention can achieve extremely high definition. For example, a pixel is not easily seen by the user even when the user sees display that is magnified by the lenses 8305 as illustrated in FIG. 21E. That is, an image with a strong sense of reality can be seen by the user with the use of the display portion 8302.

Figure 21F:
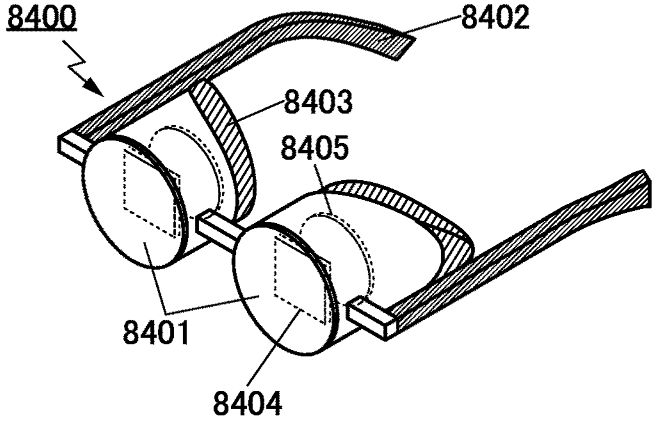

FIG. 21F is an external view of a goggle-type head-mounted display 8400. The head-mounted display 8400 includes a pair of housings 8401, a mounting portion 8402, and a cushion 8403. A display portion 8404 and a lens 8405 are provided in the pair of housings 8401 each. Furthermore, when the pair of display portions 8404 display different images, three-dimensional display using parallax can be performed.

A user can see display on the display portion 8404 through the lens 8405. The lens 8405 has a focus adjustment mechanism and can adjust the position according to the user's eyesight. The display portion 8404 is preferably a square or a horizontal rectangle. This can improve a realistic sensation.

The mounting portion 8402 preferably has plasticity and elasticity so as to be adjusted to fit the size of the user's face and not to slide down. In addition, part of the mounting portion 8402 preferably has a vibration mechanism functioning as a bone conduction earphone, for example. Thus, a separate audio device such as an earphone or a speaker is not needed, and the user can enjoy images and sounds only by wearing the head-mounted display. Note that the housing 8401 may have a function of outputting sound data by wireless communication, for example.

The mounting portion 8402 and the cushion 8403 are portions in contact with the user's face (forehead, cheek, or the like). The cushion 8403 is in close contact with the user's face, so that light leakage can be prevented, which increases the sense of immersion. The cushion 8403 is preferably formed using a soft material so that the head-mounted display 8400 is in close contact with the user's face when being worn by the user. For example, a material such as rubber, silicone rubber, urethane, or sponge can be used. Furthermore, when a sponge or the like whose surface is covered with cloth, leather (natural leather or synthetic leather), or the like is used for example, a gap is unlikely to be generated between the user's face and the cushion 8403, whereby light leakage can be suitably prevented. Furthermore, using such a material is preferable because it has a soft texture and the user does not feel cold when wearing the device in a cold season, for example. The member in contact with user's skin, such as the cushion 8403 or the mounting portion 8402, is preferably detachable because cleaning or replacement can be easily performed.

Figure 22A:
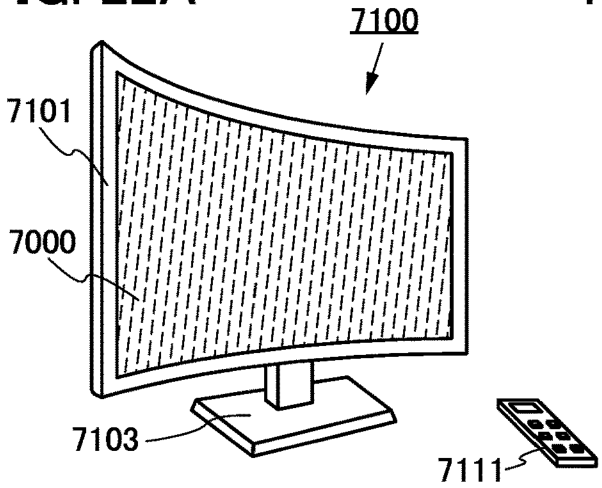
FIG. 22A to FIG. 22F are diagrams illustrating examples of electronic devices.

FIG. 22A illustrates an example of a television device. In a television device 7100, a display portion 7000 is incorporated in a housing 7101. Here, the housing 7101 is supported by a stand 7103.

The display apparatus of one embodiment of the present invention can be used for the display portion 7000 in FIG. 22A.

Operation of the television device 7100 illustrated in FIG. 22A can be performed with an operation switch provided in the housing 7101 or a separate remote controller 7111. Alternatively, the display portion 7000 may include a touch sensor, and the television device 7100 may be operated by touch on the display portion 7000 with a finger or the like. The remote controller 7111 may be provided with a display portion for displaying information output from the remote controller 7111. With operation keys or a touch panel provided in the remote controller 7111, channels and volume can be operated and images displayed on the display portion 7000 can be operated in the television device 7100.

Note that the television device 7100 has a structure in which a receiver, a modem, and the like are provided, for example. A general television broadcast can be received with the receiver. When the television device is connected to a communication network with or without wires via the modem, one-way (e.g., from a transmitter to a receiver) or two-way (between a transmitter and a receiver or between receivers, for example) information communication can be performed.

Figure 22B:
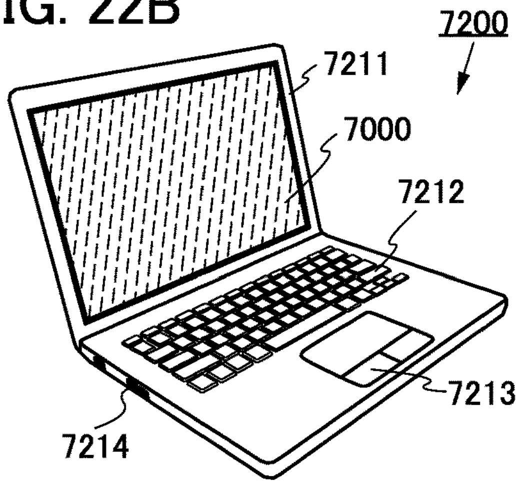

FIG. 22B illustrates an example of a laptop personal computer. A laptop personal computer 7200 includes a housing 7211, a keyboard 7212, a pointing device 7213, an external connection port 7214, and the like. In the housing 7211, the display portion 7000 is incorporated.

The display apparatus of one embodiment of the present invention can be used for the display portion 7000 in FIG. 22B.

Figure 22C:
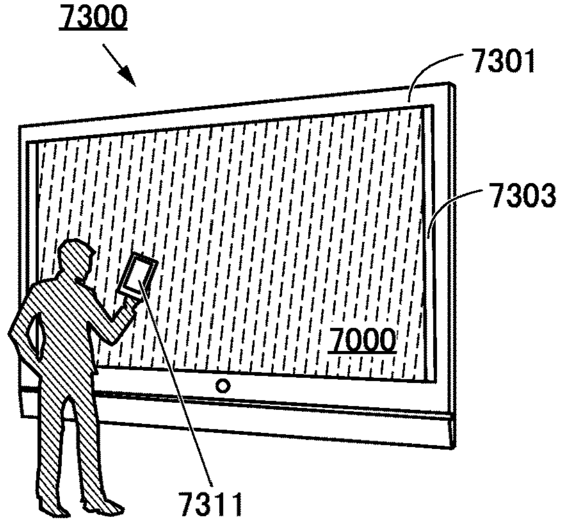
Figure 22D:
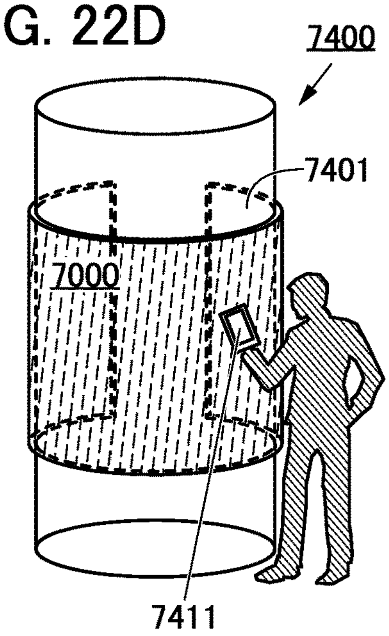

FIG. 22C and FIG. 22D illustrate examples of digital signage.

Digital signage 7300 illustrated in FIG. 22C includes a housing 7301, the display portion 7000, a speaker 7303, and the like. The digital signage 7300 can also include an LED lamp, an operation key (including a power switch or an operation switch), a connection terminal, a variety of sensors, a microphone, or the like.

FIG. 22D illustrates digital signage 7400 attached to a cylindrical pillar. The digital signage 7400 includes the display portion 7000 provided along a curved surface of the pillar 7401.

In FIG. 22C and FIG. 22D, the display apparatus of one embodiment of the present invention can be used for the display portion 7000.

The digital signage 7300 or the digital signage 7400 including a larger area of the display portion 7000 can increase the amount of information that can be provided at a time. The larger display portion 7000 attracts more attentions, so that the effectiveness of the advertisement can be increased, for example.

The digital signage 7300 or the digital signage 7400 preferably includes a touch panel in the display portion 7000. This enables intuitive operation by a user, in addition to display of a still image or a moving image on the display portion 7000. Moreover, for an application that provides information such as route information or traffic information, usability can be enhanced by intuitive operation.

As illustrated in FIG. 22C and FIG. 22D, it is preferable that the digital signage 7300 or the digital signage 7400 be capable of working with an information terminal 7311 or an information terminal 7411 such as a smartphone a user has through wireless communication, for example. For example, information of an advertisement displayed on the display portion 7000 can be displayed on a screen of the information terminal 7311 or the information terminal 7411. By operation of the information terminal 7311 or the information terminal 7411, display on the display portion 7000 can be switched.

It is possible to make the digital signage 7300 or the digital signage 7400 execute a game with the use of the screen of the information terminal 7311 or the information terminal 7411 as an operation means (controller). Thus, an unspecified number of users can join in and enjoy the game concurrently.

Figure 22E:
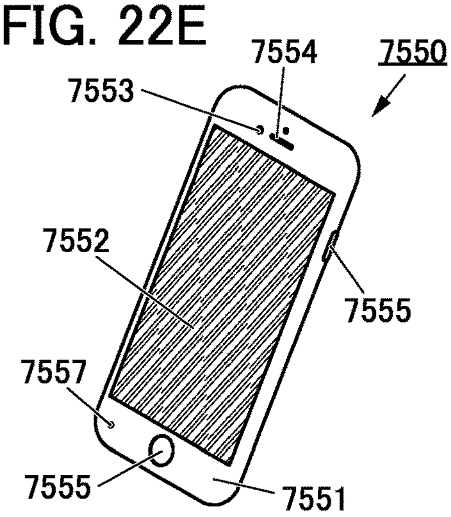

FIG. 22E illustrates an example of an information terminal. An information terminal 7550 includes a housing 7551, a display portion 7552, a microphone 7557, a speaker portion 7554, a camera 7553, operation switches 7555, and the like. The display apparatus of one embodiment of the present invention can be used for the display portion 7552. The display portion 7552 has a touch panel function. The information terminal 7550 also includes an antenna, a battery, and the like inside the housing 7551. The information terminal 7550 can be used as, for example, a smartphone, a mobile phone, a tablet information terminal, a tablet personal computer, an e-book reader, or the like.

Figure 22F:
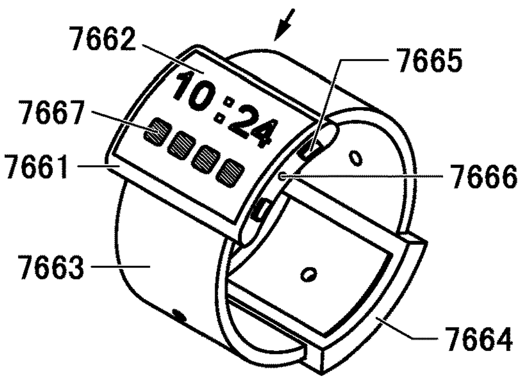

FIG. 22F illustrates an example of a watch-type information terminal. An information terminal 7660 includes a housing 7661, a display portion 7662, a band 7663, a buckle 7664, an operation switch 7665, an input/output terminal 7666, and the like. The information terminal 7660 also includes, for example, an antenna, a battery, and the like inside the housing 7661. The information terminal 7660 is capable of executing a variety of applications such as mobile phone calls, e-mailing, text viewing and editing, music reproduction, Internet communication, and computer games, for example.

The information terminal 7660 includes a touch sensor in the display portion 7662, and can be operated by touching the screen with a finger, a stylus, or the like. For example, by touching an icon 7667 displayed on the display portion 7662, an application can be started. With the operation switch 7665, for example, a variety of functions such as time setting, power on/off, on/off of wireless communication, setting or cancellation of a silent mode, and setting or cancellation of a power saving mode can be performed. For example, the functions of the operation switch 7665 can be set by the operating system incorporated in the information terminal 7660.

The information terminal 7660 can execute near field communication conformable to a communication standard. For example, mutual communication between the information terminal 7660 and a headset capable of wireless communication enables hands-free calling. The information terminal 7660 can perform data transmission and reception with another information terminal through the input/output terminal 7666. Charging through the input/output terminal 7666 is also possible. Note that the charging operation may be performed by wireless power feeding without using the input/output terminal 7666.

Figure 23A:
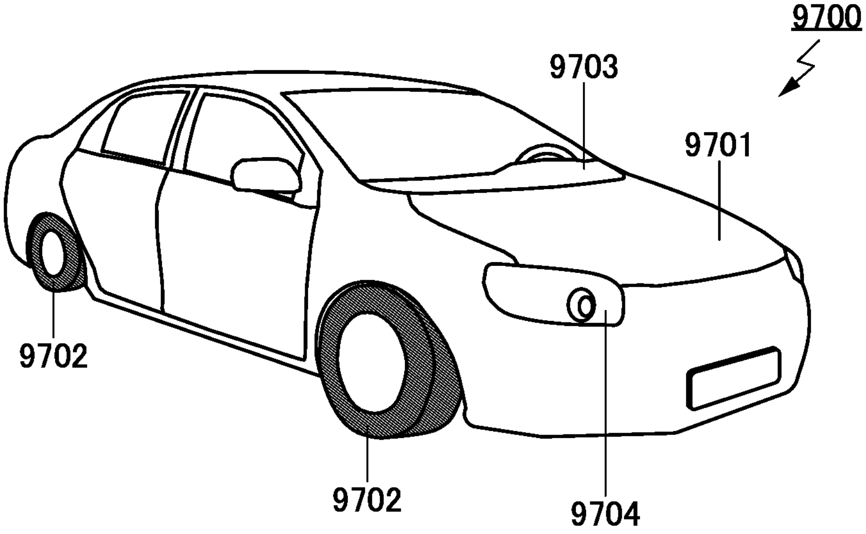
FIG. 23A and FIG. 23B are diagrams illustrating an example of an electronic device.
Figure 23B:
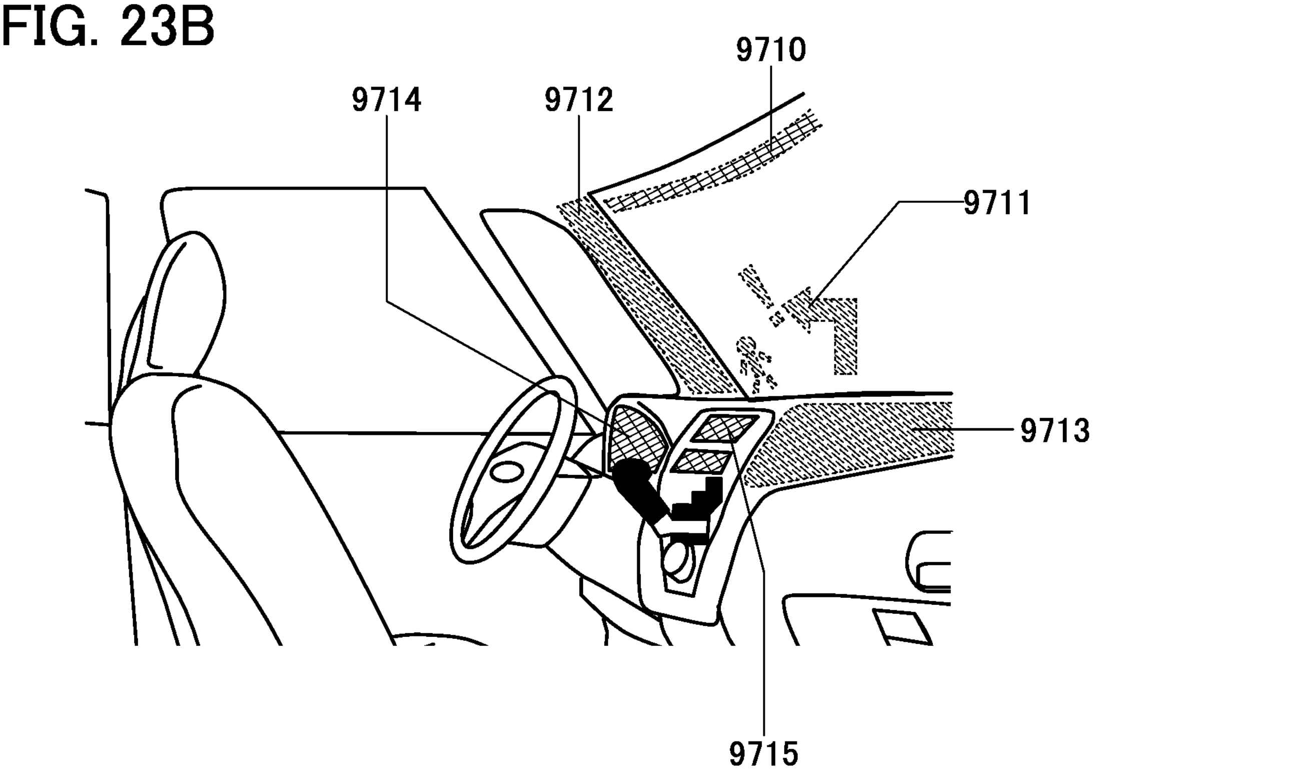

FIG. 23A is an external view of an automobile 9700. FIG. 23B illustrates a driver's seat of the automobile 9700. The automobile 9700 includes a car body 9701, wheels 9702, a dashboard 9703, lights 9704, and the like. The display apparatus of one embodiment of the present invention can be used in a display portion of the automobile 9700 or the like. For example, the display apparatus of one embodiment of the present invention can be provided for a display portion 9710 to a display portion 9715 illustrated in FIG. 23B.

The display portion 9710 and the display portion 9711 are display apparatuses provided in an automobile windshield. The display apparatus of one embodiment of the present invention can be what is called a see-through display apparatus, through which the opposite side can be seen, by using a light-transmitting conductive material for electrodes of the display apparatus. Such a see-through display apparatus does not hinder driver's vision during the driving of the automobile 9700. Thus, the display apparatus of one embodiment of the present invention can be provided in the windshield of the automobile 9700. Note that in the case where a transistor or the like for driving the display apparatus is provided in the display apparatus, for example, a transistor having a light-transmitting property, such as an organic transistor using an organic semiconductor material or a transistor using an oxide semiconductor, is preferably used as the transistor.

The display portion 9712 is a display apparatus provided on a pillar portion. For example, the display portion 9712 can compensate for the view hindered by the pillar by displaying an image taken by an imaging means provided on the car body 9701. The display portion 9713 is a display apparatus provided on a dashboard 9703. For example, the display portion 9713 can compensate for the view hindered by the dashboard 9703 by displaying an image taken by the imaging means provided on the car body 9701. That is, in the automobile 9700, an image taken by the imaging means provided on the car body 9701 is displayed on the display portion 9712 and the display portion 9713, which can compensate for blind areas and enhance safety. Display of an image that complements for a portion that cannot be seen makes it possible to confirm safety more naturally and comfortably.

Figure 24:
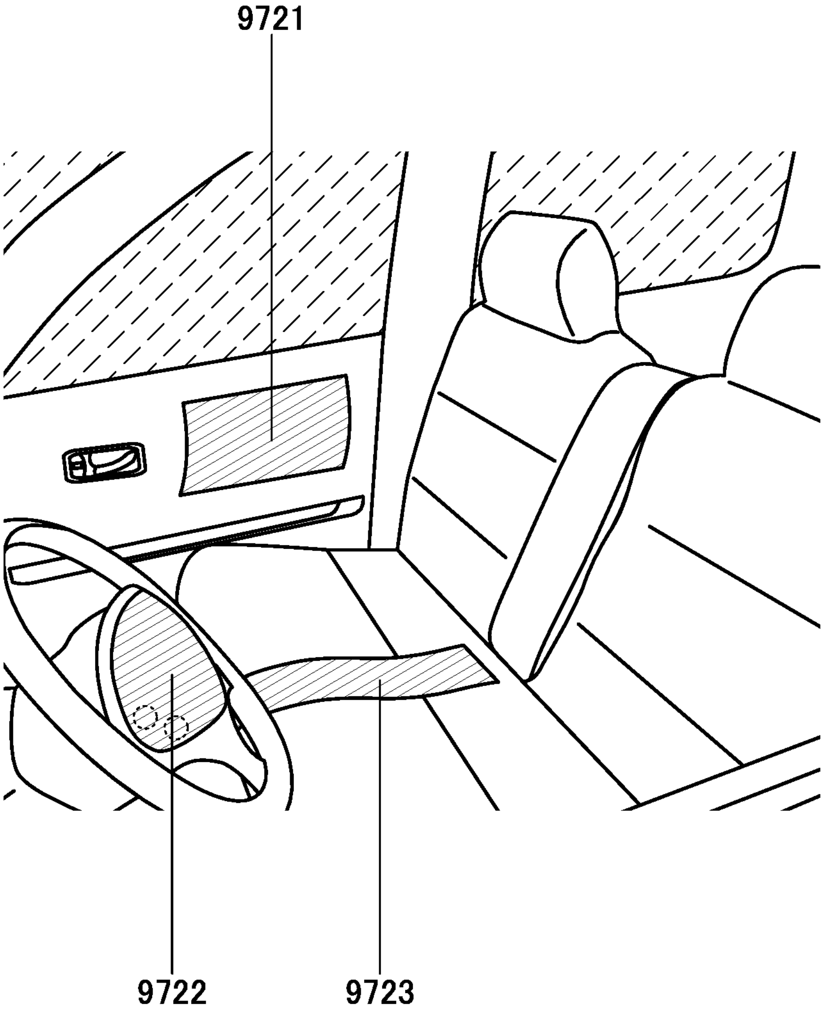
FIG. 24 is a diagram illustrating an example of an electronic device.

FIG. 24 illustrates the inside of an automobile 9700 in which a bench seat is used as a driver's seat and a front passenger's seat. A display portion 9721 is a display apparatus provided in a door portion. For example, the display portion 9721 can compensate for the view hindered by the door by displaying an image taken by an imaging means provided on the car body 9701. A display portion 9722 is a display apparatus provided in a steering wheel. A display portion 9723 is a display apparatus provided in the middle of a seating face of the bench seat.

The display portion 9714, the display portion 9715, and the display portion 9722 can provide a variety of kinds of information to a user by displaying navigation information, speed, the number of engine revolutions, a mileage, the remaining amount of fuel, a gearshift state, air-condition setting, or the like. The content, layout, and the like of the display on the display portions can be changed freely by a user as appropriate. The above information can also be displayed on one or more of the display portion 9710 to the display portion 9713, the display portion 9721, and the display portion 9723. One or more of the display portion 9710 to the display portion 9715 and the display portion 9721 to the display portion 9723 can also be used as lighting devices.

The structure described in this embodiment can be used in an appropriate combination with any of the structures described in the other embodiments.

REFERENCE NUMERALS

10: display apparatus, 11: pixel, 12: monitor circuit, 13: image processing circuit, 51: wiring, 52: wiring, 53: wiring, 61: light-emitting element, 180A: transistor, 180B: transistor, 180C: transistor, M1: transistor, M2: transistor, M3: transistor, M4: transistor, M5: transistor, M6: transistor, C1: capacitor, C2: capacitor, DL: wiring, ML: wiring, GLa: wiring, GLb: wiring, GLc: wiring, ND1: node, ND2: node, ND3: node, Vdata: display data, V0: potential, V1: potential, Va: potential, Vc: potential, Ve0: potential, Ve1: potential, Ve2: potential, Ve3: potential, Ve4: potential, T11: period, T12: period, T13: period, T21: period, T22: period, T23: period, T24: period, T31: period, T32: period, T33: period, S01: step, S02: step, S03: step, S04: step, S05: step

The invention claimed is:

1. A correction method of a display apparatus comprising a pixel, a first circuit, and a second circuit, wherein the pixel comprises a light-emitting element, a first transistor, and a capacitor, wherein a first terminal of the first transistor is electrically connected to a first electrode of the light-emitting element and a first terminal of the capacitor, wherein the first circuit is electrically connected to the first electrode of the light-emitting element, wherein the second circuit is electrically connected to a gate of the first transistor, and wherein the first transistor is configured to control a current supplied to the light-emitting element on the basis of a first signal supplied from the second circuit to the pixel, the correction method comprising:

a first processing step in which a voltage correcting a threshold voltage of the first transistor is obtained and the voltage is held in the capacitor;

a second processing step in which after the first processing step, a current flowing through the light-emitting element is measured and a second signal based on the current flowing through the light-emitting element is generated in the first circuit;

a third processing step in which after the second processing step, the first signal correcting image data using the second signal is generated in the second circuit; and a fourth processing step in which after the third processing step, the first signal is supplied to the pixel.

2. The correction method of a display apparatus, according to claim 1, wherein the first transistor comprises a back gate electrically connected to a second terminal of the capacitor, wherein the first transistor is configured to control a threshold voltage of the first transistor, on the basis of a potential supplied to the back gate, and wherein a voltage between the back gate and the first terminal of the first transistor is obtained in the first processing step.

3. The correction method of a display apparatus, according to claim 1, wherein the first signal is supplied to the gate of the first transistor in the fourth processing step.

4. The correction method of a display apparatus, according to claim 1, wherein the pixel further comprises a second transistor and a third transistor, wherein the second circuit is electrically connected to the gate of the first transistor through a first terminal of the second transistor and a second terminal of the second transistor, wherein the first circuit is electrically connected to the first electrode of the light-emitting element through a first terminal of the third transistor and a second terminal of the third transistor, and wherein a gate of the second transistor and a gate of the third transistor are electrically connected to a first wiring.

5. A correction method of a display apparatus comprising a pixel, a first circuit, and a second circuit, wherein the pixel comprises a light-emitting element, a first transistor, and a capacitor, wherein a first terminal of the first transistor is electrically connected to a first electrode of the light-emitting element and a first terminal of the capacitor, wherein the first circuit is electrically connected to the first electrode of the light-emitting element, wherein the second circuit is electrically connected to a gate of the first transistor, and wherein the first transistor is configured to control a current supplied to the light-emitting element on the basis of a first signal supplied from the second circuit to the pixel, the correction method comprising:

a second processing step in which a current flowing through the light-emitting element is measured and a second signal based on the current flowing through the light-emitting element is generated in the first circuit;

a first processing step in which after the second processing step, a voltage correcting a threshold voltage of the first transistor is obtained and the voltage is held in the capacitor;

a third processing step in which after the second processing step, the first signal correcting image data using the second signal is generated in the second circuit; and a fourth processing step in which after the first processing step and the third processing step, the first signal is supplied to the pixel.

6. The correction method of a display apparatus, according to claim 5, wherein the first processing step and the third processing step are performed at the same time.

7. The correction method of a display apparatus, according to claim 5, wherein the first transistor comprises a back gate electrically connected to a second terminal of the capacitor, wherein the first transistor is configured to control a threshold voltage of the first transistor, on the basis of a potential supplied to the back gate, and wherein a voltage between the back gate and the first terminal of the first transistor is obtained in the first processing step.

8. The correction method of a display apparatus, according to claim 5, wherein the first signal is supplied to the gate of the first transistor in the fourth processing step.

9. The correction method of a display apparatus, according to claim 5, wherein the pixel further comprises a second transistor and a third transistor, wherein the second circuit is electrically connected to the gate of the first transistor through a first terminal of the second transistor and a second terminal of the second transistor, wherein the first circuit is electrically connected to the first electrode of the light-emitting element through a first terminal of the third transistor and a second terminal of the third transistor, and wherein a gate of the second transistor and a gate of the third transistor are electrically connected to a first wiring.

* * * * *